United States Patent [19]

Utsumi et al.

[11] Patent Number: 5,809,300

[45] Date of Patent: *Sep. 15, 1998

[54] REMOVABLE STORAGE MEDIUM AND COMPUTER SYSTEM USING THE SAME

[75] Inventors: Kenichi Utsumi; Koichi Ogawa; Makoto Yoshioka; Satoshi Itami; Kazunori Naito; Kazuo Nakashima, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 30,558

[22] Filed: Mar. 12, 1993

[30] Foreign Application Priority Data

| Mar. 16, 1992 | [JP] | Japan | 4-058447 |
| Mar. 16, 1992 | [JP] | Japan | 4-058448 |
| Jan. 28, 1993 | [JP] | Japan | 5-012364 |

[51] Int. Cl.$^6$ ..................................................... G06F 9/445
[52] U.S. Cl. ....................................................... 395/651
[58] Field of Search ............................. 395/650, 700, 395/652, 651; 364/DIG. 1 MS File

[56] References Cited

U.S. PATENT DOCUMENTS

| 4,590,557 | 5/1986 | Lillie | 364/DIG. 1 X |
| 5,014,193 | 5/1991 | Garner et al. | 364/DIG. 1 |
| 5,136,711 | 8/1992 | Hugard et al. | 395/700 |
| 5,142,680 | 8/1992 | Ottman et al. | 395/700 |
| 5,150,465 | 9/1992 | Bush et al. | 364/DIG. 1 |
| 5,261,104 | 11/1993 | Bertram et al. | 395/700 |
| 5,291,585 | 3/1994 | Sato et al. | 364/DIG. 1 |
| 5,381,549 | 1/1995 | Tamura | 395/651 |
| 5,459,854 | 10/1995 | Sherer et al. | 395/651 |

FOREIGN PATENT DOCUMENTS

| 0364 115 A3 | 4/1990 | European Pat. Off. |
| 3-100761 | 9/1989 | Japan |
| 3-251914 | 3/1990 | Japan |
| 4-15823 | 5/1990 | Japan |
| 4-177441 | 11/1990 | Japan |
| 4-352231 | 5/1991 | Japan |
| 3-278120 | 12/1991 | Japan |

OTHER PUBLICATIONS

Translation of an Office Action of the Japanese Patent Office, Japanese Patent Appln. No. 7-025609, May 14, 1997.
Article entitled: The Optical File Cabinet: A Random-Access File System For Write-Once Optical Disks; Author: Jason Gait.

*Primary Examiner*—Thomas M. Heckler
*Attorney, Agent, or Firm*—Armstrong, Westerman Hattori, McLeland & Naughton

[57] ABSTRACT

A removable storage medium relates to a removable storage medium embodying an external storage medium for computer equipment. The removable storage medium can be inserted in an external storage apparatus connected to a computer equipment unit, and stores predetermined programs. The removable storage medium includes a correspondence table for specifying a correspondence relation between a physical drive configuration of the computer equipment unit connected to the external storage apparatus and a logical drive configuration of the stored programs. A recording device is provided for recording information on the correspondence table.

3 Claims, 48 Drawing Sheets

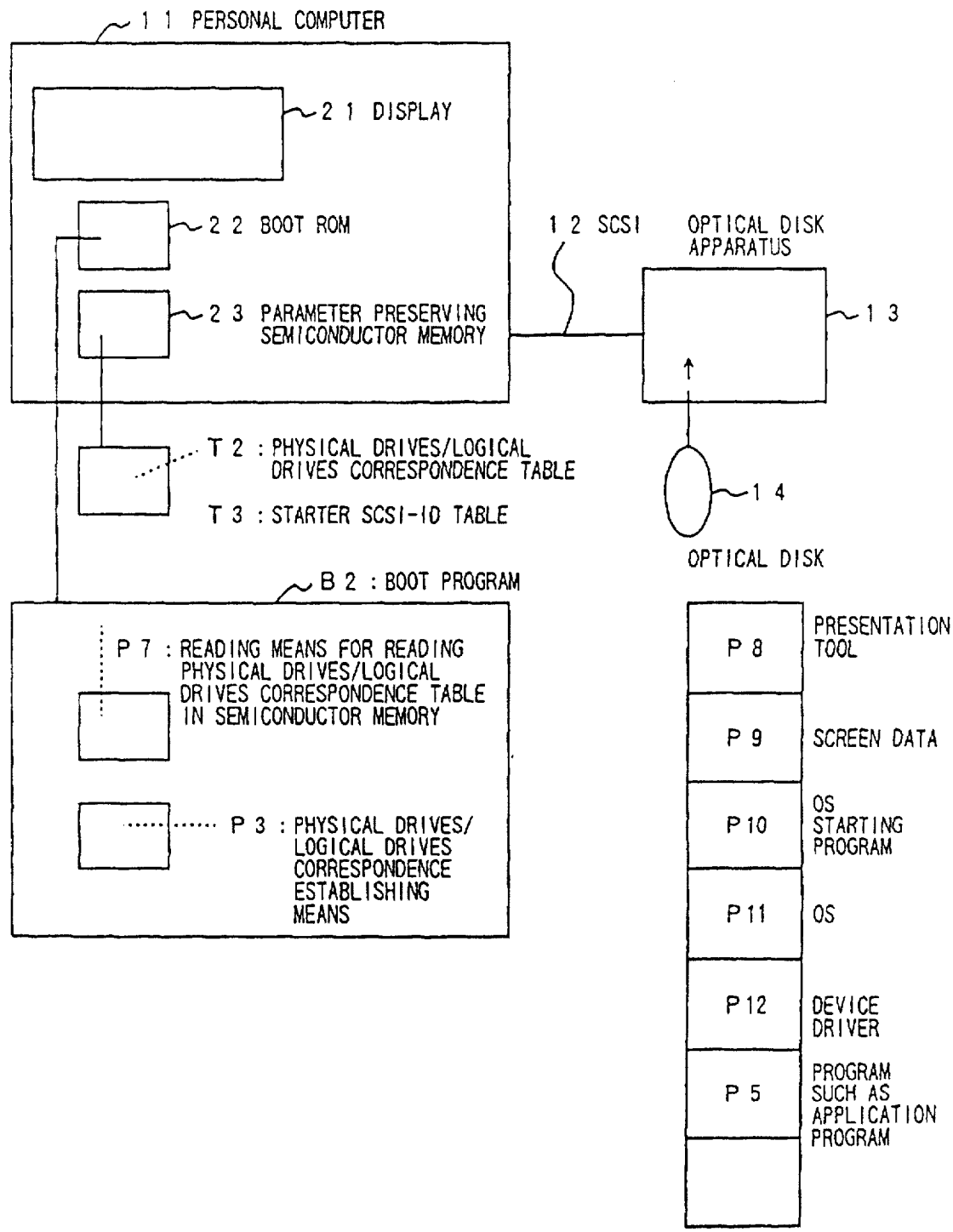

FIG.2(A) PRIOR ART

TABLE (T2)

| SCSI-ID | LOGICAL DRIVE NAME |
|---------|--------------------|
| 0 | D |
| 1 | E, F |
| 2 | G |
| 3 | NONE |
| 4 | NONE |

TABLE (T3)

| STARTER SCSI-ID | 1 |
|-----------------|---|

FIG.2(B) PRIOR ART

TABLE (T2)

| SCSI-ID | LOGICAL DRIVE NAME |
|---------|--------------------|
| 0 | NONE |
| 1 | NONE |
| 2 | D |
| 3 | E |
| 4 | NONE |

TABLE (T3)

| STARTER SCSI-ID | 2 |
|-----------------|---|

14 OPTICAL DISK

| | |
|---|---|
| P1 | IPL |
| P10 | OS STARTING PROGRAM |
| P11 | OS |
| P5 | APPLICATION PROGRAM |

23

| | |
|---|---|
| LOGICAL DRIVE NAME OF OPTICAL DISK | E |
| LOGICAL DRIVE NAME OF RAM DISK | F |
| EXPANDED MEMORY CAPACITY FOR SYSTEM | 1MB |
| RAM DISK CAPACITY | 1MB |

23

| | |
|---|---|
| LOGICAL DRIVE NAME OF OPTICAL DISK | C |
| LOGICAL DRIVE NAME OF RAM DISK | D |
| EXPANDED MEMORY CAPACITY FOR SYSTEM | 4MB |
| RAM DISK CAPACITY | 0MB |

FIG.6  *PRIOR ART*
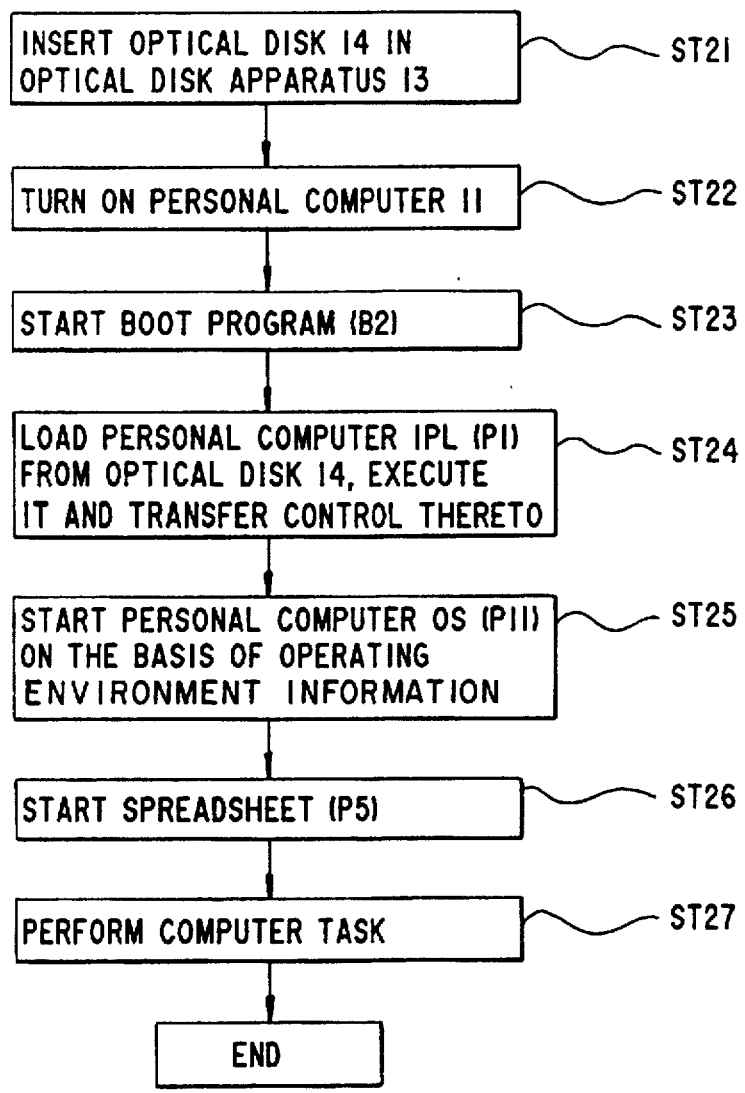

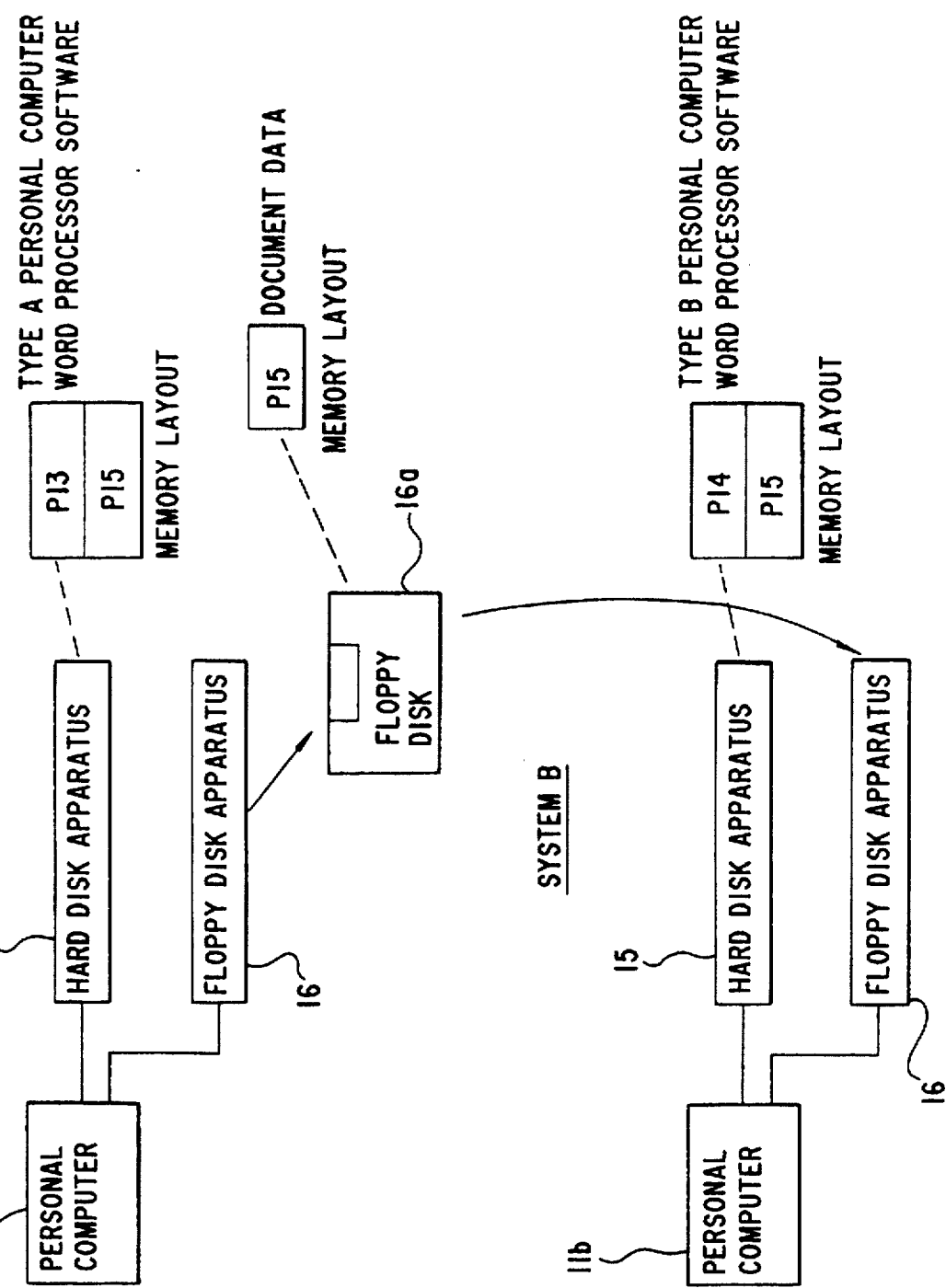

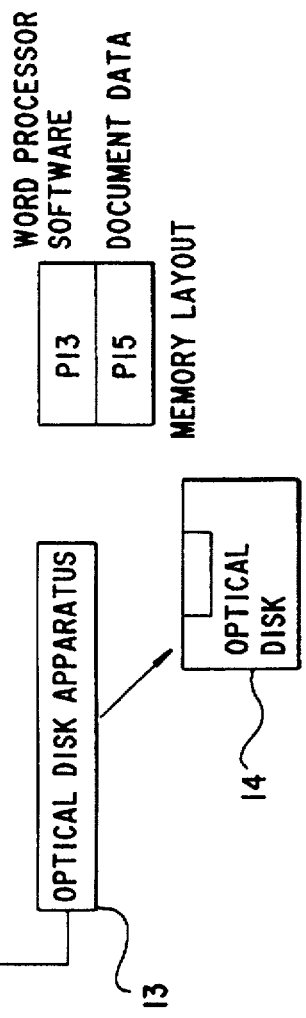
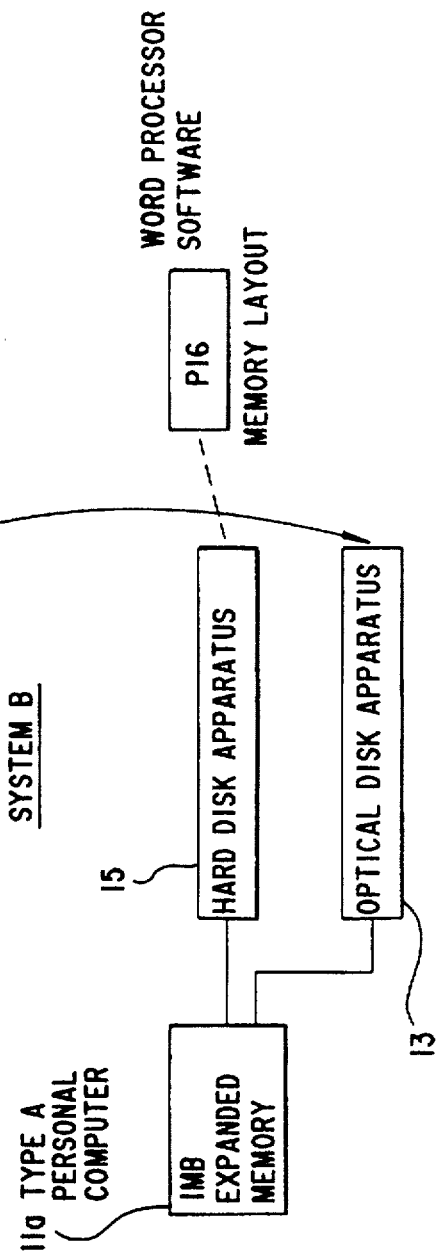
FIG. 8 *PRIOR ART*

F I G. 1 2

| DRIVE NAME | DRIVE ATTRIBUTE | DRIVE TYPE (TEMPORARY ID) |
|---|---|---|
| D | WORK | SCSI-A |
| E | STARTER WORK | SCSI-B |
| F | WORK | SCSI-B |

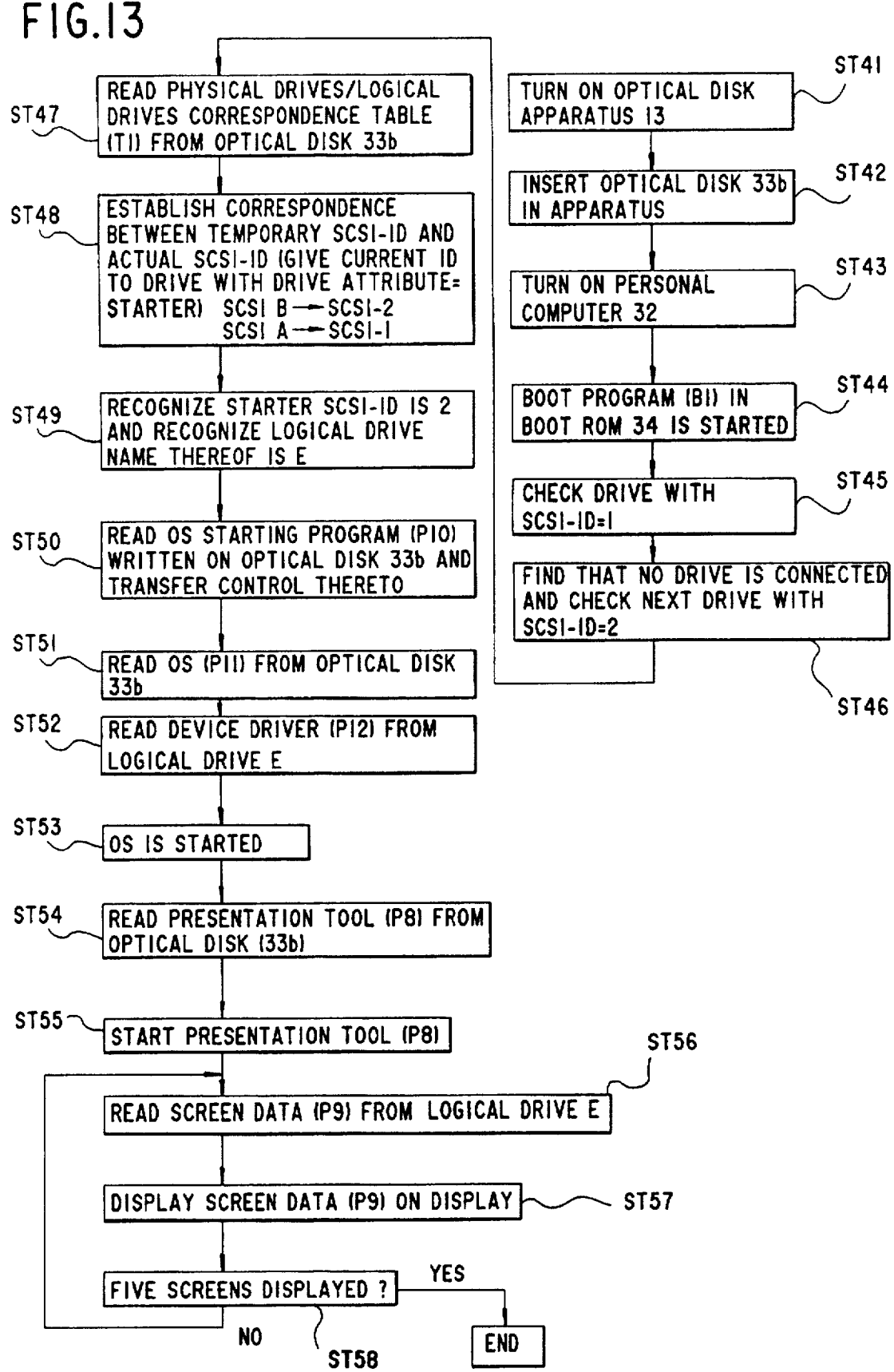

F I G. 1 5
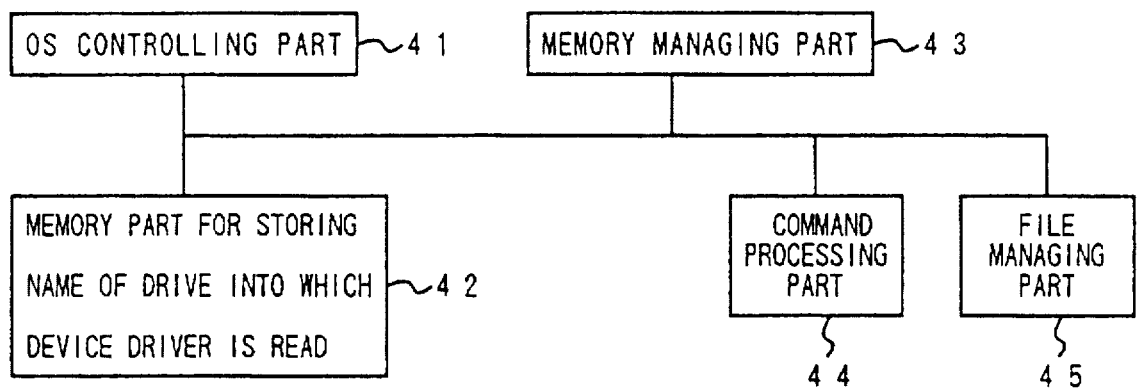
F I G. 1 6
FUNCTIONAL BLOCK DIAGRAM OF PRESENTATION TOOL OF FIG. 6
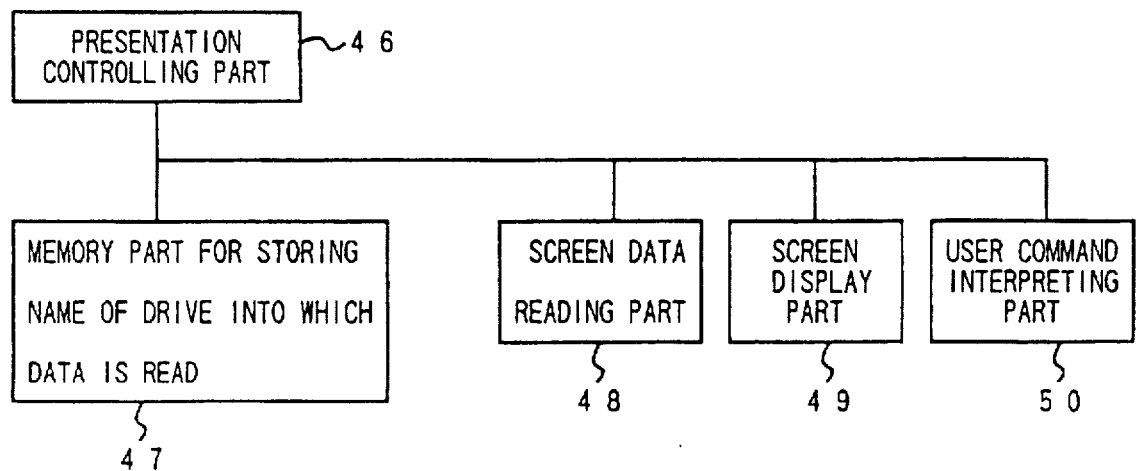

FIG. 19

|   | A | B | C | D | E | F | G | H | I |
|---|---|---|---|---|---|---|---|---|---|
| A | FP1 | FP2 | HD0 | HD1 | MO0 | MO1 | MO2 | | |
| B | FP1 | FP2 | MO0 | MO1 | MO2 | | | | |
| C | FP1 | FP2 | HD0 | HD1 | MO0 | MO1 | RAM | MO2 | MO3 |

FO : FLOPPY DISK
HD : HARD DISK
MO : MAGNETO-OPTIC DISK
RAM : RAM DISK

FIG. 29

| TYPE A PERSONAL COMPUTER |
|---|
| TYPE B PERSONAL COMPUTER |
| NONE |
| NONE |
| . . . |

F I G. 3 6
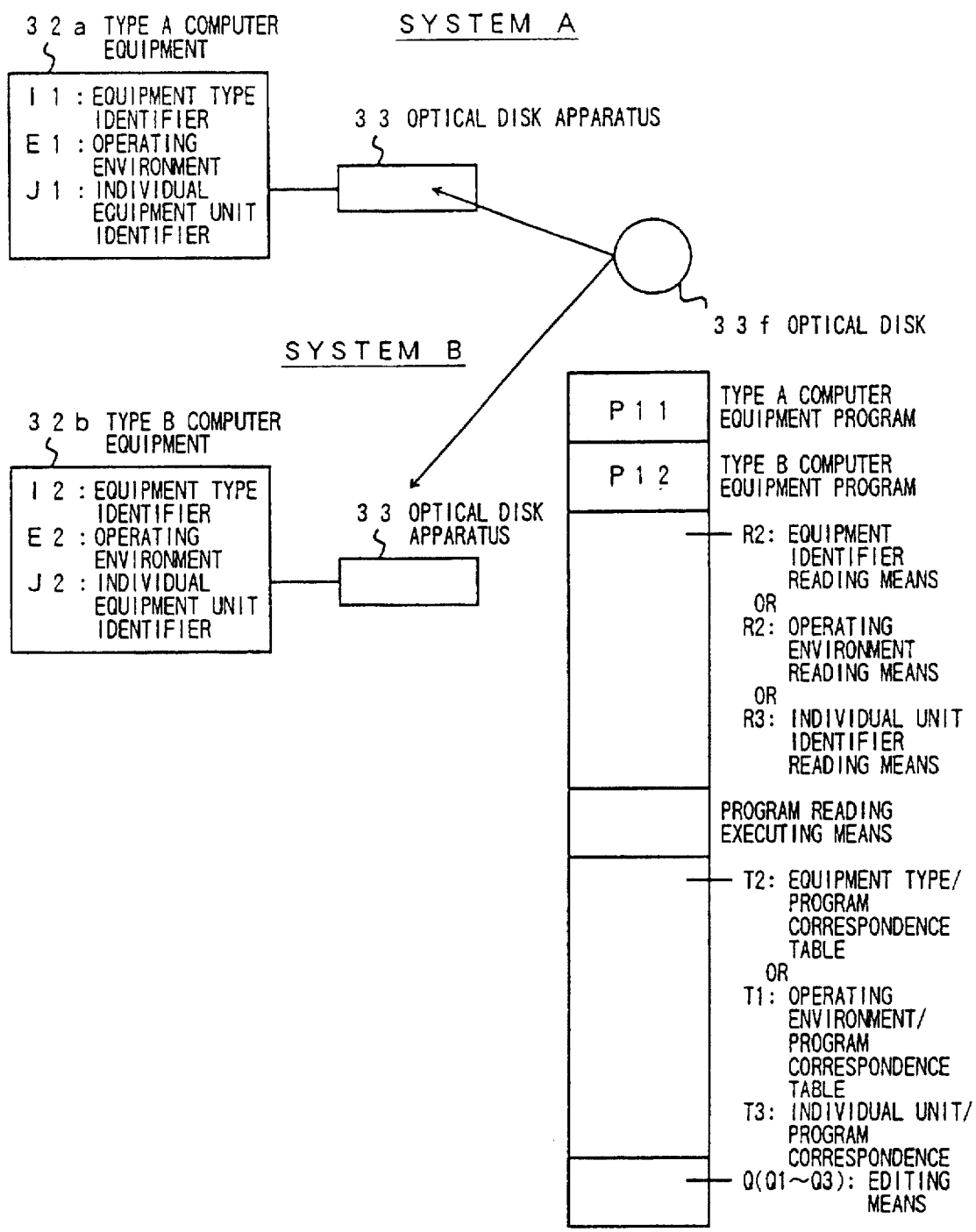

(A)
T1: OPERATING ENVIRONMENT/
    PROGRAM
    CORRESPONDENCE
    TABLE

| E1 | P11 |
| E2 | P12 |
|    |     |

(B)
T2: EQUIPMENT TYPE/
    PROGRAM
    CORRESPONDENCE
    TABLE

| I1 | P11 |
| I2 | P12 |
|    |     |

(C)
T3: INDIVIDUAL UNIT/
    PROGRAM
    CORRESPONDENCE
    TABLE

| J1 | P11 |
| J1 | P12 |
|    |     |

FIG. 43

| OPERATING ENVIRONMENT ITEM | RANGE | PROGRAM NAME |
|---|---|---|
| EXPANDED MEMORY | 2MB OR MORE | P11a |
| | LESS THAN 2MB | P11b |

CONTENT OF CORRESPONDENCE TABLE OF FIG. 38

| EQUIPMENT TYPE IDENTIFIER | IPL NAME |
|---|---|
| 1 5 | P 1 a |
| 1 6 | P 1 b |

1

REMOVABLE STORAGE MEDIUM AND COMPUTER SYSTEM USING THE SAME

BACKGROUND OF THE INVENTION

Conventional computer equipment, a typical example of which is a personal computer, is designed on the assumption that magnetic disk drives will be used as fixed external storage devices. Therefore, there has been little or no opportunity for the correspondence between external storage devices and logical drives to be modified since it was activated. A table specifying a correspondence relation between physical drives and logical drives is stored in a battery backed up semiconductor memory within a computer equipment unit.

Since an application program as well as an OS (Operating System) installed in such a fixed magnetic disk always operates under the same environment, it is a general practice that a parameter thereof not be changed once it is set. Accordingly, it has been impossible for the data prepared using one computer system to be utilized in another computer system by transferring the data using a floppy disk, unless the proper application program is installed in the other computer system. The installation of the proper program therein requires, however, that the environment configuration in terms of logical drive numbers, and the like, be performed all over again.

FIG. 1 illustrates a configuration of a conventional optical disk and a computer system; and FIG. 2 shows a table stored in the semiconductor memory of FIG. 1.

Referring to FIG. 1, computer equipment, in the form of a personal computer 11, is connected to an optical disk apparatus 13 via a SCSI (Small Computer Systems Interface) 12. This optical disk apparatus 13 drives an optical disk 14. We designate the above system as the system A, and a configuration including a plurality of systems (for example, A and B) is thus realized.

The personal computer 11 is equipped with a display 21, a boot ROM (Read Only Memory) 22 and a semiconductor memory 23 for storing parameters.

A boot ROM 22 contains a boot program B2 comprising: a reading means P7 for reading the correspondence table specifying the correspondence between the physical drives and the logical drives and residing on the semiconductor memory 23; and a correspondence establishing means P3 for establishing the correspondence between the physical drives and the logical drives.

The battery backed up semiconductor memory 23 stores a correspondence table T2 specifying the correspondence between the physical drives and the logical drives, and a starter SCSI-ID table T3. This table T3 specifies a starter SCSI from among a predetermined number of optical disk apparatuses 13 connected to the personal computer 11.

The optical disk 14 in this example stores a presentation tool P8, screen data P9 and a test driver P12 as well as an OS starting program P10, an OS (P11) and a program P5 such as an application program.

The presentation tool P8 is a tool which allows a plurality of screens P9 to be prepared and stored in the optical disk and allows the data representing the screens to be obtained from the optical disk 14 to the personal computer 11 and to be displayed on a display apparatus 21. Five screens P9 are prepared using this presentation tool P8, which screens comprise data stored in the optical disk 14 set in the optical disk apparatus 13.

In the system A, the tables T2 and T3 stored in the semiconductor memory 23 of the personal computer 11 are such that, as shown in FIG. 2(A), the table T2 stores the correspondence table specifying the correspondence between the SCSI-IDs (0, 1, - - -) of the physical drives and the logical drive names (D, E, F, G, - - -), and the table T3 stores the starter SCSI-ID number ("1" in the case of FIG. 2(A)). Two logical drives E and F are assigned to the drive having SCSI-ID =1. As shown in FIG. 2(B), in the system B, the table T2 stores the correspondence table specifying the correspondence between the SCSI-ID numbers of the physical drives and the logical drive names, which correspondence differs from that of the system A. The table T3 provides that the starter SCSI-ID=2. The tables T2 and T3 are user rewritable.

FIG. 3 shows the flow of operations executed while testing a conventional presentation tool. In the system A, the optical disk apparatus 13 is turned on, the optical disk 14 is inserted therein, and the personal computer 11 is turned on (steps (ST) 1–3).

When the personal computer 11 is turned on, the boot program B2 within the boot ROM 22 is activated (ST4). Then, first the correspondence table T2 in the semiconductor memory 23 is read, followed by reading of the SCSI-ID table T3 (ST5). These operations are executed before the OS is started because the OS accesses the external storage devices on the basis of the logical drive names and because correspondence of the physical drives and the logical drives need to be duly established before the OS is activated.

The boot program B2 then recognizes that the starter SCSI-ID is 1 and that the logical drive corresponding to that is E (ST6).

Then (ST7) the boot program B2 reads the OS starting program P10 stored in the optical disks 14 and transfers control thereto. The OS starting program P10 reads the OS (P11) from the optical disk 14a and starts it (ST8). The correspondence between the logical drives and the physical drives is referred to at this stage.

The OS starting program then (ST9) reads the device driver P12 (a software comprising a group of drivers for controlling external devices) from the logical drive E (in this case, the optical disk 14a). The name of the drive from which to read the driver P12 is stored as a parameter in the OS in the form of a logical drive name. In the present example, the parameter is set to be the "drive E".

The OS is then started (ST10); it then reads the presentation tool P8 from the optical disk 14 (ST11) and starts the operation of the tool (ST12). The OS then reads the screen data P9 from the logical drive E (the optical disk 14) (ST13) and causes the screen data P9 to be displayed on the display apparatus 21 (ST14). The display is terminated after five screens (ST15) have been shown.

When the presentation test is terminated, a program P5 such as an application program is read and executed.

In consideration of a large number of users, the other system B having the same configuration allows the contents of the correspondence table T2 to be rewritable by not fixing the correspondence between the physical drives and the logical drives. The table T2 in the system B is prepared as shown in FIG. 2(B), where the starter SCSI-ID=2.

Since the presentation tool 18 written in the optical disk 14 is not operable in this case, it is required that the personal computer 11 be adjusted as appropriate for its operating environment. It is assumed therefore that the SCSI-ID of the optical disk apparatus 13 is set to be 1, and that the tables T2, T3 in the semiconductor memory 23 are rewritten to have the contents as shown in FIG. 2(A) so that the operating environment of the system B is the same as that of the system A.

Once such a setting is achieved, the presentation tool test as shown in FIG. 3 can be effected by inserting the optical disk 14 in the optical disk apparatus 13 and turning the power on.

It is found from the above that even if the OS (P11) or the presentation program P8 is contained in the single optical disk 14, a complicated operation is required, which operation involves manual modification of the correspondence table T2 specifying the correspondence between the physical drives and the logical drives, in order to enable utilization of the screen data P9 prepared in another system having an environment of its own, in a presentation.

A description will now be given of the execution of a program P5 such as an application program. The execution of spreadsheet calculations based on the program P5 is taken as an example.

FIG. 3 illustrates the contents stored in the optical disk; and FIG. 4 shows the operating environment information contained in the semiconductor memory. Referring to FIG. 3, the optical disk 14 usually stores, although not shown in FIG. 1, an IPL (Initial Program Loader) P1 and also stores, as is shown in FIG. 1, the OS starting program P10, the OS P11 and the application program P5.

The semiconductor memory 23 in the personal computer 11 of the system A stores the logical drive name (E) of the optical disk, the logical drive name (F) of a RAM (Random Access Memory) disk provided in the personal computer 11, the capacity of the expanded system memory (1 MB) and the capacity of an RAM disk (1 MB). The semiconductor memory 23 of the system B stores the logical drive name (C) of the optical disk, the logical drive name (D) of the RAM disk, the capacity of the expanded system memory (4 MB) and the capacity of the RAM disk (0 MB).

FIG. 6 shows a flow of operations of the application program. Referring to FIG. 6, the optical disk 14 is inserted in the optical disk apparatus 13 (ST21) and the personal computer 11 is turned on (ST22). This causes the boot program B2 in the boot ROM 22 to be started (ST23) and allows the personal computer IPL (P1) to be loaded in and executed, IPL control being transferred to the IPL (ST24).

The IPL reads the operating environment information (FIG. 5(A)) contained in the tables T2 and T3 in the semiconductor memory 23. This is carried out before starting the OS for the same reason as mentioned before.

The IPL reads the OS starting program P10 on the basis of the read operating environment information thus, thus starting the personal computer OS (P11) (ST25) and transferring control thereto.

As shown in FIG. 5(A), the logical drive name of the optical disk apparatus 13 is set to be the "drive E"; and the logical drive name of the RAM drive reserved on the expanded memory is set to be the "drive F". The application program (spreadsheet) P5 has as it program parameters the logical drives E and F and the program P5 accesses the optical disk 14 and the RAM disk on the basis of these logical drive names.

The spreadsheet P5 is started (ST26) and a computer task is carried out by this program (ST27).

When running the spreadsheet in the system B by using the same optical disk 14, the spreadsheet P5 is not started if no measure is taken because the operating environment information for the system A and that for the system B are different (FIG. 5(A) and (B)). Accordingly, as described with reference to FIG. 1, the operating environment of the system B is modified to be identical to that of the system A in order for the same optical disk 14 used in the system A to be usable in the system B.

FIG. 7 illustrates a configuration of another conventional computer system. Referring to FIG. 7, both in the system A and the system B, a hard disk apparatus 15 and a floppy disk apparatus 16 are connected to personal computers 11a and 11b. A removable storage medium embodied by a floppy disk 16 is used in the floppy disk apparatus 16.

A hard disk in the hard disk apparatus 15 of the system A stores a word processor software P13 for the type A personal computer; and the hard disk in the hard disk apparatus 15 of the system B stores a word processor software P14 (of the same performance as P13) for the type B personal computer. The floppy disk 16a stores document data P15.

Assuming that the word processor software P13 for the type A personal computer, which word processor is stored in the hard disk of the hard disk apparatus 15, is run in the system A so as to create a document, data P15 thus created is recorded on the same hard disk, and the data P15 is then transferred to the floppy disk 16a using the floppy disk apparatus 16.

In the system B, the hard disk apparatus 15 is activated so as to run the word processor software P14 for the type B personal computer. The document data P15 in the floppy disk 16a is transferred to the hard disk apparatus 15 via the floppy disk apparatus 16 so that creation of a document can be resumed.

It is to be noted that the word processor software can be assigned to any of the function keys so that it can be obtained in a one-touch operation. It is possible to modify the key assignment after assignment has been made. Therefore, any key assignment modification in the system A should accompany reassignment of the keys in the system B, where the same software is to be used.

This means that performing of the same job in different systems requires that the document in the hard disk be transferred to the floppy disk 16a and the key assignment modification be carried out in both systems.

FIG. 8 illustrates a configuration of a variation of the computer system of FIG. 7. FIG. 8 shows that the type A personal computers 11a are used by both the systems A and B. The type A personal computer 11a of the system A has 8 MB of expanded memory, while the type A personal computer 11a of the system B has 1 MB of expanded memory. An optical disk apparatus 13, instead of the floppy disk apparatus 16, is connected to the personal computers; the optical disk 14 is shared by the two systems, the recording of the data on the optical disk 14 being done using the word processor software P13.

We assume, using the word processor software P13, that a memory expansion of 2 MB is necessary to create the document data P15. The system B is limited in its usage of the optical disk 14 because the word processor P13 on the optical disk 14 cannot be utilized due to the difference in the capacities of expanded memories. Accordingly, the word processor P16 developed from the same word processor but having reduced performance ability and requiring no expanded memory is installed in the hard disk apparatus 15 so that the optical disk 14 may be fully used.

Thus, even when personal computers of the same type are used, it is required to use different kinds of word processor software, if there is a difference in the operating environment such as in capacity of expanded memory.

Various OS's now in use with personal computers are installed in the hard disk apparatus, from which apparatus the personal computer is started. Because of hardware differences, an OS cannot start a type of personal computer for which it is not designed. Some OS's allow the hard disk to be partitioned to produce several portions. In other words, a hard disk partitioned into logical drives can be used as if several different kinds of hard disks were present. This is generally called multi-partitioning. In multi-partition, systems different from one another can be installed in different partitions, thereby allowing several OS's to be used in one personal computer.

Because of lack of portability of hard disks, there has not been much opportunity for the system therein to be used in different locations. Further, it is impossible for the system in the hard disk to be started when the hard disk is connected to a type of computer for which the system is not designed for. This is because an OS is hardware dependent and the operation thereof comes to a halt at the hardware-dependent part when being used under a type of computer for which the OS is not designed for.

Nowadays we benefit from an optical disk (magneto-optic disk), of larger capacity than a floppy disk, portable, can be put to practical use and for which several different systems can be installed on a single optical disk for activation of different types of computer equipment.

However, the conventional art has a disadvantage in that, when a plurality of users are to use a single computer equipment unit such as a personal computer by starting the same unit from the optical disks owned by each user, a complex operation is required. In the above operation, the correspondence between the physical drives and the logical drives needs to be set by means of keyboard entries and the like so that the operating environment of the computer may be properly adjusted.

It is also to be noted that: when creating the same kind of data under different computer systems, a program designed for the desired computer system must be installed, and that: even if the program is already installed, the data must be transferred to a floppy disk. Another disadvantage is that when the software is customized in one computer system, the program used in another computer system must also be recustomized.

The problem here is that a simple transfer of the contents of a conventional hard disk to the optical disk 14 does not ensure, because of a difference in the operating environment, that the program will work normally under a different computer system, even if that system is connected to the optical disk apparatus 13.

Still another disadvantage of the conventional art is that an attempt to configure the optical disk 14 by installing thereon a plurality of programs for different computer systems, so as to enable activation of those systems, is met by failure because of a difference in activation mechanisms due to hardware differences.

SUMMARY OF THE INVENTION

It is an object of the present invention to eliminate the above disadvantages and to provide a removable storage medium that is operable in a plurality of computer equipment units even when used alone.

The above object of the present invention can be achieved by a removable storage medium which is inserted in an external storage apparatus connected to a computer equipment unit and stores predetermined programs, the medium comprising:

a correspondence table for specifying the correspondence between physical drives configuration of the computer equipment unit connected to the external storage apparatus and logical drive configuration of the stored program; and recording means for recording the correspondence table.

The object of the present invention can also be achieved by a computer system, wherein correspondence is established, when the system is activated, between physical drive configuration of a computer equipment unit connected to an external storage apparatus and logical drive configuration of a predetermined program stored in a removable storage medium inserted in the external storage medium, the removable storage medium storing at least a correspondence table specifying the correspondence between the physical drive configuration and logical drive configuration, and recording means for recording the correspondence table, and the computer equipment unit comprising reading means for reading the correspondence table on the removable storage medium, and correspondence establishing means for establishing the correspondence between the physical drive configuration and the logical drive configuration in accordance with the correspondence table.

Other objects and further features of the present invention will be apparent from the following detailed description when read in conjunction with the accompanying drawings.

BRIEF DESCRIPTION OF THE DRAWINGS

FIG. 1 illustrates a configuration of a conventional optical disk and a computer system;

FIG. 2 shows a table stored in a semiconductor memory of FIG. 1;

FIG. 5 shows contents of the operating environment information stored in the semiconductor memory;

FIG. 6 is a flow of operations of an application program;

FIG. 7 illustrates a configuration of another conventional computer system; and

FIG. 8 illustrates a variation of the computer system of FIG. 7.

FIG. 12 shows a content of a table T1 of FIG. 11;

FIG. 13 is a flow chart of a presentation tool of FIG. 11;

FIG. 15 is a functional block diagram of an OS of FIG. 14;

FIG. 16 is a functional block diagram of a presentation tool of FIG. 14;

FIG. 19 shows a content of another correspondence table of FIG. 18;

FIG. 29 shows contents of a registering memory of the equipment type discriminating and executing tool of FIG. 28;

FIG. 36 illustrates a configuration of a fourth embodiment of the present invention;

FIG. 43 shows contents of the correspondence table of FIG. 42;

DETAILED DESCRIPTION OF THE PREFERRED EMBODIMENTS

Figure 3:
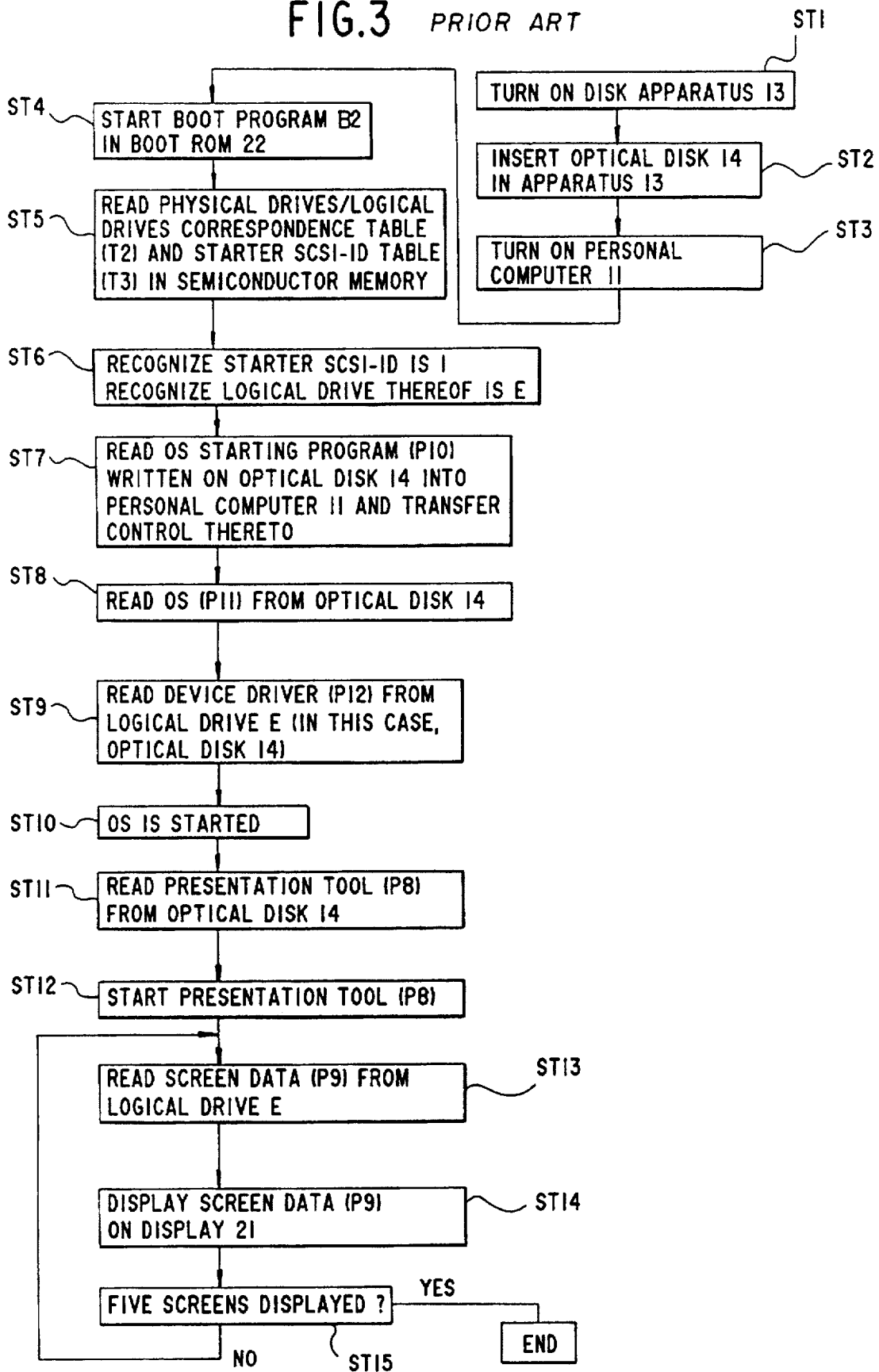
FIG. 3 is a flow of operations when testing a conventional presentation tool.
Figures 4, 5A, 5B:
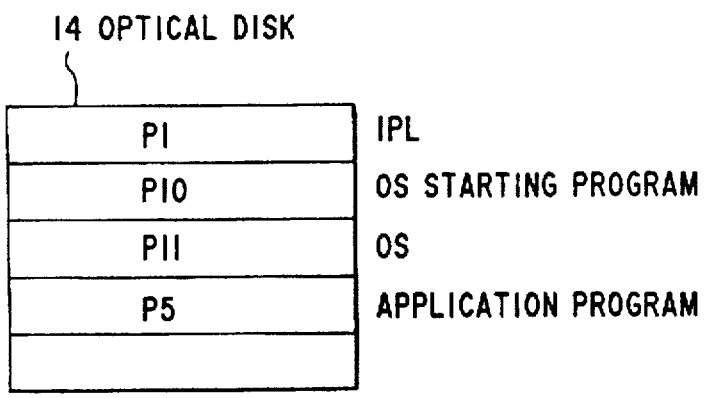
FIG. 4 shows contents stored in the optical disk.
Figure 9:
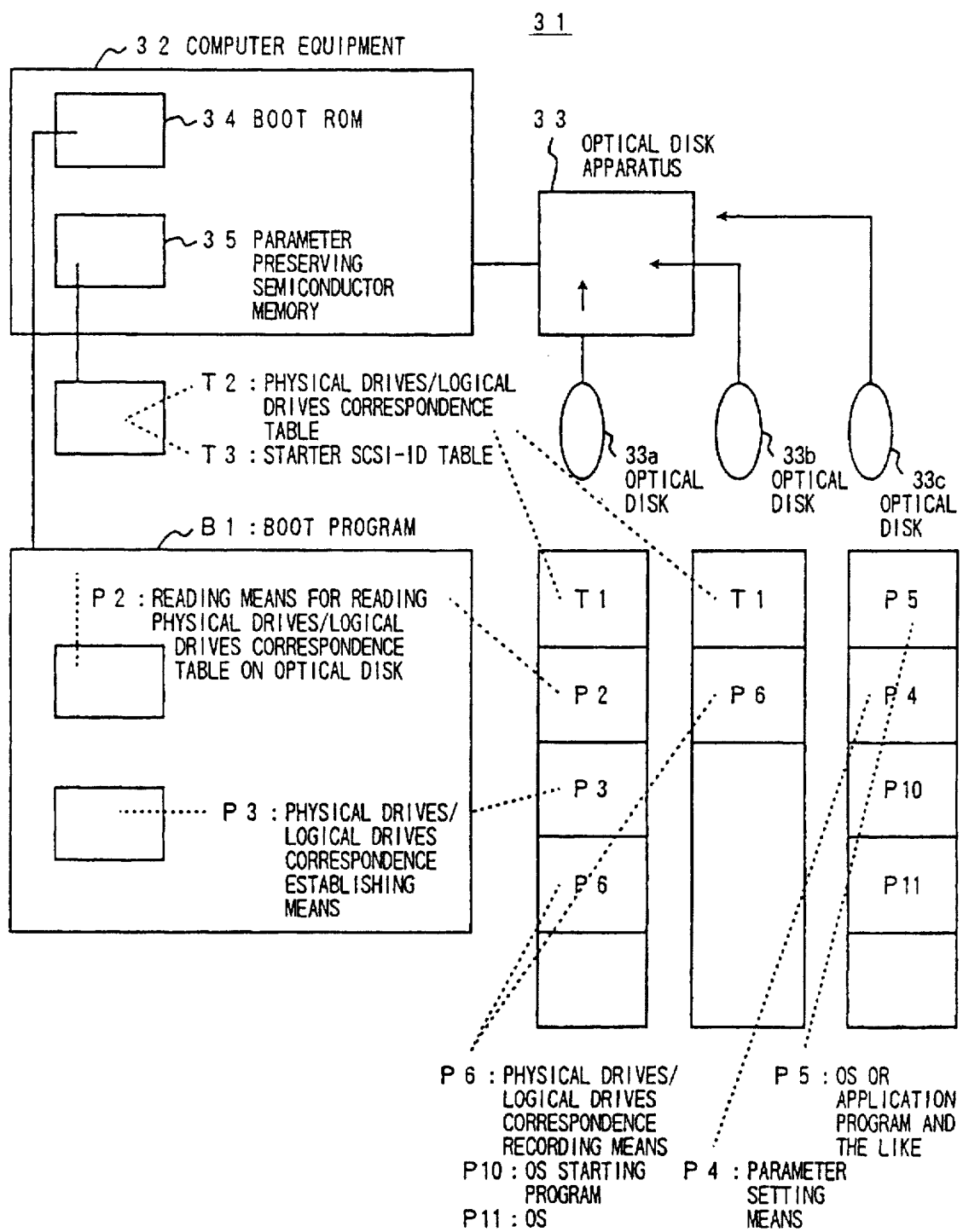
FIG. 9 illustrates a configuration of a first embodiment of the present invention.

FIG. 9 illustrates a configuration of a first embodiment of the p resent invention. In FIG. 9, a computer system 31 comprises a computer equipment unit (a personal computer) 32 and an optical disk apparatus 33 connected thereto. Removable storage mediums in the form of three kinds of optical disks 33a–33c are used in an optical disk apparatus 33.

The computer equipment unit 32 is equipped with a boot ROM 34 and a semiconductor memory 35 for storing parameters. The boot ROM 34 is equipped with a boot program B1 used for a reading means P2 for reading the correspondence table specifying the correspondence between the physical drives and the logical drives, and also used for a correspondence establishing means P3 for establishing the correspondence between the physical drives and the logical drives.

The semiconductor memory 35 stores a correspondence table T2 specifying the correspondence between the physical drives and the logical drives, and it also stores a starter SCSI-ID table T3.

The optical disk 33a stores: a correspondence table T1 specifying the correspondence between the names of the physical and logical drives; the reading means P2 for reading the correspondence table specifying the correspondence between the physical drives and the logical drives; the correspondence establishing means P3; and a correspondence table recording means P6.

The optical disk 33b stores, for example, a correspondence table T1 specifying the correspondence between the names of the drives, and the correspondence table recording means P6. The optical disk 33c stores a program such as an application program or an OS (P5), a parameter setting means P4, an OS starting program P10, and an OS (P11). The optical disks 33a and 33b also store the OS starting program P10 and the OS (P11).

Figure 10:
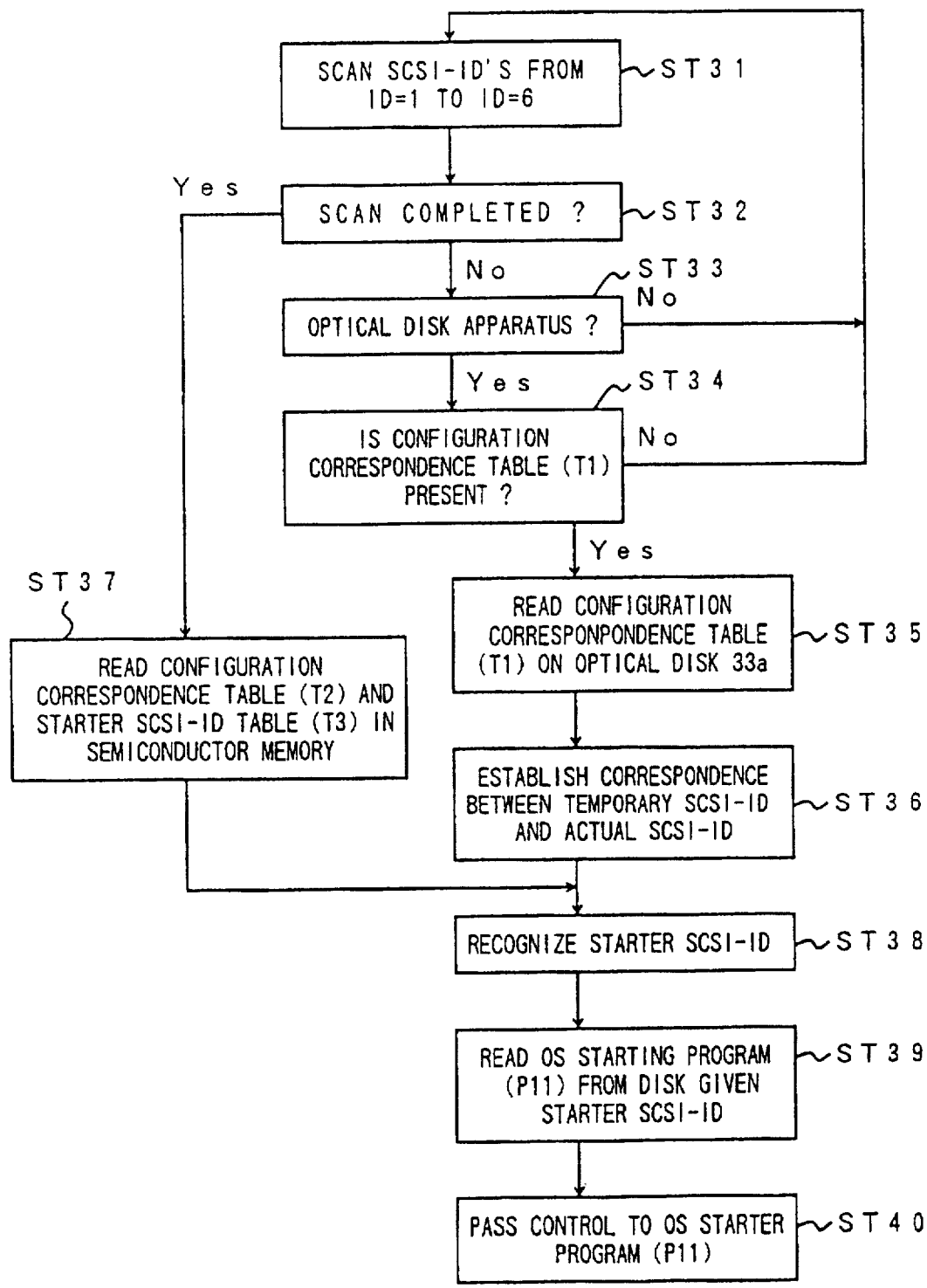
FIG. 10 is a flow chart of operations of a boot program of FIG. 9.

FIG. 10 shows a flow chart of operations of the boot program of FIG. 9. Assuming that the optical disk 33a (33b) is used, the computer system 21, once activated, sequentially scans a range of SCSI-ID's from ID=1 through 6, in order to recognize which of the optical disk apparatuses 33 is connected to the system (ST31). While the scanning is proceeding (ST32), the system determines whether or not the optical disk apparatus is present in the system (ST33) and determines, if it is found that the optical disk is present, whether or not there is a configuration correspondence table T1 (ST34), the last process being repeated until the determination is given that such a table is present.

When it is determined that the table T1 is present, the configuration correspondence table T1 on the optical disk 33a (33b) is read (ST35). Subsequently, the correspondence between a temporary SCSI-ID and an actual SCSI-ID is prescribed (ST36).

When the above scanning is completed, the configuration correspondence table T2 and the starter SCSI-ID table T3 in the semiconductor memory 35 are read (ST37). When the SCSI-ID correspondence is prescribed in ST36 and the tables T2 and T3 are read from the semiconductor memory 35, the starter SCSI-ID is determined (ST38) and the correspondence establishing means P3 establishes the correspondence between the physical drives and the logical drives so that the operating environment is automatically adjusted.

The boot program then reads the OS starting program P11 (ST39) from the optical disk inserted in the optical disk apparatus bearing the proper starter SCSI-ID (in this case, the optical disk 33a (33b) of the optical disk apparatus 33,) and transfers control to this OS starting program P11 (ST40).

The above can be summarized in this way as below. We assume that the correspondence between the physical drives and the logical drives is in an "a" state when a user A works with a personal computer shared by a plurality of users, each using his or her own optical disk. Since a "b" state of correspondence between the physical drives and the logical drives is recorded on the optical disk (33a (33b)) owned by a user B, the computer 32 reads the correspondence table b so that the operating environment of the computer may be automatically adjusted to reflect the "b" state. It is thus possible to realize an environment desired by each user without causing unnecessary trouble to the user.

The case where the optical disk 33c is used will now be briefly described. The function of the parameter setting means P4 is executed upon activation of the program P5 such as an OS or an application residing on the optical disk 33c; the parameter in the program P5 is then made to fit the operating environment of the computer equipment unit 32.

In other words, when the user B uses the optical disk 33c, the computer environment "a" is read before the program is executed so that the parameters in the optical disk 33c are made to fit the environment "a" automatically. That is, the program can be executed on the computer 32 without causing, to the user B, excessive trouble of adjusting the computer equipment unit before execution of the program.

Figure 11:
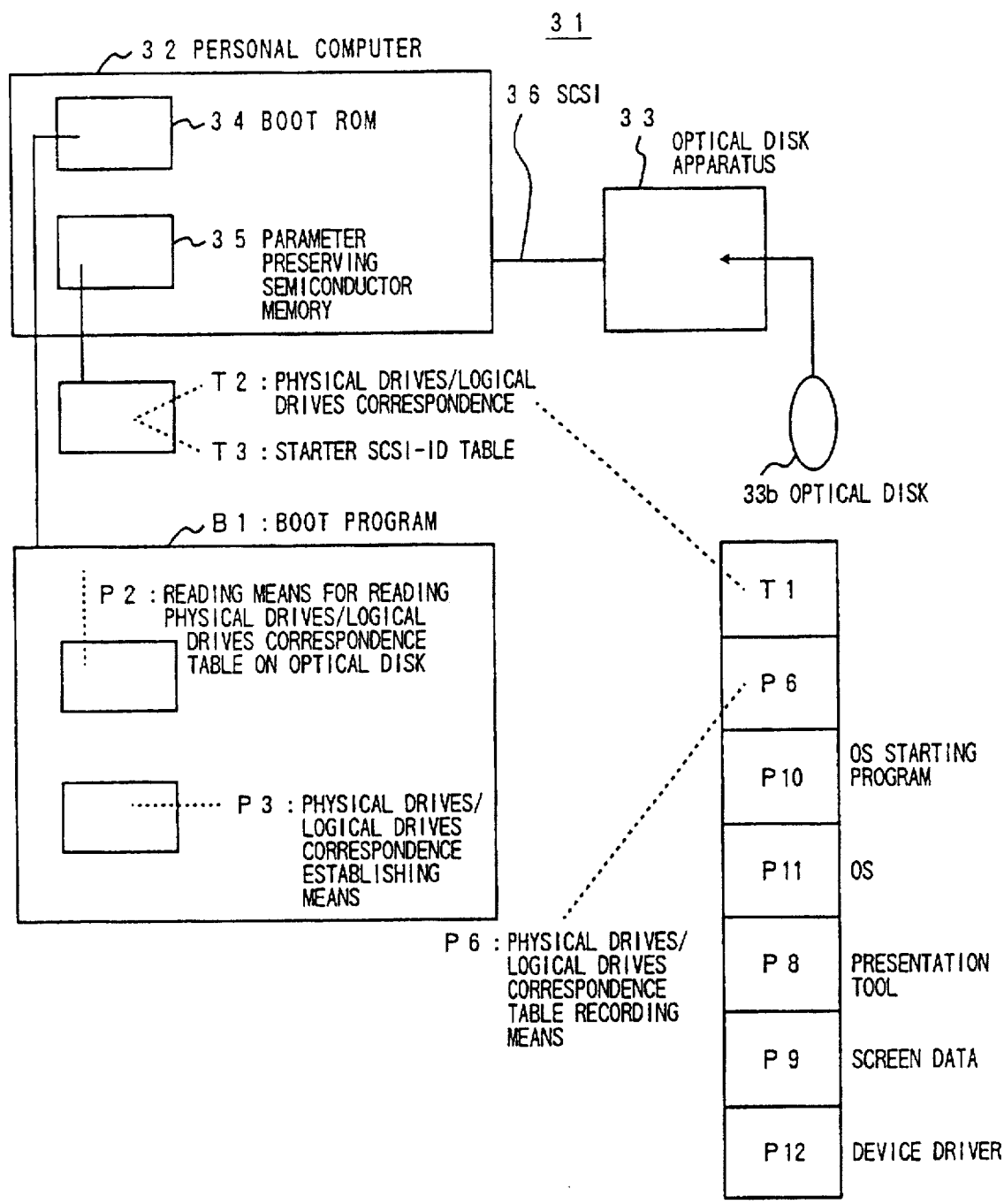
FIG. 11 illustrates a configuration of an application of the first embodiment.

FIG. 11 illustrates a configuration of an application of the first embodiment; and FIG. 12 shows a content of the table T1 of FIG. 11. The computer system 31 of FIG. 11 is the same as that of FIG. 9; and the optical disk 33 is connected to a computer equipment unit comprising the personal computer 32 via a SCSI 36. It is assumed here that the optical disk 33b is used, wherein the correspondence table T1, the correspondence recording means P6, the OS starting program P10, the OS (P11), the presentation tool P8, the screen data P9 and the device driver P12 are recorded.

As shown in FIG. 12, the correspondence table T1 stores the correspondence between drive names (D, E, F), drive attributes (work drive, starter drive), and drive types (temporary ID indicated as SCSI-A or -B). A temporary ID merely indicates whether a SCSI-ID is assigned to a plurality of logical drives or to a single logical drive. FIG. 12 shows that one SCSI-ID is assigned to the drives E and F and that another SCSI-ID is assigned to the drive D.

The operations of the boot program in the computer system 31 of FIG. 11 are as shown in FIG. 10. A description will now be given of the presentation tool.

FIG. 13 is a flow chart of the operations of the presentation tool of FIG. 11. First, the optical disk apparatus 33 is turned on (ST41) and the optical disk 33b is inserted (ST42). Then the personal computer 32 is turned on (ST43) and the boot program B1 in the boot ROM 34 is started (ST44), as described along with FIG. 10. The drive having the SCSI-ID=1 assigned thereto is checked (ST45). When that drive is not connected, the drive having the SCSI-ID=2 assigned thereto is checked (ST46).

The boot program B1 then reads, from the optical disk 33b, the correspondence table T1 specifying the correspondence between the physical drives and the logical drives (ST47), whereupon the temporary SCSI-ID's and the actual SCSI-ID's are made to correspond to each other (ST48). That is, the ID for the drive having the attribute of a "starter drive" according to the table of FIG. 12 is designated as the current ID. For example, the SCSI-B is designated as the SCSI-2 and the SCSI-A is made to correspond to the SCSI-1 so that the operating environment of the personal computer 32 is automatically adjusted according to the table of FIG. 12.

In the present case, it is recognized (ST49) that the starter SCSI-ID is 2 and that the logical drive name thereof is E.

The boot program then reads the OS starting program P10 written on the optical disk 33b and transfers control thereto (ST50).

Subsequently, the OS starting program P10 reads the OS (P11) from the optical disk 33b (ST51) as well as reading the device driver P12 from the logical drive E (ST52), so that the OS (P11) is started (ST53).

The OS also reads the presentation tool P8 from the optical disk 33b (ST54) and allows the same to begin its operations (ST55). The screen data P9 is read from the logical drive E and displayed on a display apparatus (not shown in the figures) until five screens have been shown (ST56–ST58). The presentation is terminated after five screens.

Thus, the operating environment of the personal computer can be automatically adjusted according to the configuration table T1 stored in the optical disk 33b, so that an user have only to turn the power switch on and is not required to perform any complicated operations.

Figure 14:
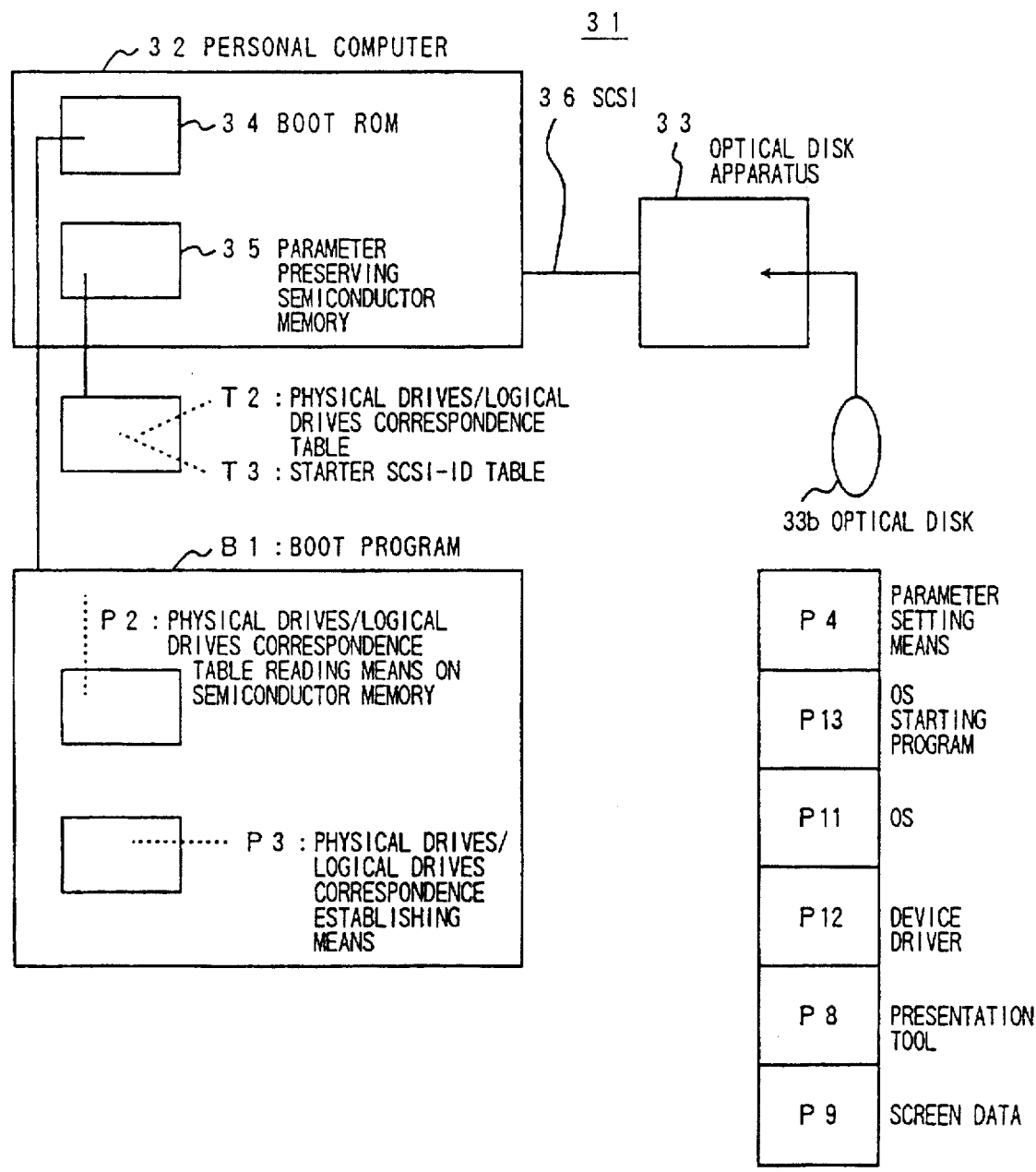
FIG. 14 illustrates a configuration of another application of the first embodiment.

FIG. 14 illustrates a configuration of another application of the first embodiment. While the FIG. 11 configuration allows the operating environment of the personal computer 32 to be modified as desired by the user, FIG. 14 configuration does not allow the operating environment of the personal computer to be modified but instead causes the program, such as an application program or an OS, to fit the operating environment of the personal computer 32.

The computer system 31 of FIG. 14 is essentially the same as that of the basic configuration shown in FIG. 9. The boot ROM 34 in the personal computer 32 of this system stores: the program P7 embodying the reading means for reading the correspondence table stored in the semiconductor memory 35 and specifying the correspondence between the physical drives and the logical drives; and the program P3 embodying the correspondence establishing means.

The semiconductor memory 35 stores the correspondence table specifying the correspondence between the physical drives and the logical drives, and the starter SCSI-ID table T3.

The optical disk 33c used in this application stores the parameter setting means P4, the OS starting program P13, the OS (P11), the device driver P12, the presentation tool P8 and the screen data P9.

FIG. 15 is a functional block diagram of the OS of FIG. 14 and specifically shows the operations of the OS starting program P13, which storing program comprises an OS controlling part 41, a memory part 42, a memory management part 43, a command processing part 44 and a file management part 45. The personal computer 32, after confirming the logical drive name of the disk storing the program itself, allows the OS controlling part 41 to change the logical drive name stored in the memory part 42 for storing the name of the drive into which the device driver of the OS (P11) is loaded, in such a manner as to fit the operating environment of the personal computer 32. This memory part 42 is managed by the memory management part 43. The OS controlling part 41 controls the command processing part 44 and the file management part 45.

FIG. 16 is a functional block diagram of the presentation tool of FIG. 14 and specifically shows the operations of the parameter setting means P4, which means is stored in the optical disk 33c and comprises a presentation controller 46, a memory part 47 for storing the name of the drive into which the data is loaded, a screen data reading part 48, a screen display part 49 and a user command interpreting part 50.

This parameter setting means P4 is activated before the presentation tool P8 is started, so as to change the drive name stored in the memory part 47 for storing the drive name of the drive, into which the data in the presentation tool P8 is loaded. The presentation tool 46 controls the screen data reading part 48, the screen display part 49 and the user command interpreting part 50.

Figure 17:
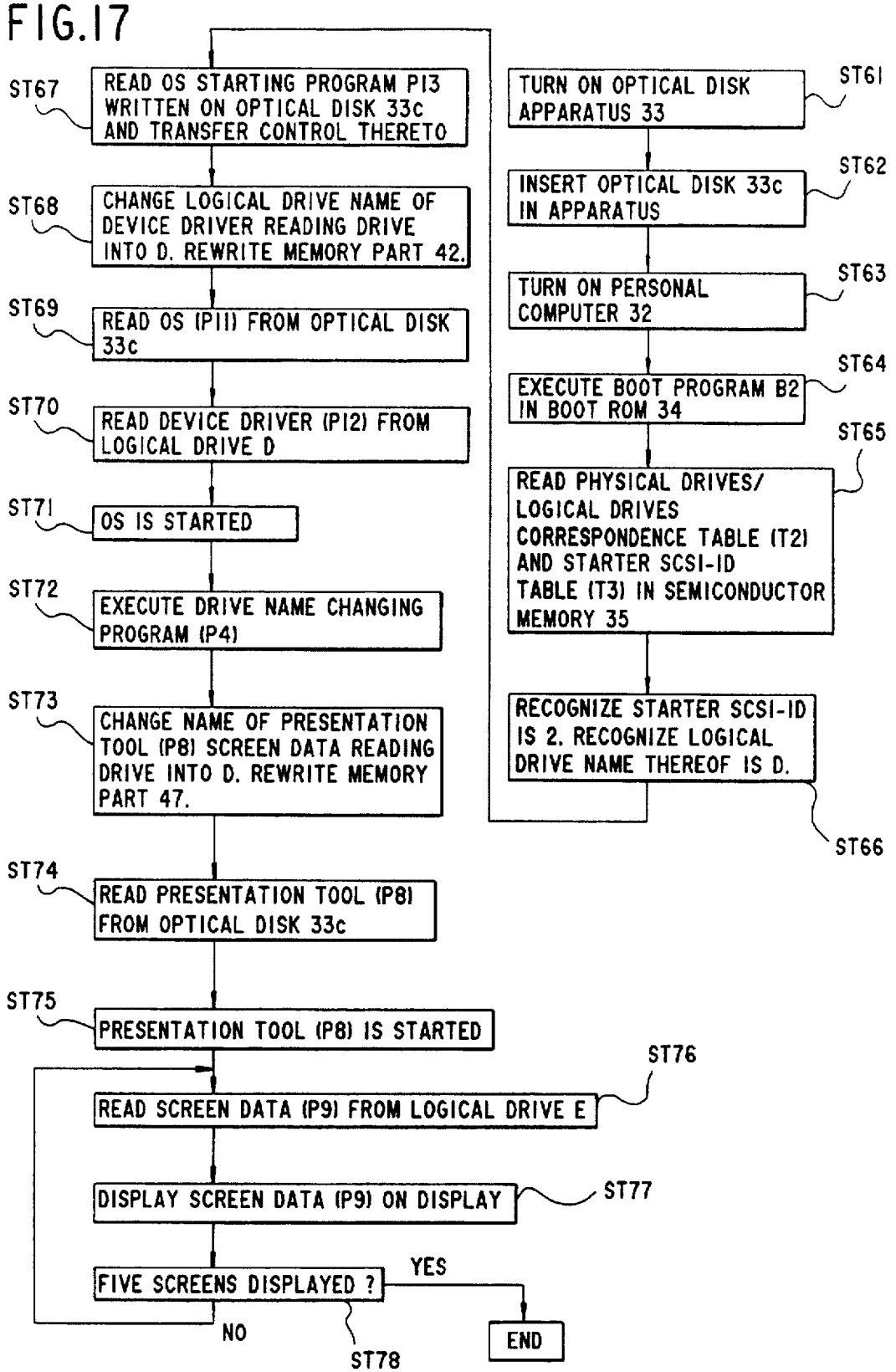
FIG. 17 is a flow chart of the presentation tool of FIG. 14.

FIG. 17 is a flow chart of the operations of the presentation tool of FIG. 14. In FIG. 17, as the optical disk apparatus 33 is turned on and the optical disk 33c is inserted (ST61, ST62), the personal computer 32 is turned on and the boot program B2 within the boot ROM 34 is executed (ST63, ST64).

This causes the correspondence table T2 and the starter SCSI-ID table T3 in the semiconductor memory 35 to be read (ST65). As it is found that the starter SCSI-ID is 2, the logical drive name for that ID is recognized to be D (ST66, see FIG. 12). Then, the OS starting program P13 written in the optical disk 33c is read and is given control (ST67).

The content of the memory part 42, which memory part is located in the personal computer 32 and is provided for storing the name of the drive into which the device driver is loaded, is modified such that the logical drive name of the drive into which the device driver is loaded is changed to D (ST68).

The OS (P11) is then read from the optical disk 33c (ST69) and the OS is started after the device driver P12 is read from the logical drive D (ST70, ST71).

When the OS is started, the drive name changing program (parameter setting means) P4 is executed (ST72). This causes the content of the memory part 47 for storing the drive name of the drive, into which drive the data is loaded, to be rewritten (ST73) so that the drive for reading the screen data of the presentation tool P8 is changed to the drive D. The presentation tool is then read from the optical disk 33c and the operations thereof are started (ST74, ST75).

When the presentation tool P8 is started, the screen data P9 is read from the logical drive E (ST76) and the screen data P9 is then displayed on the display apparatus (ST77). This process is repeated until five screens have been displayed (ST78). The presentation tool P8 is terminated after five screens.

Thus, the first embodiment makes it possible for a user to carry with him a computer operating environment for his own use in the form of a single optical disk, thereby substantially increasing convenience to the user. The user also benefits from a reduced load required when using a computer and from simplification of manual tasks in the operating of this computer.

Figure 18:
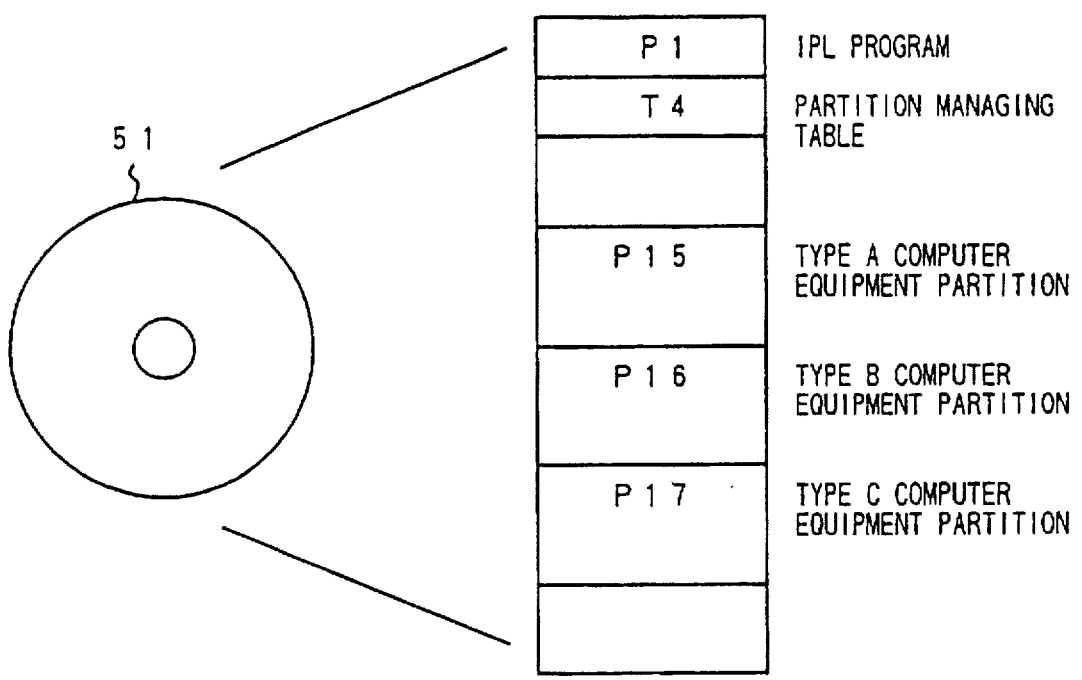
FIG. 18 illustrates a configuration of a second embodiment of the present invention.

FIG. 18 illustrates a configuration of a second embodiment of the present invention. FIG. 18 shows a 3.5 inch magneto-optic disk 51 representing a removable storage medium. Portions of the disk provided with an IPL program P1 and a partition management table T4 are equipped with a program by means of which to determine the computer equipment being used (for example, a personal computer) in the computer system, and are provided also with a correspondence table provided for the purpose of transferring control to the partition corresponding to the equipment type that is to be used. The determination of the equipment type in this case is performed by referring to the type ID stored in the ROM of the connected computer equipment unit.

This correspondence table functions such that it transfers control to a first partition P15 in the case of a type A computer equipment unit, transfers control to a second partition P16 in the case of a computer equipment unit B and transfers control to a third partition P17 in the case of a computer equipment unit C. The information relevant to this control is stored in the expanded memory. In a conventional computer system, the system stored in an internal hard disk is started from the internal hard disk unless some measure is taken. Therefore, a menu-driven interactive selection is provided in the IPL of the hard disk for the user to select the starter drive. This selection is simple in that the user simply selects one of the drive unit numbers 0–4.

The computer environment information relating to the computer equipment of the types A–C connectable to the magneto-optic disk 51 is made portable by storing the information on the partitions P15–P17 of the disk, respectively. That is, the IPL is provided with environment information such as: drive information including the kinds of drives (floppy disk drive, hard disk drive, magneto-optic disk drive or a RAM drive) and the respective unit numbers thereof to be set when using a plurality of drives of the same kind; and the setting information of the expanded memory (for example, the capacity of the RAM disk). Some types of computer equipment store the above information in a CMOS within the equipment unit; this makes it possible to effect a user-specific environment setting by rewriting the CMOS at the time of starting the IPL.

When starting the computer equipment unit connected to the magneto-optic disk of the above configuration, the system environment stored in the disk is automatically transferred to the computer equipment unit so that the user can use the computer equipment unit, without being bothered by complicated operations.

FIG. 19 shows contents of another correspondence table of FIG. 18. It is assumed here that the disk is provided with environment of operating environment tables as well as with the correspondence tables specifying the correspondence between the computer type and the operating environment information, and that the environment setting is effected automatically at the time of start-up.

FIG. 19 shows, as an example, that computer equipment units of three types A–C are provided, and the environment information thereof is stored such that one of the following drives is given the logical drive identification A–I: a floppy disk FP, a hard disk HD, a magneto-optic disk MO and a RAM disk RAM.

The IPL of the magneto-optic disk 51 determines the type of personal computer that the disk itself corresponds to. When it is determined that the disk corresponds to the type A computer equipment unit, the operating environment information corresponding to that particular type, which information is as shown in FIG. 19, is read and transferred to the computer equipment unit in use. When it is determined that it is the type B computer equipment unit that the disk belongs to, the same operation is carried out relative to the information corresponding to that particular equipment type, and so on. In the present example, an arrangement is adopted in which the data label for the type A computer equipment is referred to by the IPL in the case of the type A computer equipment.

This way, a single disk can automatically be made applicable to multiple types of personal computers, and it is possible for a user to carry with him a personal computer operating environment.

Figure 20:
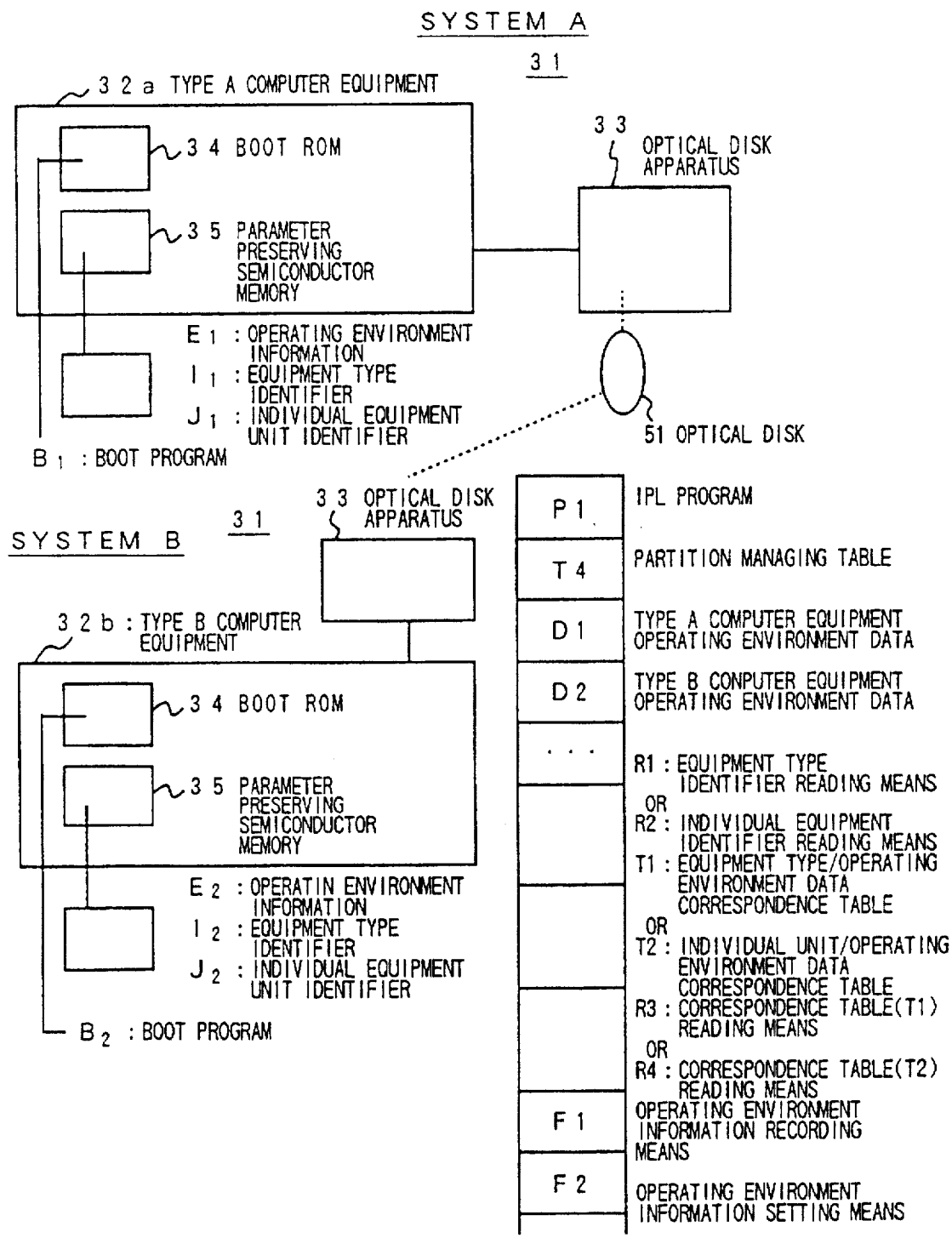
FIG. 20 illustrates a configuration of a computer system according to the second embodiment.

FIG. 20 illustrates a configuration of the computer system according to the second embodiment. The components that are the same as components shown in FIG. 9 are given the same reference numerals figure to figure. In FIG. 20, the computer system 31 includes the system A, where the optical disk apparatus 33 is connected to computer equipment units 32a and 32b, and includes the system B of similar configuration. The system C based on the type C computer equipment unit, the partitions for which system is as shown in FIG. 18, is not considered here, and therefore, the magneto-optic disk 51 is not provided with an expanded memory partition for the type C computer equipment. It is to be noted again here that while FIG. 18 shows only one kind of drive environment information and the expanded memory setting information being stored on the disk. FIG. 19 shows a plurality of kinds of information stored on the disk.

As described before, the boot ROM 34 within the computer equipment units 32 stores the boot program B1, in the case of the system A, and the boot program B2, in the case of the system B.

The semiconductor memory 35 for storing the parameters stores an operating environment information E1 in the system A (E2, in the system B), an equipment type identifier I1 (I2, in the system B) and an individual unit identifier J1 (J2, in the system B).

The magneto-optic disk 51 stores the IPL program P1 and the partition management table T4. It also stores, in the partition P15 (FIG. 18), operating environment data D1 for the type A computer equipment, and stores, in the partition P16 (FIG. 18), operating environment data D2 for the type B computer equipment, in the same manner as shown in FIG. 18. Further, the disk stores the following: operating environment information recording means F1; operating environment information setting means F2; an equipment type identifier reading means R1 or an individual unit identifier reading means R2; the correspondence table T1 specifying the correspondence of the equipment-type-specific operating environment data or the correspondence table T2 specifying the correspondence of the individual-unit-specific operating environment data; and a reading means R3 for reading the correspondence table T1 or a reading means R4 for reading the correspondence table T2.

Figure 21:
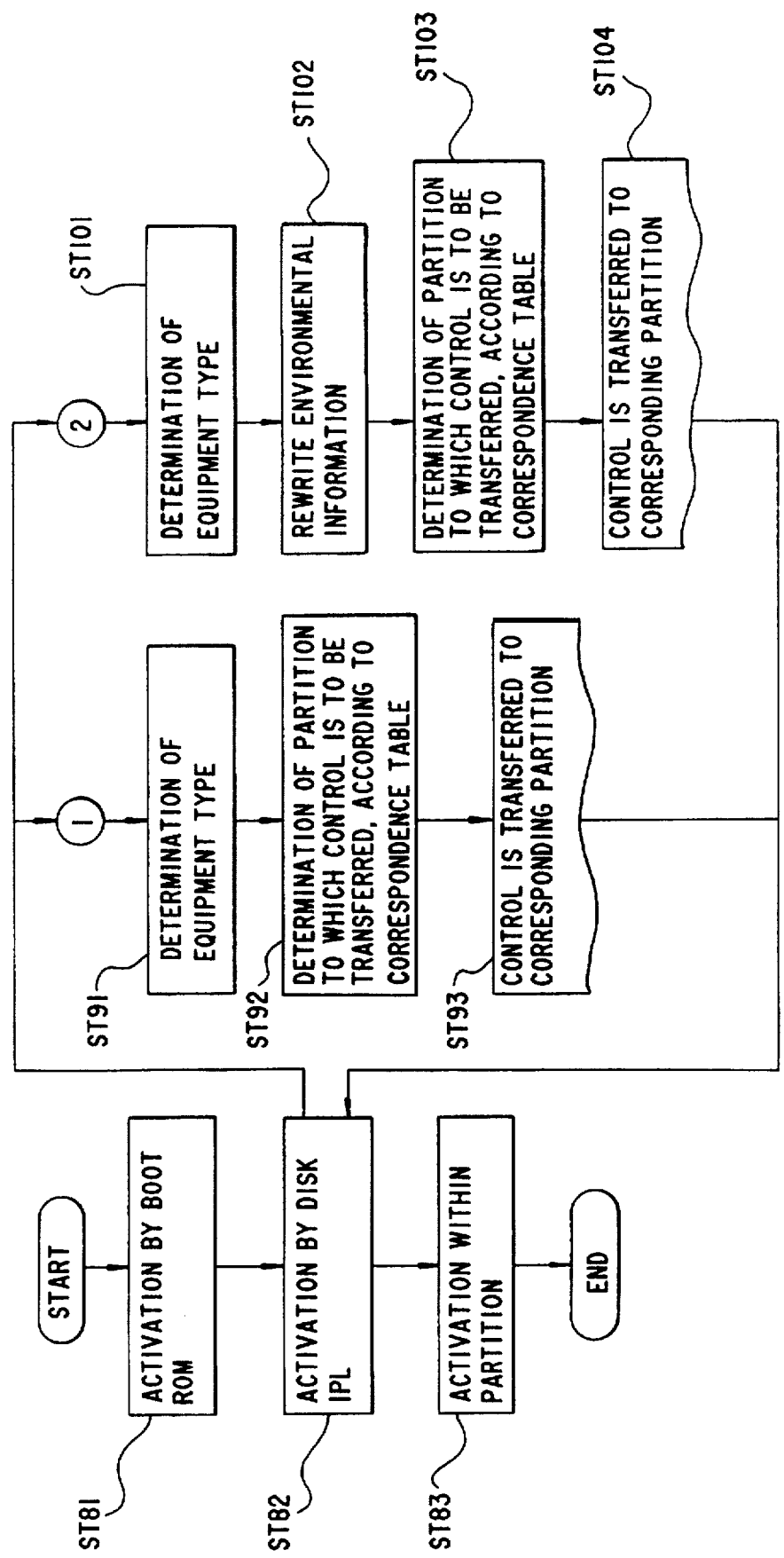
FIG. 21 is a flow chart of operations of FIG. 20.

FIG. 21 is a flow chart of the operations of FIG. 20. In FIG. 21, a main flow of operations is such that, when the computer equipment units 32a or 32b (meaning either of the equipment type A or the equipment type B) as well as the optical disk apparatus 33 are turned on, the boot ROM 34 within the computer equipment unit 32a (32b) is activated (ST81) so as to carry out a prescribed processes (such as those shown in FIG. 11), after which the IPL program P1 on the magneto-optic disk 51 is read and started (ST82).

The IPL program P1 causes either the partition D1 or D2 to be activated (ST83).

In ST82, one of the processes ① or ② is executed. In the process ①, the equipment type of the computer equipment unit 32a (32b) is determined (ST91) by means of the IPL program P1 and the partition management table T4, and the correspondence table T1 or T2 is referred to in determining the partition to which control is to be transferred (ST92). Thereafter, control is transferred to the proper partition D1 or D2 (ST93).

In the process ②, an equipment type determination similar to the one in ST91 is made (ST101) and the operating environment information E1 stored in the semiconductor memory 35 is rewritten (ST102) corresponding to the environment information required by the equipment type. A determination similar to the one in ST92 is made by referring to the correspondence table T1 or T2 (ST103), and control is transferred to the proper partition as in ST94 (ST104).

Figure 22:
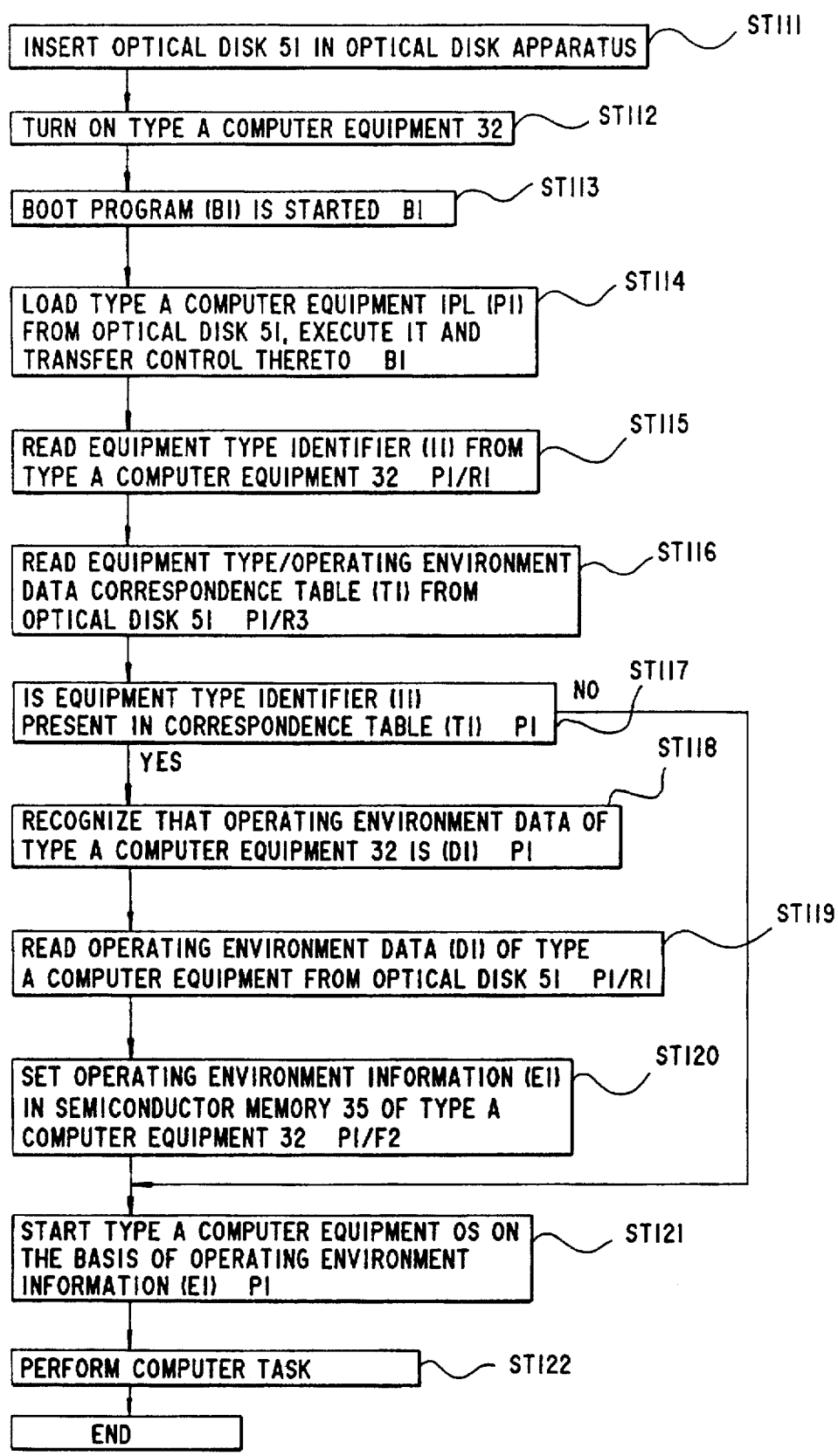
FIG. 22 is a flow chart of a rewriting process of environment information of FIG. 21.

FIG. 22 is a flow chart of the process of rewriting the environment information of FIG. 21 and details the above process ②. In FIG. 22, the optical disk (magneto-optic disk) 51 is inserted in the optical disk apparatus 33 and the type A computer equipment unit 32a is turned on (ST111, ST112). This causes the boot program B1 to be activated (ST113). The boot program then loads the IPL program P1 for the type A computer equipment from the optical disk 51, executes it and transfers control thereto (ST114).

The IPL first reads the equipment type identifier I1 from the semiconductor memory 35 of the type A computer equipment unit 32a (ST115), and reads the equipment-type/operating-environment data correspondence table T1 from the optical disk 51 (ST116). The IPL then determines whether or not the equipment type identifier I1 is present in the correspondence table T1 (ST117) and recognizes, if it is present, that the operating environment data for the type A computer equipment unit 32a is D1 (ST118).

Subsequently, the IPL reads the operating environment data D1 for the type A computer equipment from the optical disk 51 (ST119) and rewrites the operating environment information E1 stored in the semiconductor memory 35 of the type A computer equipment unit 32a (ST120).

When it is determined in ST117 that the equipment type identifier I7 is not present in the correspondence table T1, or when the operating environment information is rewritten in ST120, the OS for the type A computer equipment is activated by the IPL program on the basis of the operating environment information E1. The computer task can then be performed on an application program designed for that particular equipment type (ST121, ST122).

This way, the magneto-optic disk 51 accommodates the information corresponding to the application programs designed for each of the equipment types (the computer equipment types A and B), and an opportunity is given at the time of start-up to select and obtain the necessary information. For example, the user is able to select either of the two kinds of information A or B by means of a cursor. The selection of A may be preset so as to prompt inputs of the settings of the logical drive information and of the expanded memory for a WINDOWS software so that a WINDOWS spreadsheet may be run. The selection of B may be preset so as to prompt inputs of the settings of the logical drive information and of the expanded memory for a presentation software so that a presentation may be performed.

A description will now be given of a procedure to preserve the operating environment information stored, for example, in the CMOS, which information had been effective prior to the start-up from the magneto-optic disk of the computer equipment unit according to the second embodiment. Since the present invention allows the operating information to be rewritten, some measure must be taken to preserve the original information.

The operating environment of the computer equipment being used, which environment has been read from the CMOS, is recorded in a data preserving area reserved in the IPL program. Alternatively, this environment data may be recorded in a free area on the disk. Subsequently, when the computer equipment unit is released from use, the data preserved in the IPL or in the free area may be again stored in the CMOS and allowed to remain there until the next start-up. It is essential that this process be stored in a partition on the magneto-optic disk 51, in the form of a script of commands used by the OS in question. Alternatively, a power OFF command may include the function of effecting the same process.

The medium used in the above embodiment is not limited to a 3.5 inch magneto-optic disk. It can be any removable and portable large storage medium employing a logical format capable of multi-partition.

The correspondence table specifying the correspondence between the equipment type and the system can be of any form or can be substituted by a different configuration. For example, it is possible, by designating the equipment type ID as a start-up flag, to directly transfers control to the partition corresponding to the proper equipment type without referring to the correspondence table.

While, in the second embodiment, the logical drive information and the expanded memory information, which are particularly important, are taken as examples of computer equipment environment that should be portable, the environments to be made portable are not limited to these kinds of information but can be any combination of environment information.

Figure 23:
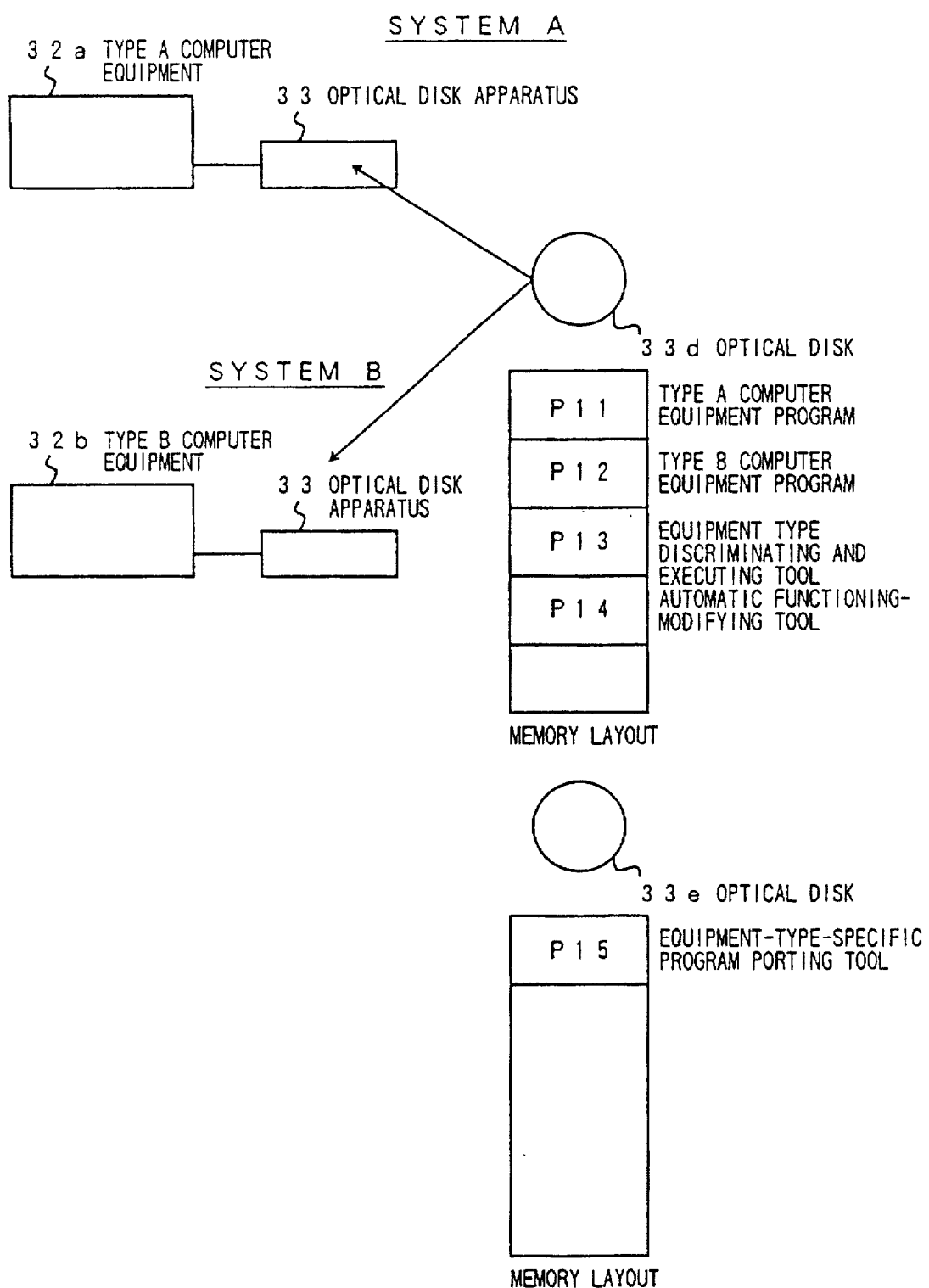
FIG. 23 illustrates a configuration of a third embodiment of the present invention.

FIG. 23 illustrates a configuration of a third embodiment of the present invention. Components that are the same as components in FIG. 9 are given the same reference numerals from figure to figure and the descriptions thereof are omitted. As shown in FIG. 23, the system A includes the optical disk apparatus 33 connected to the type A computer equipment 32a, and the system B includes the optical disk apparatus 33 connected to the type B computer equipment 32b which computer equipment comprises software compatible with the type A computer equipment unit 32a.

An optical disk 33d used in the optical disk apparatus 33 stores the program P11 for the type A computer equipment, the program P12 for the type B computer equipment, an equipment type discriminating and executing tool P13 and an automatic function-modifying tool P14. An optical disk 33e stores an equipment-type-specific program porting tool P15.

While FIG. 23 shows two systems A and B, more systems can be accommodated, in which case the optical disk 33d stores the programs for the computer equipment units added to the systems.

Figure 24:
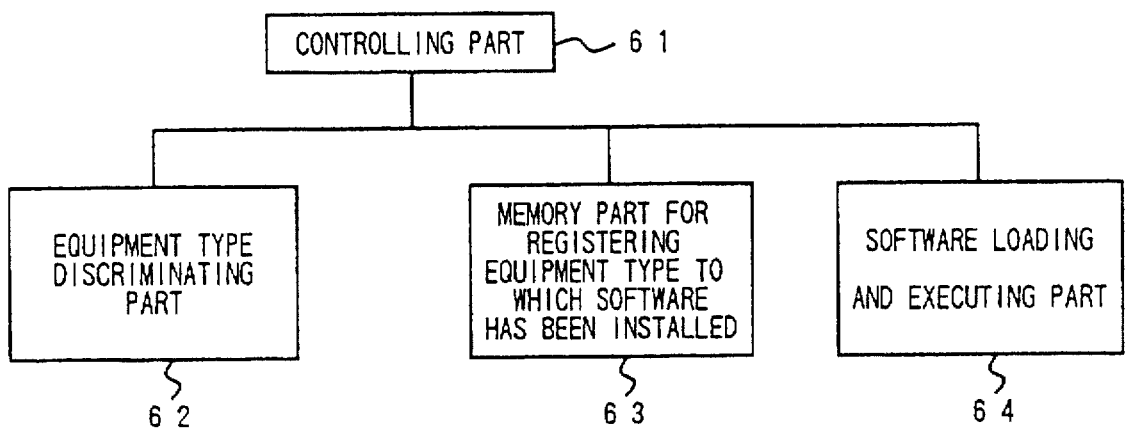
FIG. 24 is a functional block diagram of an equipment type discriminating and executing tool of a computer equipment unit of FIG. 23.

FIG. 24 is a functional block diagram of the equipment type discriminating and executing tool of the computer equipment units of FIG. 23. In FIG. 24, the type A computer equipment unit 32a and the type B computer equipment unit 32b are equipped with an equipment type discriminating part 62, a memory part 63 for registering the equipment type to which the software is already ported and a software loading and executing part 64, which parts are controlled by a controlling part 61. These parts correspond to the equipment type discriminating and executing tool P13 of the optical disk 33d.

Figure 25:
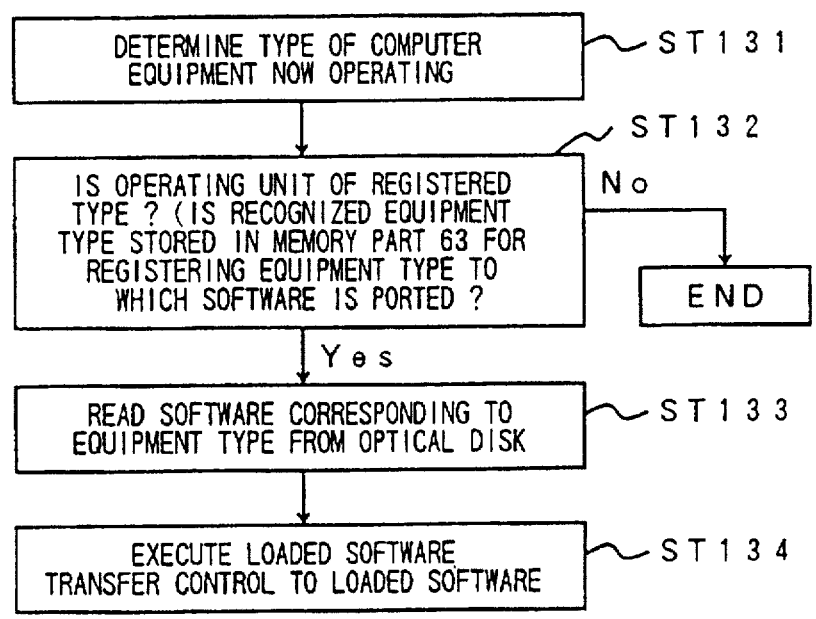
FIG. 25 is a flow chart of operations of FIG. 24.

FIG. 25 is a flow chart of the operations of FIG. 24. In FIG. 25, a first step is to discriminate the type of the computer equipment unit now in use (ST131). A determination is made (ST132) as to whether or not the equipment type is a registered equipment type, in other words, as to whether or not the equipment type name determined in the discrimination process exists in the memory part 63 used for registering equipment types to which the software has been ported. If the equipment type does not exist, the process is terminated. If the equipment type exists therein, the software designed for the equipment type is loaded in from the optical disk 33d to the type A computer equipment unit 33a (ST133). The loaded software is executed and control is transferred to the loaded software (ST134).

Figure 26:
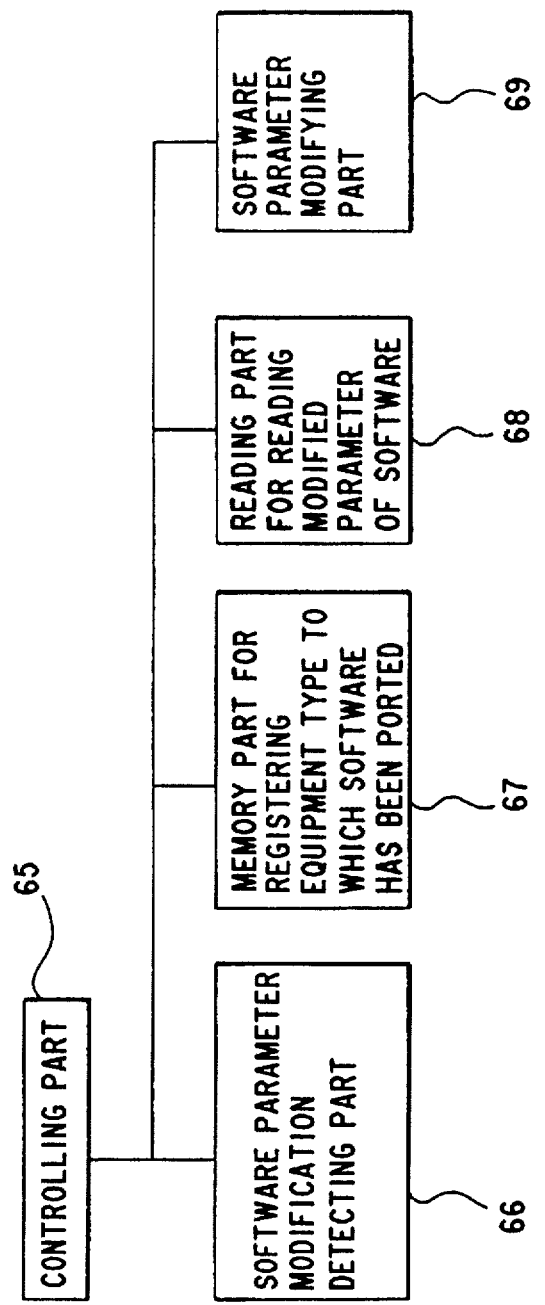
FIG. 26 is a functional block diagram of an automatic function-modifying tool in the computer equipment unit of FIG. 23.
Figure 27:
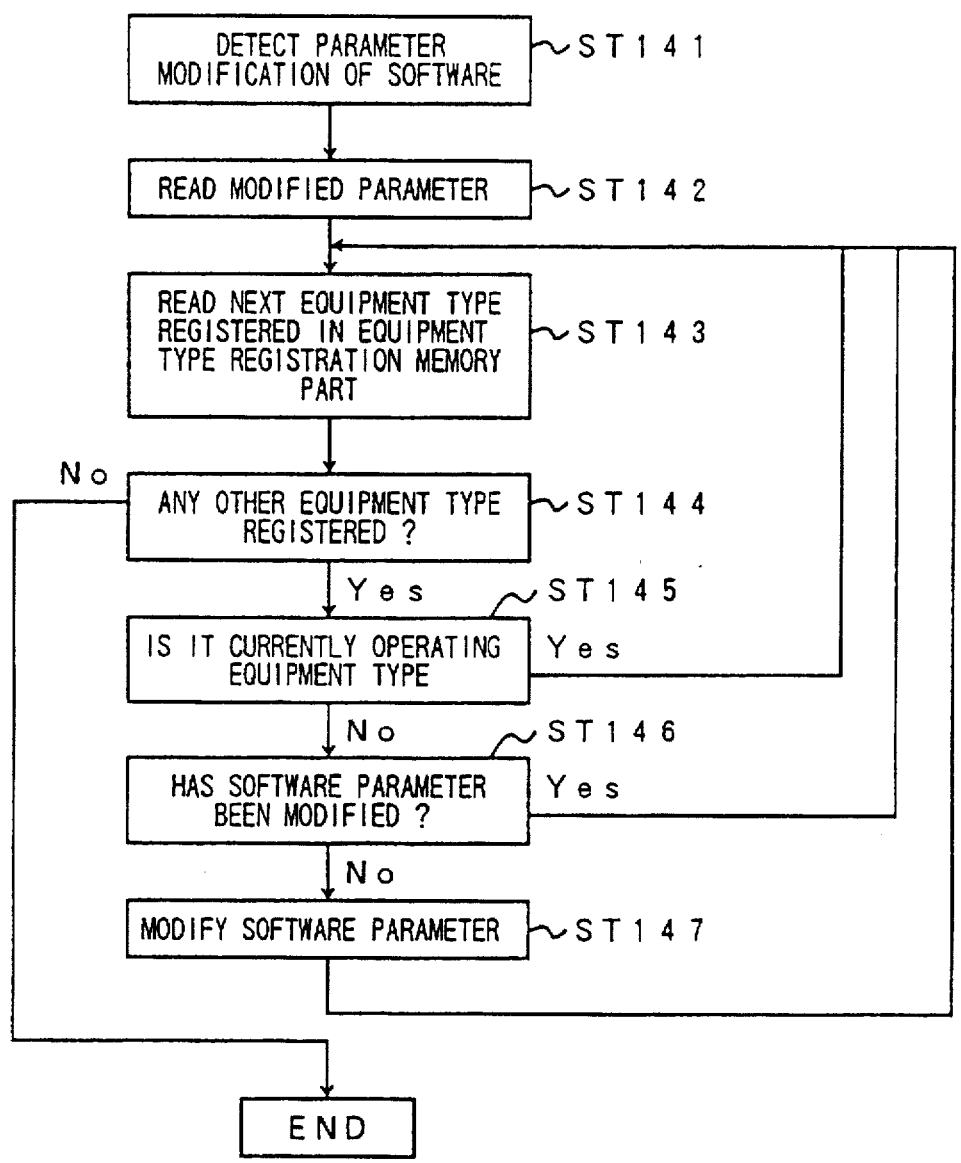
FIG. 27 is a flow chart of operations of FIG. 26.

FIG. 26 is a functional block diagram of the automatic function-modifying tool in the computer equipment units of FIG. 23. In FIG. 27, the type A computer equipment unit 32a and the type B computer equipment unit 32b are equipped with a software parameter modification detecting part 66, a memory part 67 for registering the equipment type to which the software has been ported, a reading part 68 for reading the modified software parameter and a modifying part 69 for modifying the software parameter, which parts are controlled by a controlling part 65.

FIG. 27 is a flow chart of the operations of FIG. 26. In FIG. 27, the type A (B) computer equipment unit 32a (32b) detects a modification of a software parameter by means of a detecting part 66 (ST141) and reads the modified parameter (ST142). Subsequently, the reading part 68 reads the next equipment type from the equipment type registering memory part 67 (ST143).

A determination is then made as to whether or not the registered equipment type exists therein (ST144), and if the registered equipment type does not exist, the process is terminated. If it exists therein, a determination is made as to whether or not the equipment type read is currently in operation (ST145). If it is the equipment type currently in operation, the process returns to ST143. If the read equipment type is not the equipment type currently in operation, a determination is made as to whether or not the software parameter has been modified (ST146), and, if it has been modified, the process returns to ST143. If the software parameters has not been modified, the modifying part 69 modifies the software parameter (ST147) and the system returns to ST143.

It is also possible to employ the optical disk 33e, which stores the equipment-type-specific program porting tool P15, which automatically customizes, when a program designed for one equipment type is customized, the same program designed for another equipment type.

Since, as shown above, a single optical disk accommodates programs corresponding to computer equipment from a plurality of manufacturers, the user can perform his own computer task wherever the computer equipment exists by simply carrying with him such a single optical disk. The user is thus able to perform his own computer tasks even if the required software is not installed in the available computer equipment unit.

Moreover, since the equipment type is automatically discriminated and the software corresponding to that type is executed, the user is not required to select and execute a software corresponding to the equipment type. Moreover, since a customization of a software for one equipment type is automatically followed by a customization of the same software for another equipment type, the user is not required to repeatedly perform the same customizing operation.

Figure 28:
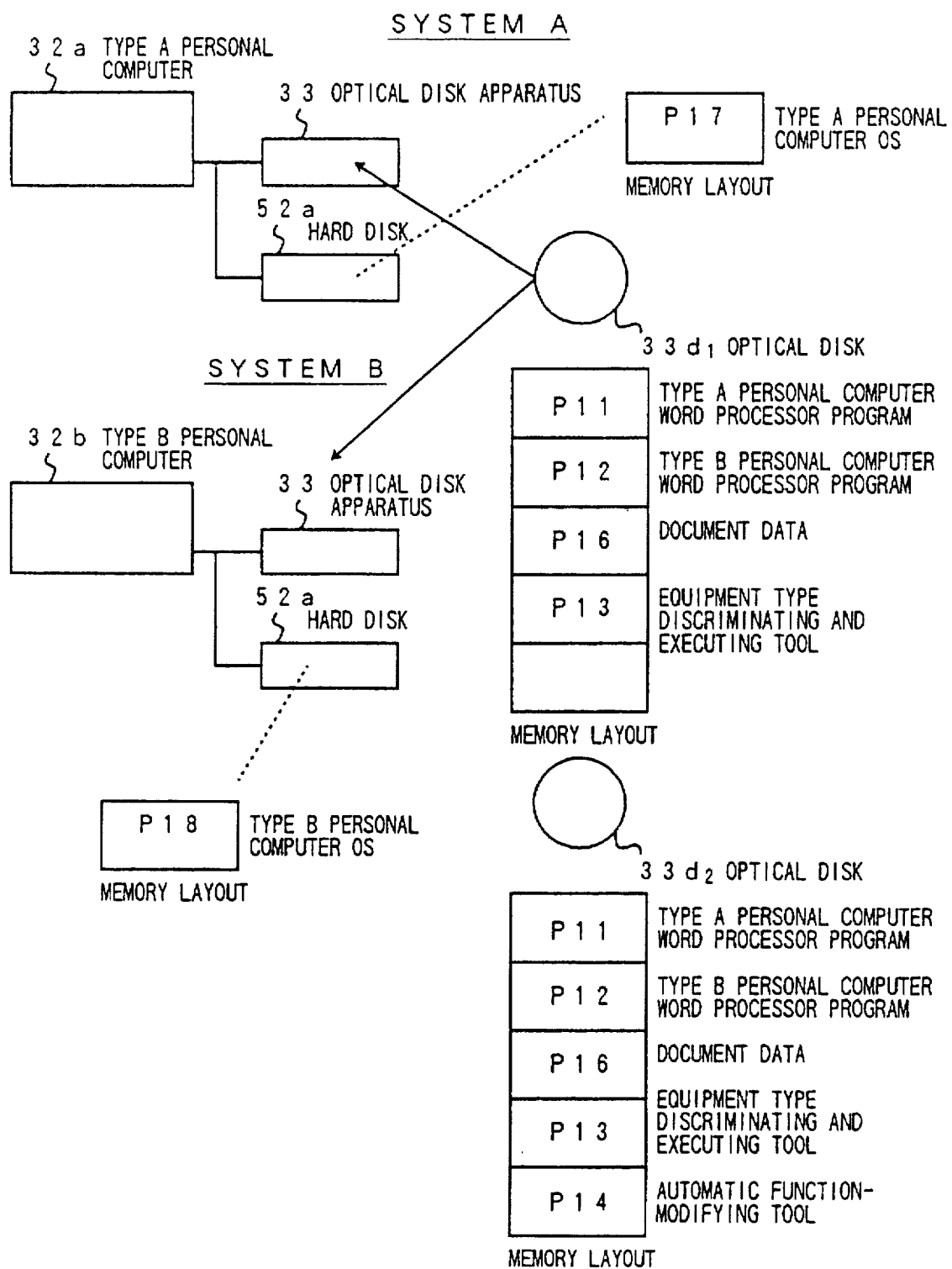
FIG. 28 is a configuration of a first application of the third embodiment.

FIG. 28 illustrates a configuration of a first application of the third embodiment; and FIG. 29 shows a content of a registration memory for the equipment type discriminating and executing tool of FIG. 28. In FIG. 28, the system A includes the optical disk apparatus 33 and a hard disk apparatus 52a connected to the type A personal computer 32a embodying the type A computer equipment. The OS (P17) for the type A personal computer is installed in this hard disk. The system B includes the optical disk apparatus 33 and a hard disk apparatus 52b connected to the type B personal computer 32b embodying the type B computer equipment. The OS (P18) for the type B personal computer is installed in this hard disk.

An optical disk $33d_1$ in this application stores, for example, a word processor program P11 for the type A personal computer, a word processor program P12 for the type B personal computer, a document data P16 and an equipment type discriminating and executing tool P14. An optical disk 33$d_2$ stores, in addition to the above, an automatic function-modifying tool P14.

The registration memory part 63 (FIG. 24) of the type A (B) personal computer 32a (32b) stores the contents such as shown in FIG. 29; that is, the name of the equipment types in which the optical disks 33$d_1$ and 33$d_2$ are respectively used.

Figure 30:
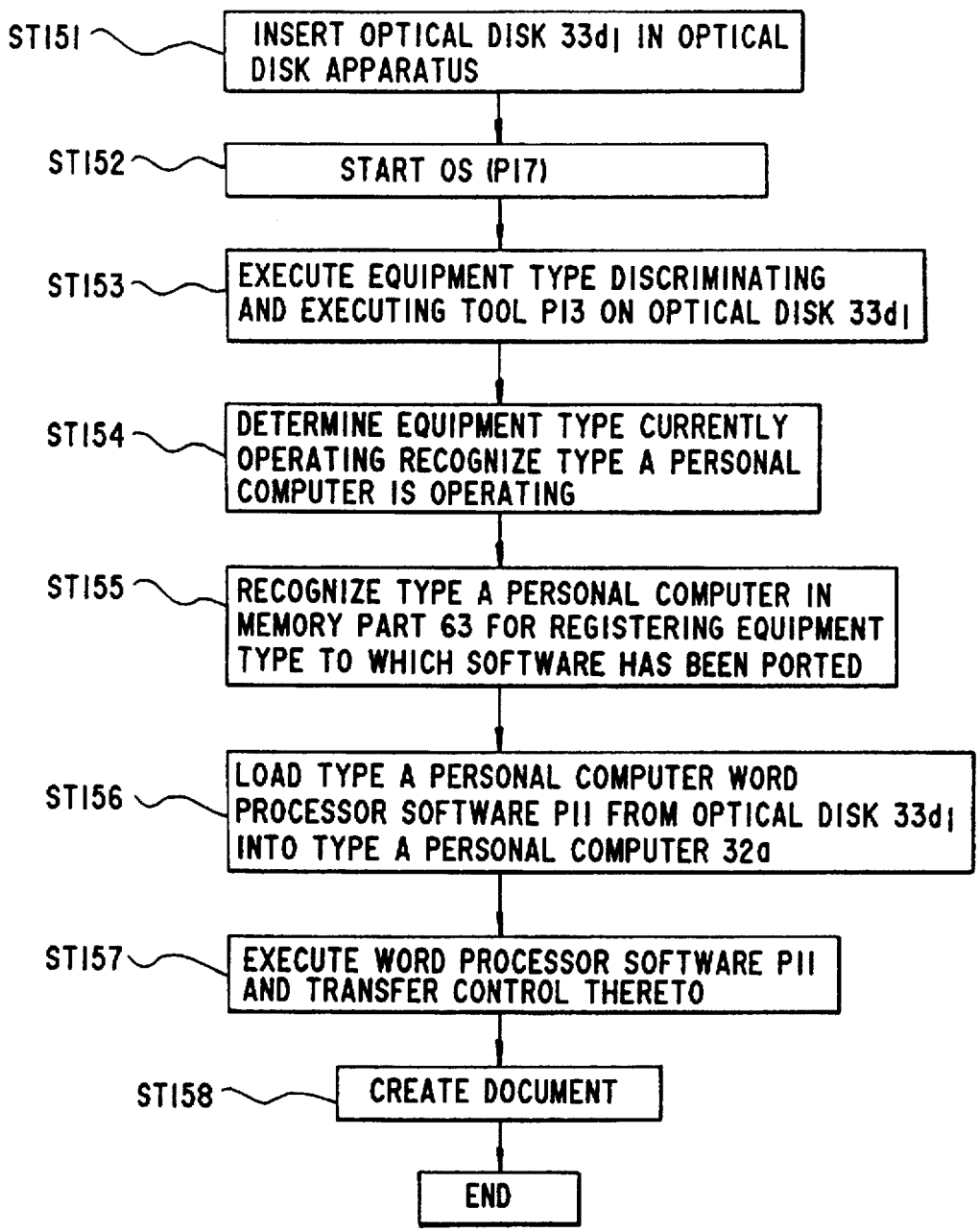
FIG. 30 is a flow chart of operations of FIG. 28.

FIG. 30 is a flow chart of the operations of FIG. 28. In FIG. 30, the optical disk 33$d_1$ is first inserted in the optical disk apparatus 33 (ST151) and the OS (P17) in the hard disk apparatus 52a is then started (ST152). Then, the equipment type discriminating and executing tool P13 stored on the optical disk 33$d_1$ is executed (ST153), whereupon the tool P13 reads the identification code specific to the personal computer type and stored in the ROM of the personal computer 32a, so as to determine the equipment type that is now in operation; the tool P13 finds that the type A personal computer 32a is now operating (ST154).

By referring to the identification code corresponding to the equipment type, the tool P13 determines that the type A personal computer is registered in the memory part 63 for registering equipment types to which the software has been ported (ST155); the tool P13 then loads in the word processor software P11 for type A personal computers from the optical disk 33$d_1$ to the type A personal computer 32a (ST156).

The word processor software P11 is executed and given control (ST157) so that a document may be created (ST158).

When the optical disk 33$d_1$ is inserted in the optical disk apparatus 33 connected to the personal computer 32b, the OS (P18) installed in the hard disk 52b is started. Then the equipment type discriminating and executing tool P13 installed in the optical disk 33$d_1$ is executed. As in the above-described process, the tool P13 reads the identification code from the ROM of the type B personal computer 32b from which the optical disk 33$d_1$ is accessed, and the tool P13 recognizes that it is a type B personal computer 32b that is in operation. Thereafter, the word processor software P12, which software is designed for the type B personal computer having the above-mentioned identification code, and which software is stored on the optical disk 33$d_1$, is selected and loaded into the type B personal computer 32b so as to be executed. By reading the document P16 with this word processor P12, the document P16 created using the type A personal computer 32a may be read for editing in an unmodified manner and stored on the optical disk 33$d_1$.

Thus, by carrying with him a single optical disk 33$d_1$, the user can perform a desired computer task using a plurality of types of personal computers and the document data can be shared by different computers.

Figure 31A:
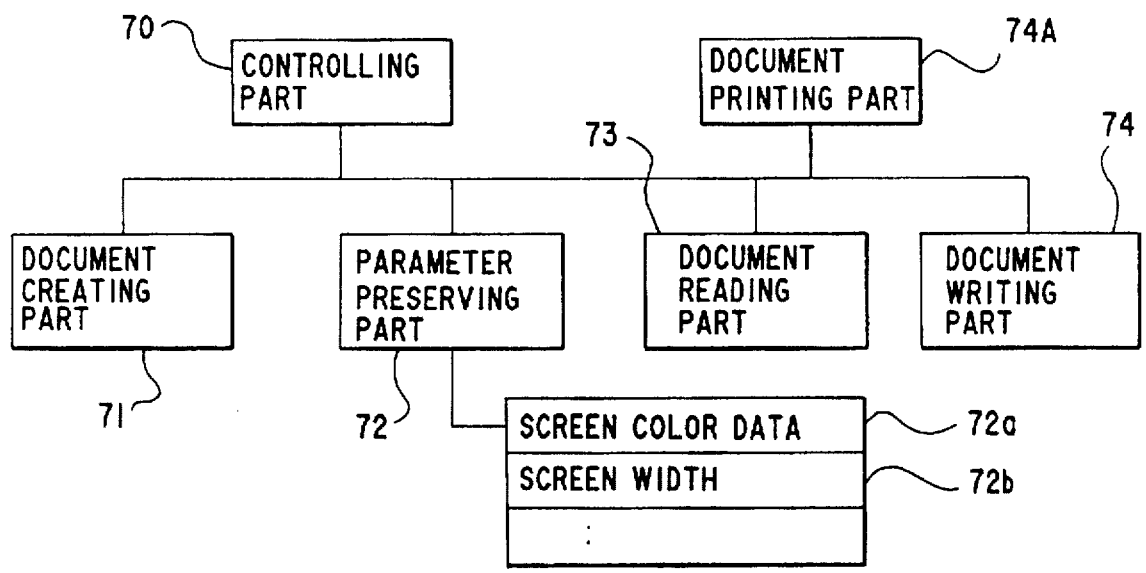
FIG. 31 is a functional block diagram of a word processor software used in FIG. 28.

FIG. 31 shows functional block diagrams of a second application of the third embodiment. The second application of the third embodiment is configured such that the automatic function-modifying tool P14 is stored on the optical disk 33$d_2$ shown in FIG. 28. FIGS. 31(A) and (B) are functional block diagrams of the word processor software pieces for the type A personal computer 32a and the type B personal computer 32b, respectively. In this second application of the third embodiment, a case is shown where the screen color is changed, after the creation of the document, from white characters on the black background to blue characters on the yellow background.

Referring to FIG. 31(A), the type A personal computer 32a is equipped with a document creating part 71, a parameter preserving part 72, which parts are controlled by a controlling part 70. The parameter preserving part 72 stores screen color data 72a and screen width 72b, and other such information. The type A personal computer 32a is also equipped with a document reading part 73, a document writing part 74 and a document printing part 74A.

Figure 31B:
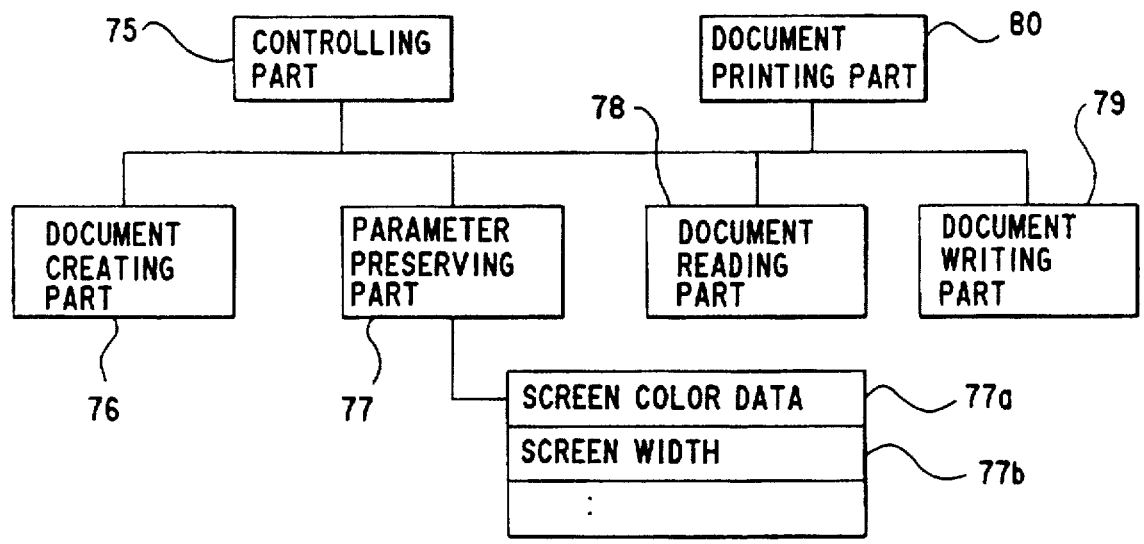

Referring to FIG. 31(B), the type B personal computer 32b, like the type A personal computer 32a, is equipped with a controlling part 75; a document creating part 76; a parameter storing part 77 for storing screen color data 77a, screen width 77b; a document reading part 78; a document writing part 79 and a document printing part 80.

Figure 32:
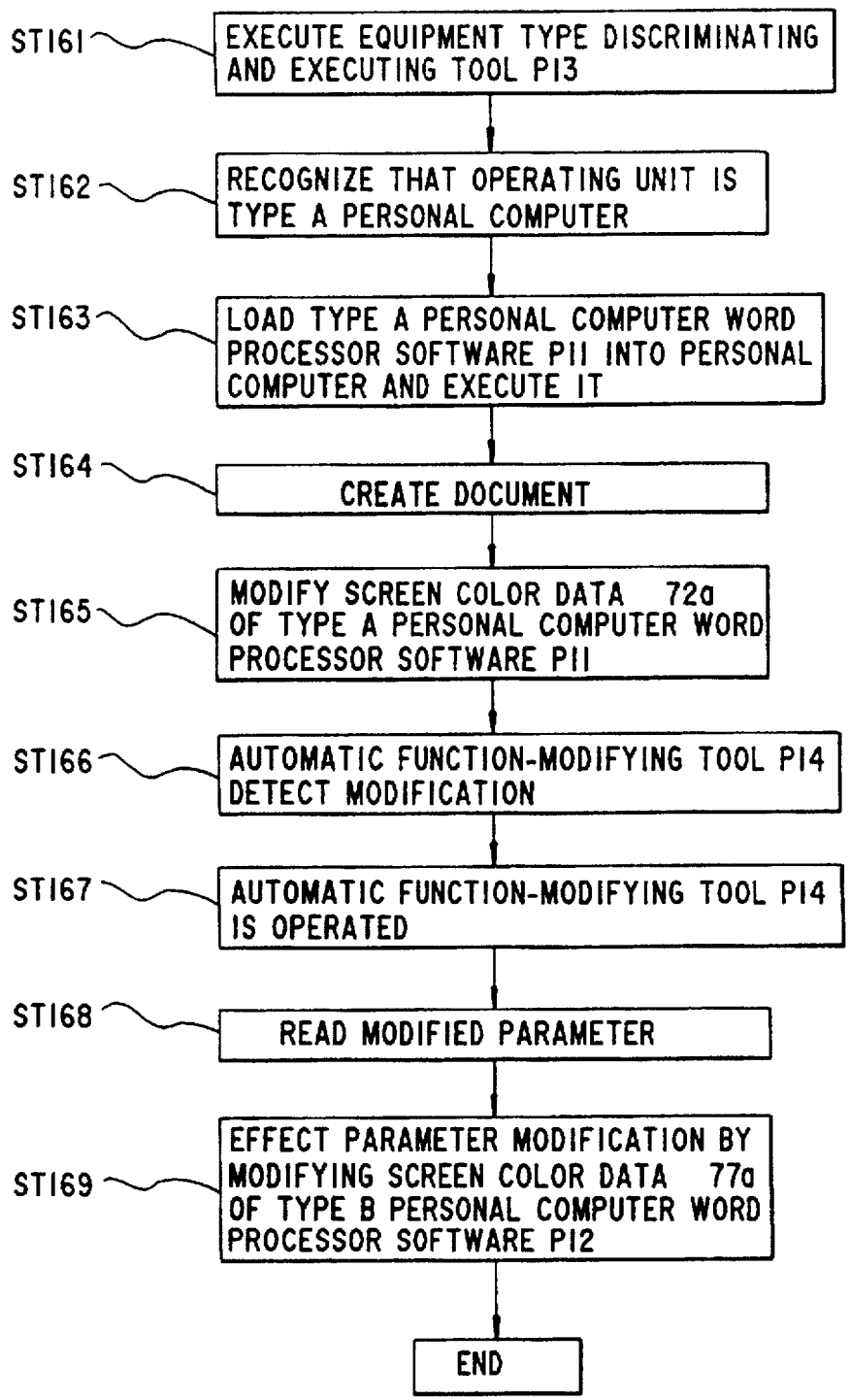
FIG. 32 is a flow chart of operations of a second application of the third embodiment.

FIG. 32 is a flow chart of the operations of the second application of the third embodiment. In FIG. 32, the equipment type discriminating and executing tool P13 is first executed (ST161), resulting in a recognition that a type A personal computer 32a is operating (ST162). Subsequently, the word processor software P11 for the type A personal computer is loaded into the type A personal computer 32a (ST163) so that a document may be created (ST164).

When the screen color data 72a of the word processor software P11 for the type A personal computer is modified (ST165), the automatic function-modifying tool P14 of the type B personal computer 32b detects the modification (ST166), which prompts the automatic function-modifying tool P14 to be operated (ST167) and to read the modified parameter (ST168). Thereupon, the parameter modification, of changing the screen color data 77a of the word processor software P12 for the type B personal computer, is effected (ST169).

That is, following a modification of the screen color data 72a in the type A personal computer 32a from white characters on a black background to blue characters on a yellow background, starting up of the word processor software P12 in the type B personal computer 32b automatically changes the corresponding screen color and shows blue characters.

This way, any parameter modification effected while using the type A personal computer 32a (an example of this being a user modification of the screen color data, and the like, of the word processor) results in a parallel modification of the same parameter in the software for the type B personal computer 32b.

Figure 33:
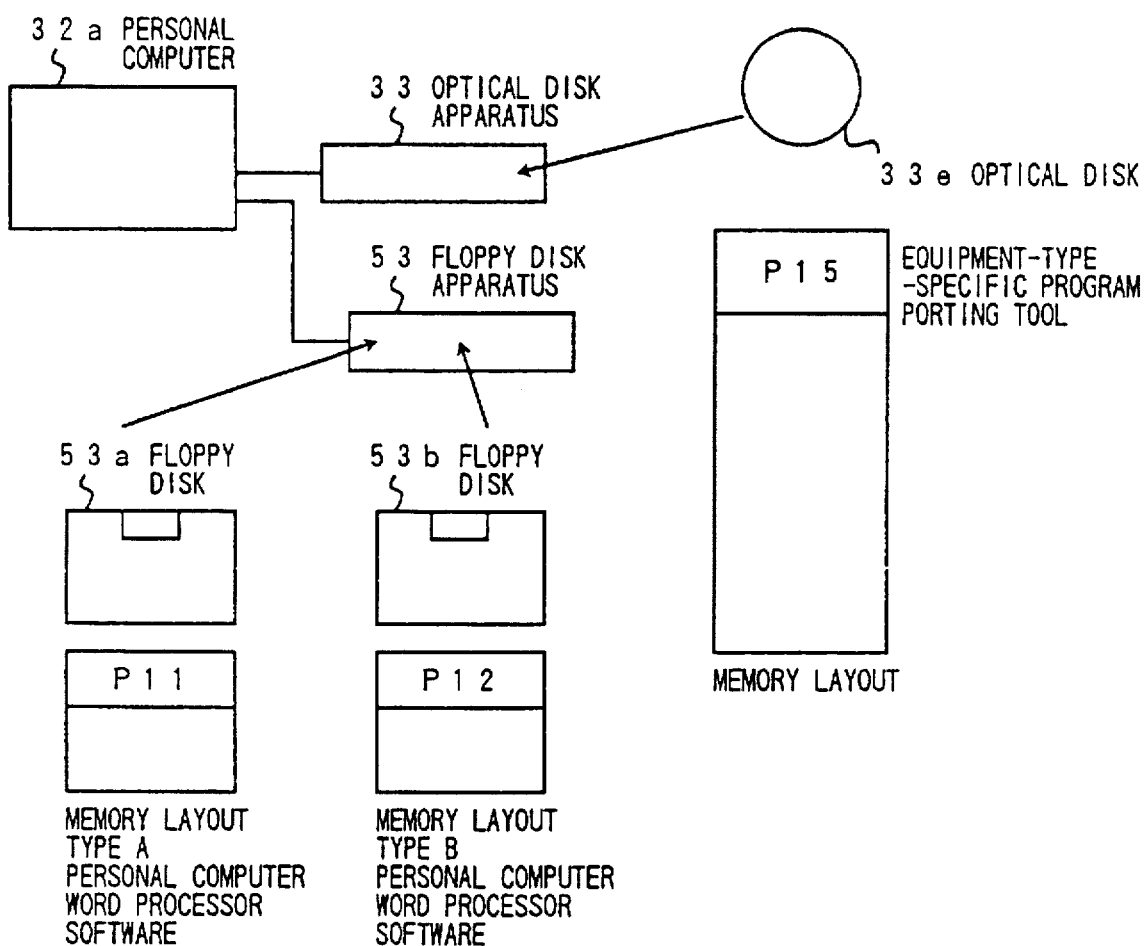
FIG. 33 illustrates a configuration of a third application of the third embodiment.
Figure 34:
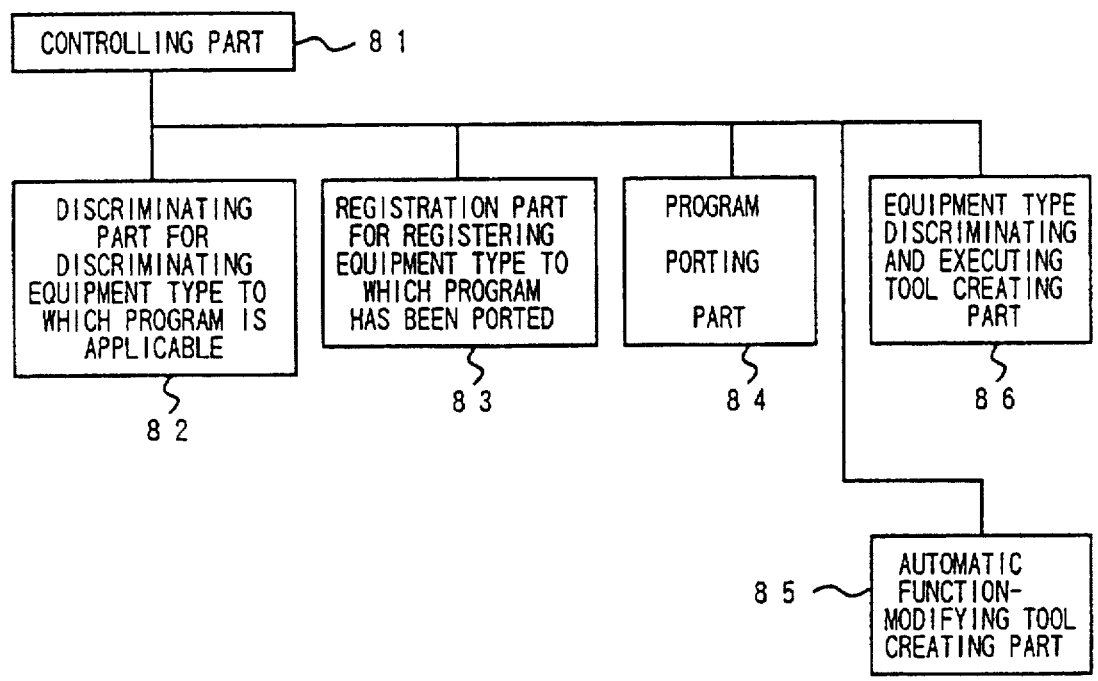
FIG. 34 is a functional block diagram of an equipment type discriminating-software porting tool of FIG. 33.

FIG. 33 illustrates a configuration of a third application of the third embodiment; and FIG. 34 is a functional block diagram of the equipment-type-specific software porting tool of FIG. 33.

In FIG. 33, the optical disk apparatus 33 and a floppy disk apparatus 53 are connected to the type A personal computer 32a. The optical disk 33e, which is employed in this application comprising the type A personal computer 32a and the optical disk apparatus 33, is the same as that described in the first and second applications except that the optical disk 33e additionally stores an equipment-type-specific program porting tool P15. A floppy disk 53a employed in the floppy disk apparatus 53 stores the word processor software for the type A personal computer; and a floppy disk 53b stores the word processor software for the type B personal computer.

In order that the equipment-type-specific software porting tool P15 be duly executed, the type A personal computer 32a, as shown in FIG. 34, is equipped with a discriminating part 82 for discriminating the equipment type to which the program is applicable, a registration part 83 for registering the equipment type to which the program has been ported, a program porting part 84, an automatic function-modifying tool creating part 85 and an equipment type discriminating and executing tool creating part 86, which parts are controlled by a controlling part 81.

Figure 35:
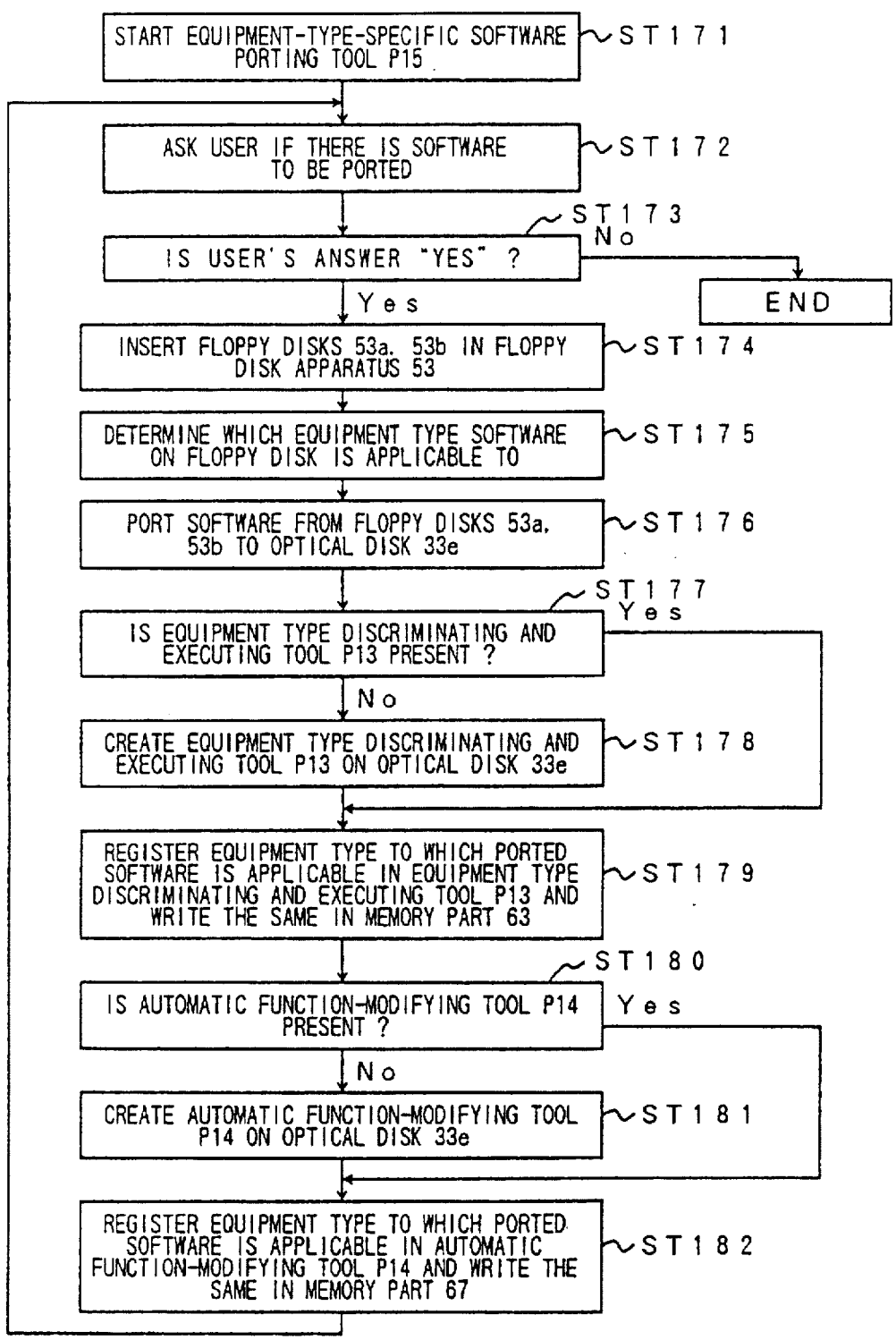
FIG. 35 is a flow chart of operations of FIG. 33.

FIG. 35 is a flow chart of the operations of FIG. 33. In FIG. 35, when the equipment-specific software porting tool P15 is executed (ST171), the tool inquires of the user whether or not there is a software to be ported (ST172). If there is nothing to be ported, the operation of the tool is terminated (ST173). If there is anything to be ported (ST173), the user is asked to insert the floppy disks 53a and 53b in the floppy disk apparatus 53 (ST174).

A discrimination is then made as to the equipment type to which the software of the floppy disks 53a and 53b is applicable (ST175); the proper software is then ported to the optical disk 33e (ST176). A determination is then made as to whether or not the equipment type discriminating and executing tool P13 is present on the optical disk 33e (ST177). If it is not present, the equipment type discriminating and executing tool P13 is created on the optical disk 33e (ST178). If P13 is present, or after it is newly created in ST178, the equipment type to which the ported software is applicable is registered in the equipment type discriminating and executing tool P13 and is written into the registration memory part 63 (ST179).

Subsequently, a determination is made as to whether or not the automatic function-modifying tool P14 is present (ST180). If such a tool P14 is not present, the automatic function-modifying tool P14 is created on the optical disk 33e (ST181). If the tool P14 is present, or if it has been newly created in ST181, the equipment type to which the ported software is applicable is registered in the automatic function-modifying tool P14 and is written into the registration memory part 67 (ST182); the process then returns to ST172. That is, the type A personal computer 32a and the type B personal computer 32b are registered in the respective registration memory part 63 and 67, the contents of which are shown in FIG. 29.

Since the third embodiment is also configured such that the equipment type identification code is stored as fixed information in a plurality of personal computers of different types, there are the following means, which may be provided integrally with or separate from the equipment discriminating and executing tool, the automatic function-modifying tool or the equipment-type-specific software porting tool stored in the optical disks 33d and 33e, the above means being as follows: a recognizing means for reading and recognizing the equipment type identification code, and a comparing/selecting means for comparing the read identification code and the equipment-type-specific applicability identification code provided in the software pieces applicable to the equipment types. Upon the start-up of the OS, these means are obtained as shown in FIG. 30 so that the equipment type discrimination may be executed.

One way of utilizing the optical disk 33e having only the porting tool P15 installed is to make the porting tool P15 generally available on the market so that the user may be able to create a single optical disk containing the word processor for the equipment type that the user wants to use.

While the above description is given by taking a word processor software as an example, this embodiment is also applicable to other application programs such as a spreadsheet or a presentation screen creating software.

This way, the third embodiment also makes it possible, to run different software pieces having the same purpose on a plurality of computer equipment units of different types, using only a single optical disk. It also becomes possible to share data between the plurality of computer equipment units, thus significantly increasing convenience for the user, while at the same time allowing the user to benefit from a reduced required load when using a computer and from a simplified manual task while operating it.

Figures 37, 38:
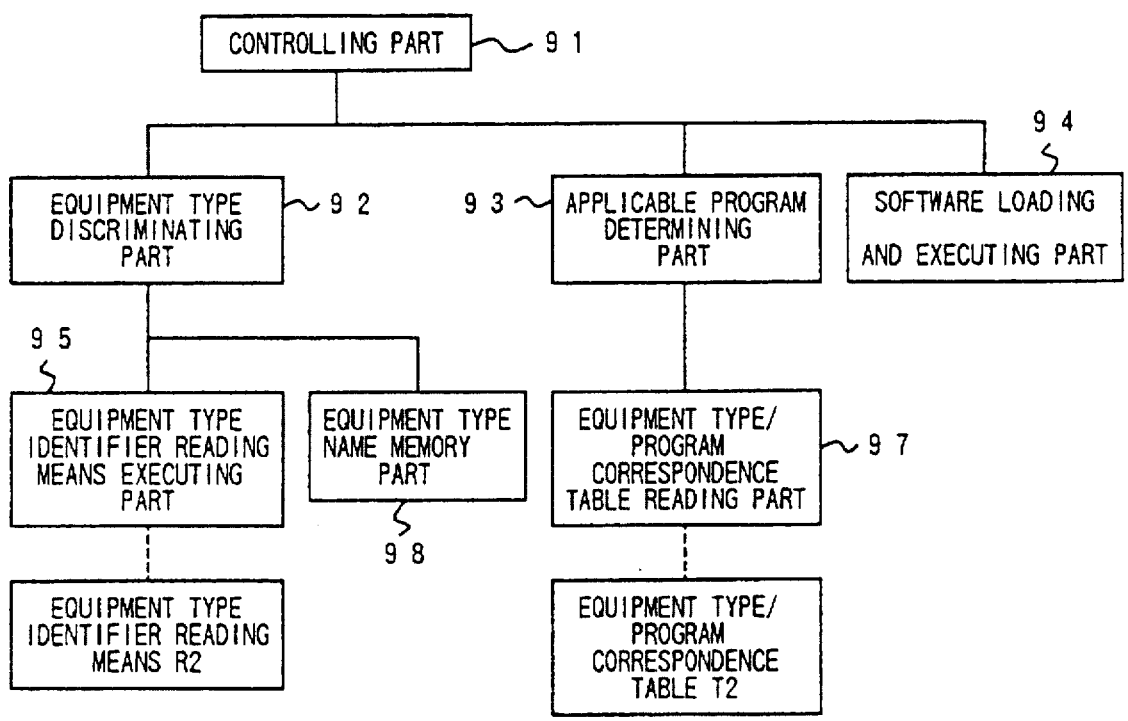
FIG. 37 shows contents of a correspondence table of FIG. 36.
FIG. 38 is a functional block diagram of an executing means of a computer equipment unit of FIG. 36.

FIG. 36 illustrates a configuration of a fourth embodiment of the present invention; and FIG. 37 shows contents of the correspondence tables of FIG. 36.

In FIG. 36, the optical disk apparatus 33 is connected to the Type A computer equipment unit 32a in the system A, and the optical disk apparatus 33 is connected to the Type B computer equipment unit 32b in the system B. Both optical disk apparatuses 33 can utilize an optical disk 33f.

The semiconductor memories in the Type A computer equipment unit 32a and in the Type B computer equipment unit 32b of the respective systems A and B store respective equipment type identifiers 11 and 12, operating environment information E1 and E2, and individual unit identifiers J1 and J2. The optical disk 33f stores the program P11 for the Type A computer equipment, the program P12 for the Type B computer equipment, the program loading and executing means P19, the reading means R; and a correspondence table T. The reading means comprises either an equipment-type-identifier reading means R2, an operating environment reading means R1 or an individual-unit-identifier reading means R3.

The correspondence table T comprises either the operating environment/program correspondence table T1 as shown in FIG. 37(A), the equipment type/program correspondence table T2 as shown in FIG. 37(B), or the individual unit/program correspondence table T3 as shown in FIG. 37(C). The term "operating environment" comprehends the configuration of the external apparatus (optical disk apparatus 33), the expanded memory and the printer and the like.

FIG. 38 is a functional block diagram of an executing means in the computer equipment unit of FIG. 36. Referring to FIG. 38, the executing means comprises an equipment type discriminating part 92, an applicable program determination part 93 and a software loading and executing part 94, which parts are controlled by a controlling part 91.

The equipment type discriminating part 92 is equipped with an equipment-type-identifier reading executing means 95 and with an equipment type name memory part 96. The equipment type identifier reading executing part 95 allows the equipment type identifier reading means R2 to be executed. The applicable program determination part 93 is equipped with a reading part 97 for reading the equipment type/program correspondence table T2.

Figure 39:
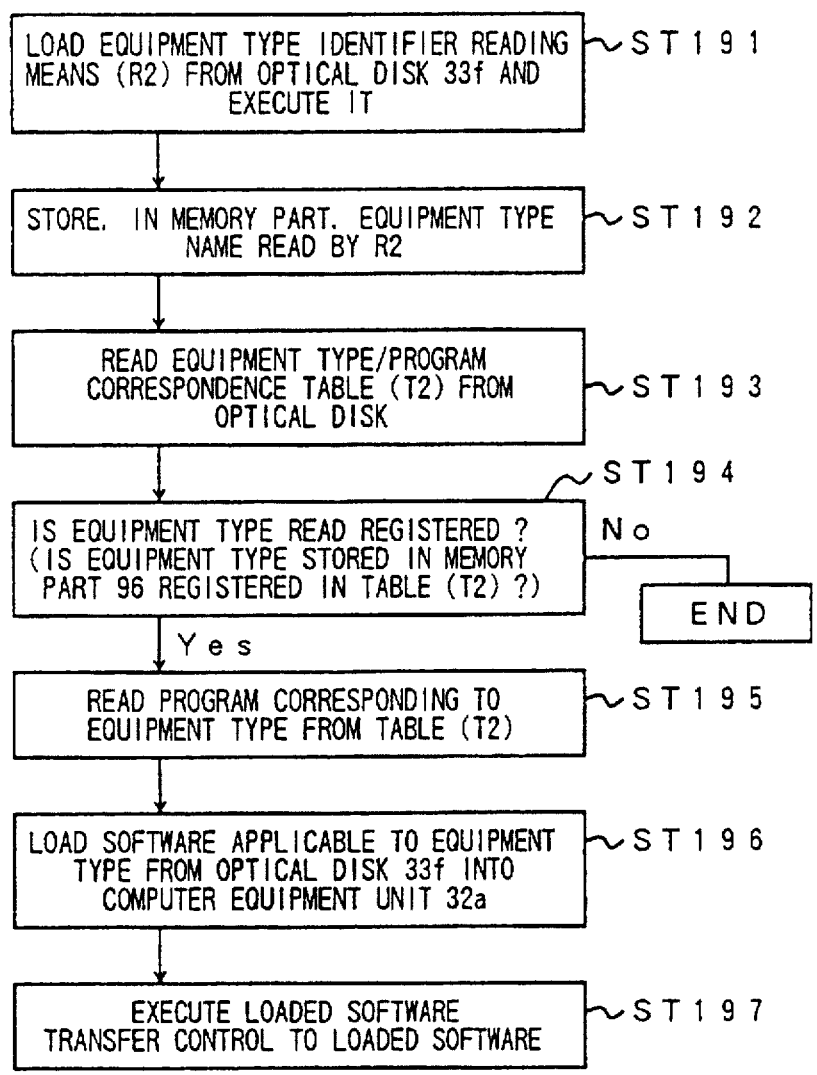
FIG. 39 is a flow chart of operations of FIG. 38.

FIG. 39 is a flow chart for FIG. 38. In FIG. 39, the equipment type identifier reading means R2 is loaded in from the optical disk 33f and executed (ST191). The equipment type name read by the means R2 is then stored in the memory part 96 (ST192). The equipment type/program correspondence table T2 is then loaded from the optical disk 33f (ST193); and a determination is made as to whether or not the equipment type read is the one that has been registered, in other words, as to whether or not the equipment type stored in the memory part 96 is registered in the correspondence table T2 (ST194). If the equipment type is not registered, the process is terminated. If the equipment type is registered, the name of the program applicable to the relevant equipment type is read from the correspondence table T2 (ST195).

The software applicable to the read equipment type is loaded from the optical disk 33f to the computer equipment unit 32a (ST196); the loaded software is executed; and control is transferred thereto (ST197).

Figure 40:
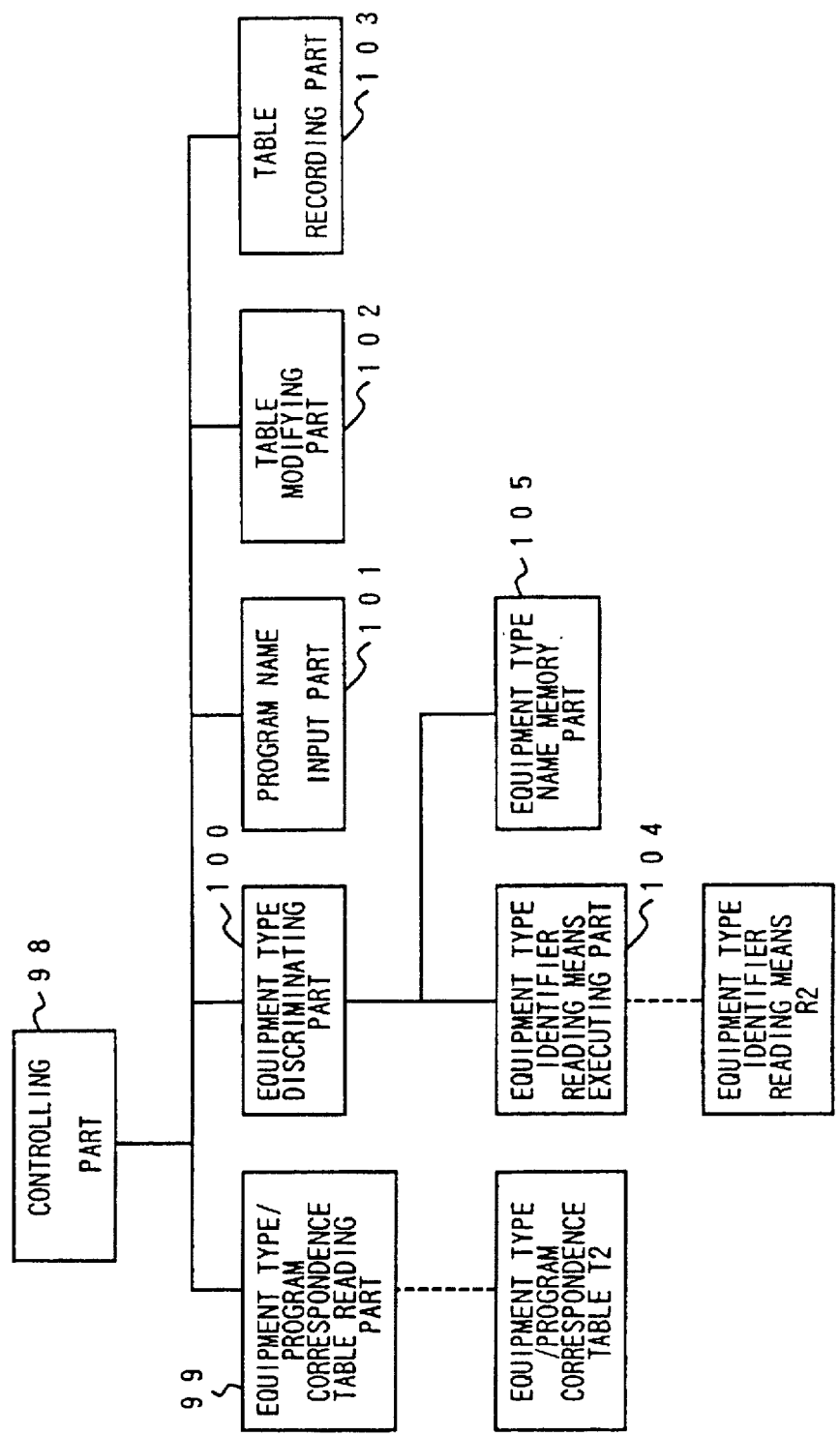
FIG. 40 is a functional block diagram of an editing means for editing the correspondence table in the computer equipment unit of FIG. 36.

FIG. 40 is a functional block diagram of an editing means (Q) for editing the correspondence tables of the computer equipment units of FIG. 36. FIG. 40 shows a configuration of the editing means (Q2) for editing the correspondence table T2. Referring to FIG. 40, the editing means (Q2) is attached to the correspondence table T2 and comprises an equipment-type/program correspondence table reading part 99 having the equipment-type/program correspondence table T2; an equipment type discriminating part 100; a program name input part 101; a table modifying part 102 and a table recording part 103, which parts are controlled by a controlling part 98. The equipment type discriminating part 100 is equipped with an executing part 104 for executing the equipment type identifier reading means R2 and with an equipment type name memory part 105.

Figure 41:
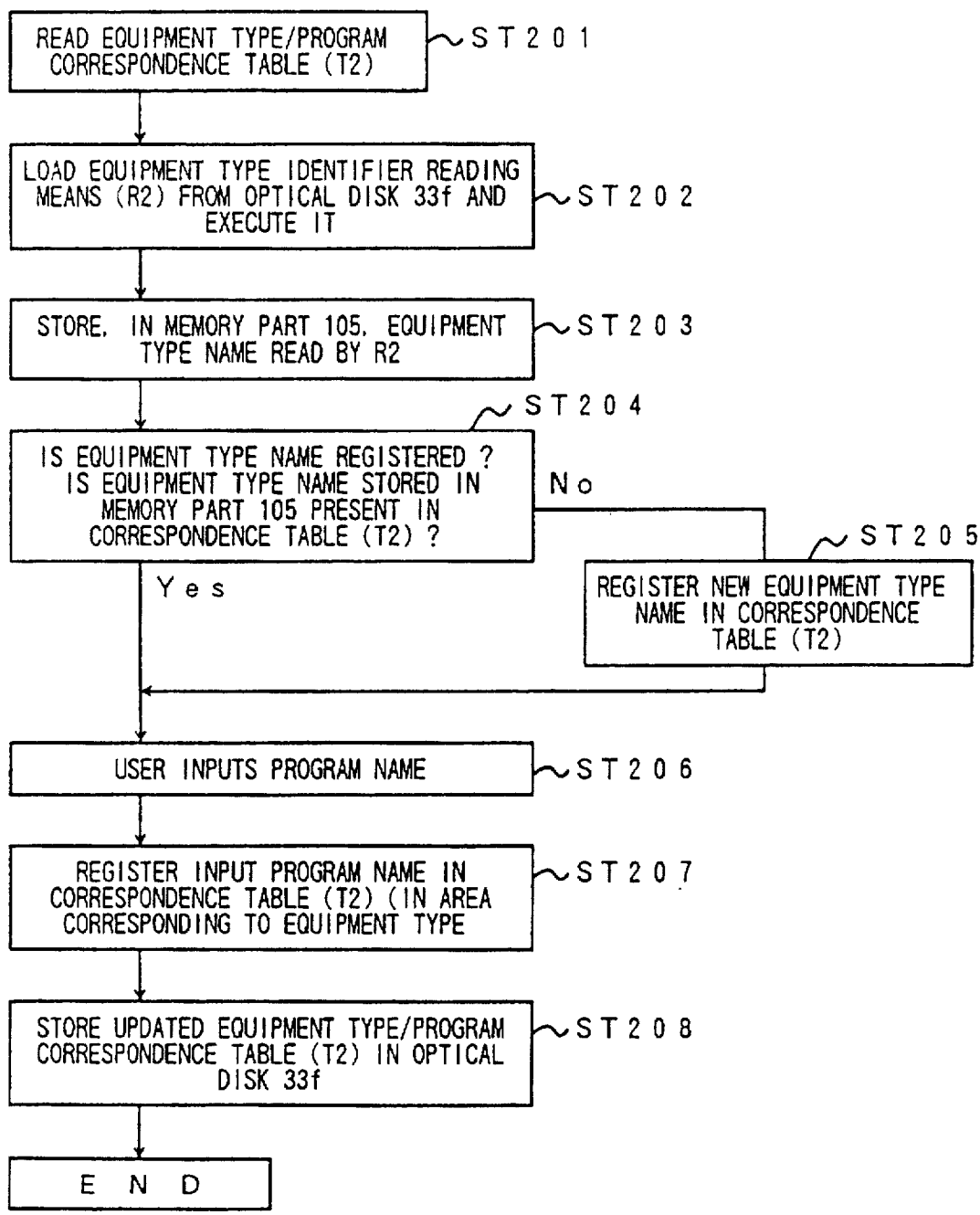
FIG. 41 is a flow chart of operations of FIG. 40.

FIG. 41 is the flow chart for FIG. 40. In FIG. 41, the equipment-type/program correspondence table T2 is read (ST201); and the equipment type identifier reading means R2 is loaded from the optical disk 33f and executed (ST202). The equipment type name read by the reading means R2 is stored in the memory part 105 (ST203), and a determination is made as to whether or not the equipment type name stored in the memory part 105 is registered in the correspondence table T2 (ST204). If the equipment type is not registered, the equipment type name read is newly registered in the correspondence table T2 (ST205). If the equipment type is already registered, or was registered in ST205, the program name is input by the user (ST206).

The program name input by the user is registered in the area of the correspondence table T2 corresponding to the equipment type (ST207), and the updated equipment type/program correspondence table T2 is recorded in the optical disk 33f (ST208).

Instead of a plurality of programs each applicable to different equipment types, a plurality of programs can be installed on the optical disk 33f, each program being applicable to a plurality of computer equipment units of the same equipment type operating under different environments. The correspondence table applicable in the above case is the correspondence table T1, where a correspondence is given between the operating environments of the individual computer equipment units (E1, E2, - - - ) and the programs (P1, P2, - - - ).

It is also possible to allow computer equipment units of the same type and having the same operating environment to run different kinds of programs. For example, there are cases where a personal computer at work and a personal computer at home are required to run different programs even though their equipment type and the operating environment are the same. The correspondence table applicable here is the correspondence table T3, where the correspondence is given between the individual unit identifier (for examples, serial numbers J1, J2, - - - ) for identifying individual computer equipment units and the programs (P1, P2, - - - ).

It is also possible to store the equipment type identifier reading means R2 and the loading and executing means P19 for automatically loading and reading the programs applicable to the equipment type, corresponding to the read equipment type identifier, the storing being done not in the optical disk 33f but in another external storage apparatus, for example, in a hard disk, connected to the computer equipment units 32a or 32b.

Since this embodiment is configured such that a single removable storage medium (optical disk 33f) stores software pieces applicable to a plurality of computer equipment units 32a and 32b, the user can run the program anywhere a computer equipment unit is available by simply carrying with him a single piece of this removable storage medium.

The user can thus use a desired software even if it is not installed in the computer equipment unit available.

Since the equipment type is discriminated and the program applicable thereto is run automatically, the user is not hampered by having to select and execute the applicable programs.

Moreover, since it is possible to run a plurality of programs, depending on such an operating environment as the capacity of expanded memory provided in the equipment unit used, the user may be freed from a need to select applicable programs for the computer operating environment. It also becomes possible to run programs that differ from one individual unit to another, thus contributing to wider usage of computer equipment.

Figure 42:
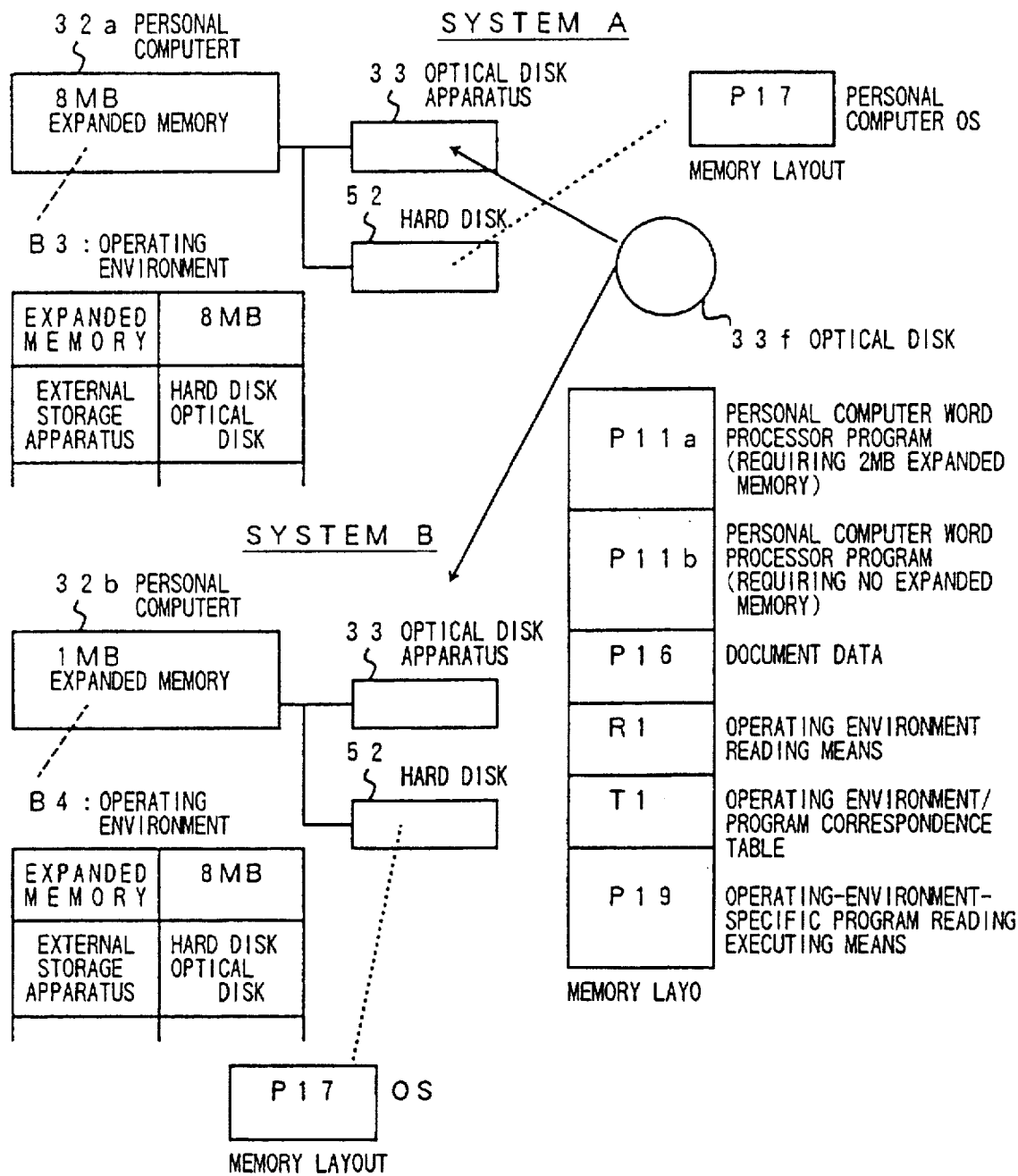
FIG. 42 illustrates a configuration of an application of the fourth embodiment.

FIG. 42 illustrates a configuration of an application of the fourth embodiment; and FIG. 43 shows a content of the correspondence table of FIG. 42.

FIG. 42 shows a system including the personal computers 32a and 32b of the same equipment type and different expanded memory capacity. In the system A, the optical disk apparatus 33 and the hard disk apparatus 52 are connected to the personal computer 32a fitted with an expansion memory of 8 MB. In the system B, the optical disk apparatus 33 and the hard disk apparatus 52 are connected to the personal computer 32b fitted with an expansion memory of 1 MB. The OS's (P17) for the personal computers 32a and 32b are installed in the respective hard disk apparatuses 52.

The optical disk 33f used in the optical disk apparatuses 33 stores, for example: a personal computer word processor software P11a (requiring 2 MB of expanded memory); a personal computer word processor software P11bs, which is a simplified version of P11a and requires no expanded memory; the document data P16; an operating environment reading means R1; the operating environment/program correspondence table T1 as shown in FIG. 43, which table stores the names of the programs applicable under different expanded memory conditions; and operating-environment-specific program reading and executing means P19.

Figure 44:
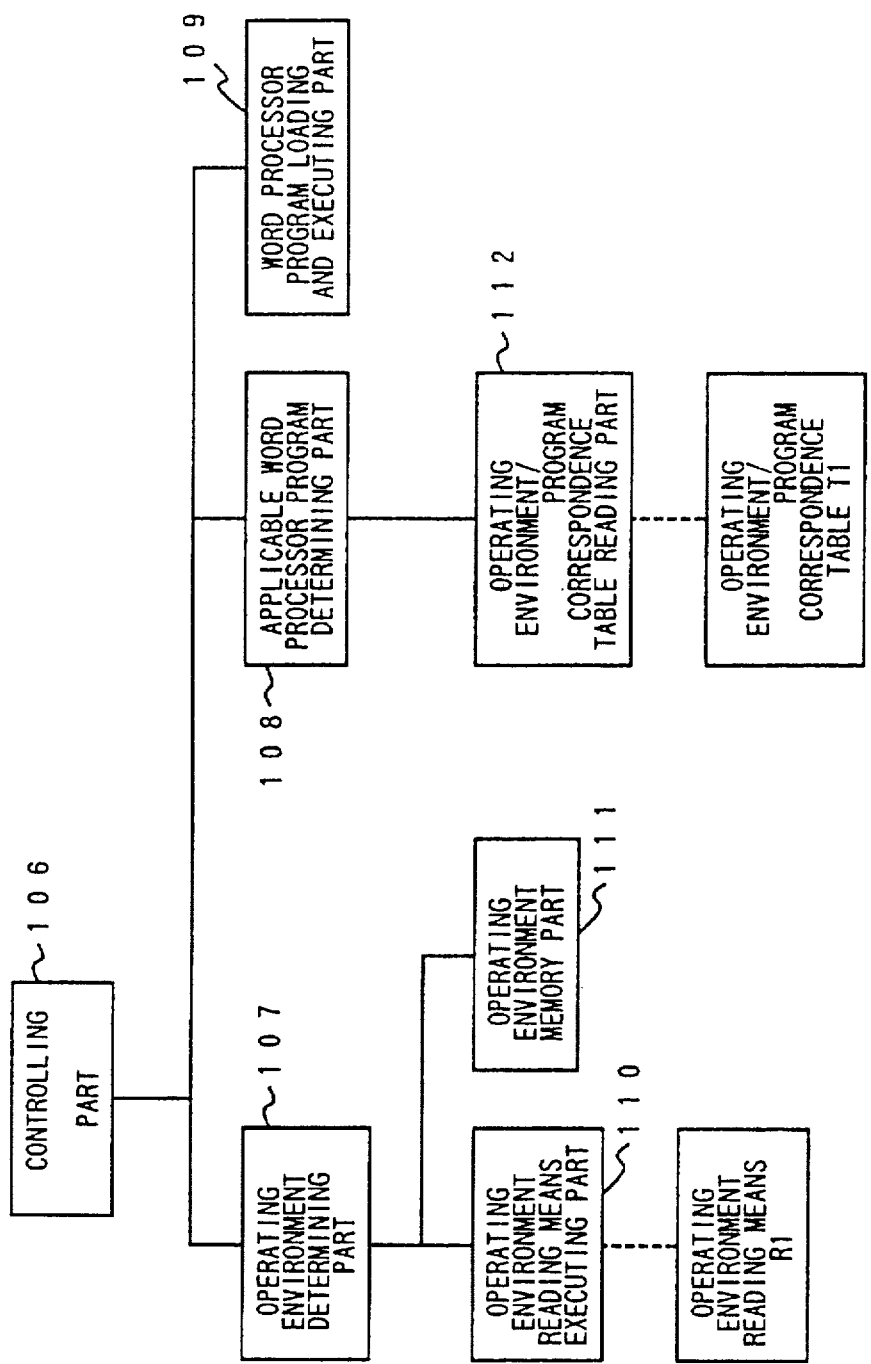
FIG. 44 is a functional block diagram of the executing means of the personal computer of FIG. 42.

FIG. 44 is a functional block diagram of an executing means of the personal computers of FIG. 42. In FIG. 44, the executing means is equipped with an operating environment discriminating part 107, a determining part 108 for determining the applicable word processor program and a word processor program loading and executing means 109, which parts are controlled by a controlling part 106. The operating environment discriminating part 107 is equipped with an executing part 110 for executing the operating environment reading means R1 and an operating environment memory part 111. The determining part 108 for determining the applicable word processor program is equipped with a reading part 112 for reading the operating environment/program correspondence table T1.

Figure 45:
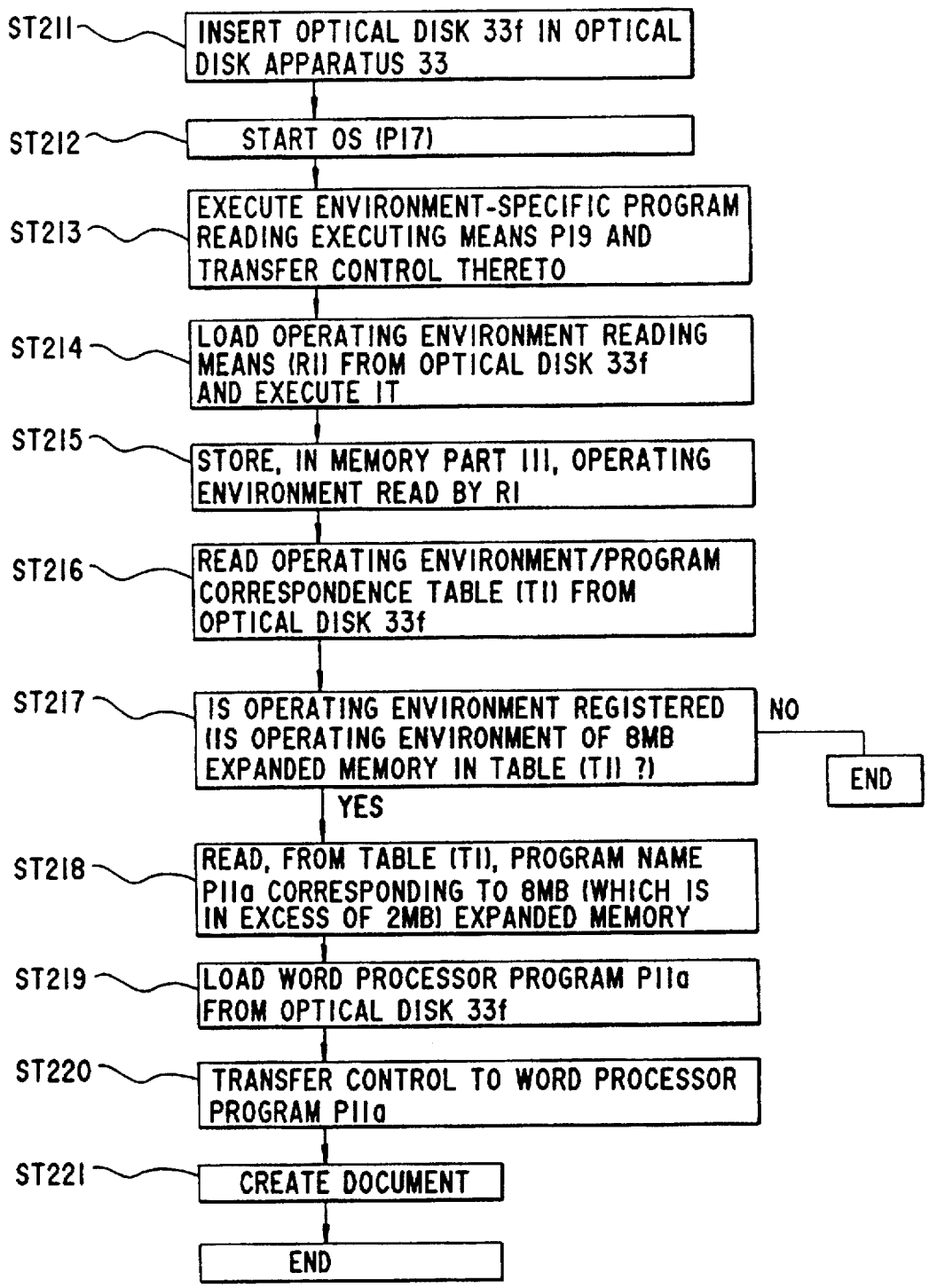
FIG. 45 is a flow chart of operations of FIG. 42.

FIG. 45 is a flow chart of the operations of FIG. 42. In FIG. 45, the optical disk 33f is inserted in the optical disk apparatus 33 of the system A (ST211), and the OS (P17) is started (ST212). Subsequently, the operating-environment-specific program loading and executing means P19 stored on the optical disk 33f is executed, and control is transferred thereto (ST213). This allows the operating environment reading means R1 to be loaded in from the optical disk 33f and executed (ST214). The operating environment read by the means R1 is stored in the memory part 111 (ST115).

Next, the operating environment/program correspondence table T1 is read from the optical disk 33f (ST216), and a determination is made as to whether or not the operating environment has been registered or not, i.e. whether or not an operating environment of 8 MB of expanded memory is registered in the correspondence table T1 (ST217). If the operating environment is not registered, the process is terminated. If it is registered, the name of the program P11a applicable under the condition of 8 MB (which is more than 2 MB) of expanded memory is read from the correspondence table T1 (ST218).

The program P11a is then loaded in from the optical disk 33f, control is transferred thereto (ST219, ST220) and a document is created (ST221). The created document is stored in the optical disk 33f as the document data P16.

The optical disk 33f is inserted in the optical disk apparatus 33 in the system B and the OS (P17) installed in the hard disk apparatus 52 is started. The operating-environment-specific program loading and executing means P19 installed in the optical disk 33f is executed. The means P19 first executes the operating environment reading means R1, and the means R1 recognizes that the expanded memory of the personal computer 32b is 1 MB. The means P19 then refers to the operating environment/program correspondence Table T1 and recognizes that the word processor program P11b, which program is operable under the condition of less than 2 MB of expanded memory, is applicable to the personal computer 32b, thereby loading the word processor program P11b into the personal computer 32b and executing it.

When the word processor software P9 is utilized to read the document P16, the document data P16 created by using the personal computer 32a can be read as it is. This document data P16 is edited and recorded again on the optical disk 33f.

This way, the user can, by carrying with him a single optical disk 33f, perform computer tasks, using a plurality of personal computers having different operating environments in terms of expanded memory and the like. Moreover, the user can allow a plurality of computers to share the document data.

Figures 46, 47:
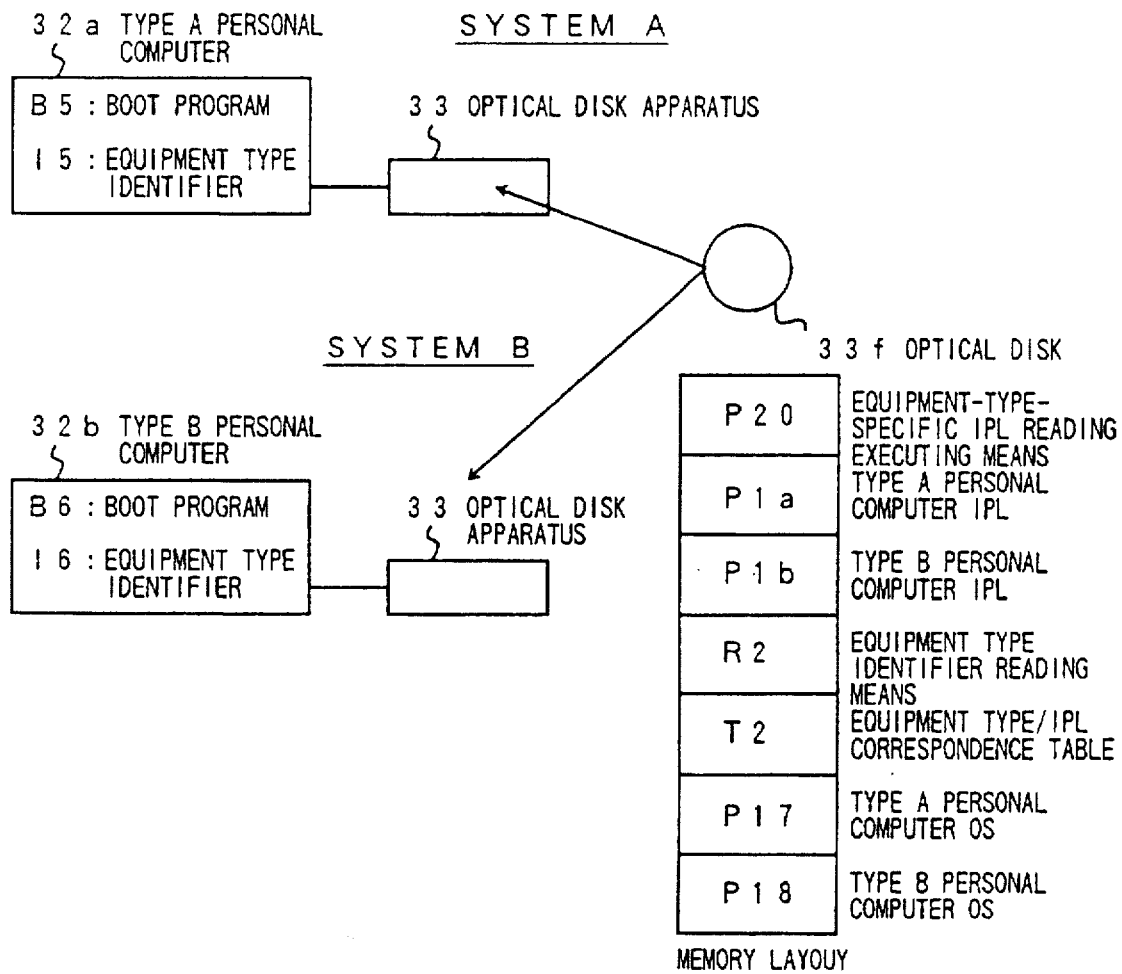
FIG. 46 illustrates a configuration of another application of the fourth embodiment.
FIG. 47 shows a content of the correspondence table of FIG. 46.

FIG. 46 illustrates a configuration of another application of the fourth embodiment; and FIG. 47 shows a content of the correspondence table of FIG. 46.

FIG. 46 shows a case where a system comprises computer equipment embodied by personal computers of different equipment types. In FIG. 46, the optical disk apparatus 33 is connected to the type A personal computer 32a in the system A; and the optical disk apparatus 33 is connected to the type B personal computer 32b in the system B. The boot ROM in the type A personal computer 32a stores a boot program B5, and the semiconductor memory thereof stores an equipment type identifier I5. The boot ROM of the type B personal computer 32b stores a boot program B6, and the semiconductor memory thereof stores an equipment identifier I6.

The optical disk 33f, which is shared by the optical disk apparatuses 33, stores: an equipment-type-specific IPL reading executing means P20; a type A personal computer IPL (P1a); a type B personal computer IPL (P1b); a type A personal computer OS (P17); a type B personal computer OS (P18); an equipment type identifier reading means R2; and an equipment type/IPL correspondence table T2 as shown in FIG. 47.

Figure 48:
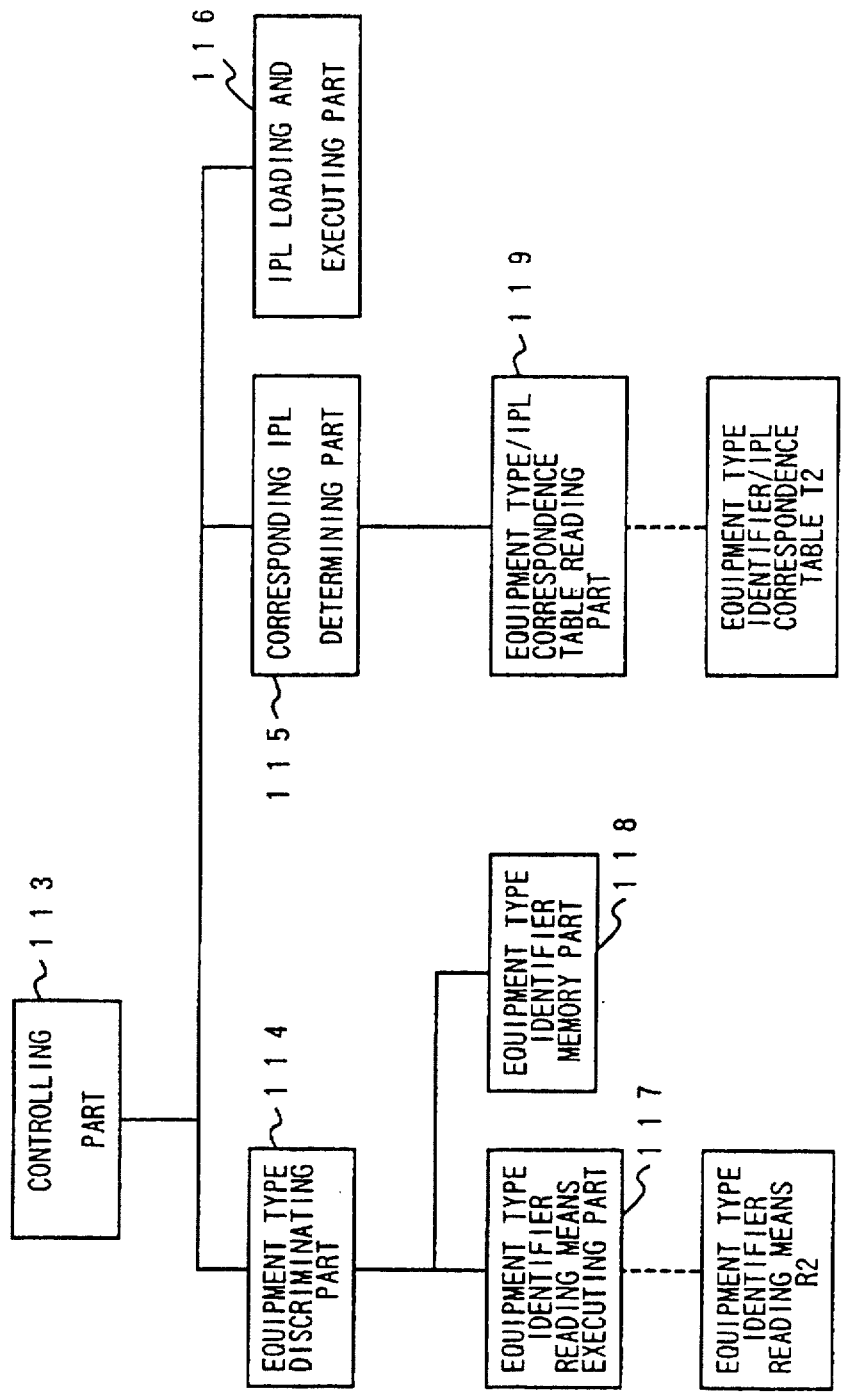
FIG. 48 is a functional block diagram of the executing means of the personal computer of FIG. 46.

FIG. 48 is a functional block diagram of an executing means of the personal computers of FIG. 46. Referring to FIG. 48, the executing means is equipped with an equipment type discriminating part 114, an applicable IPL determination part 115 and a IPL loading and executing means 116. The equipment type discriminating part 114 is equipped with an executing part 117 for executing the equipment type identifier reading means R2 and with an equipment type identifier memory part 118. The applicable IPL determination part 115 is equipped with a reading part 119 for reading the equipment type identifier/IPL correspondence table T2.

Figure 49:
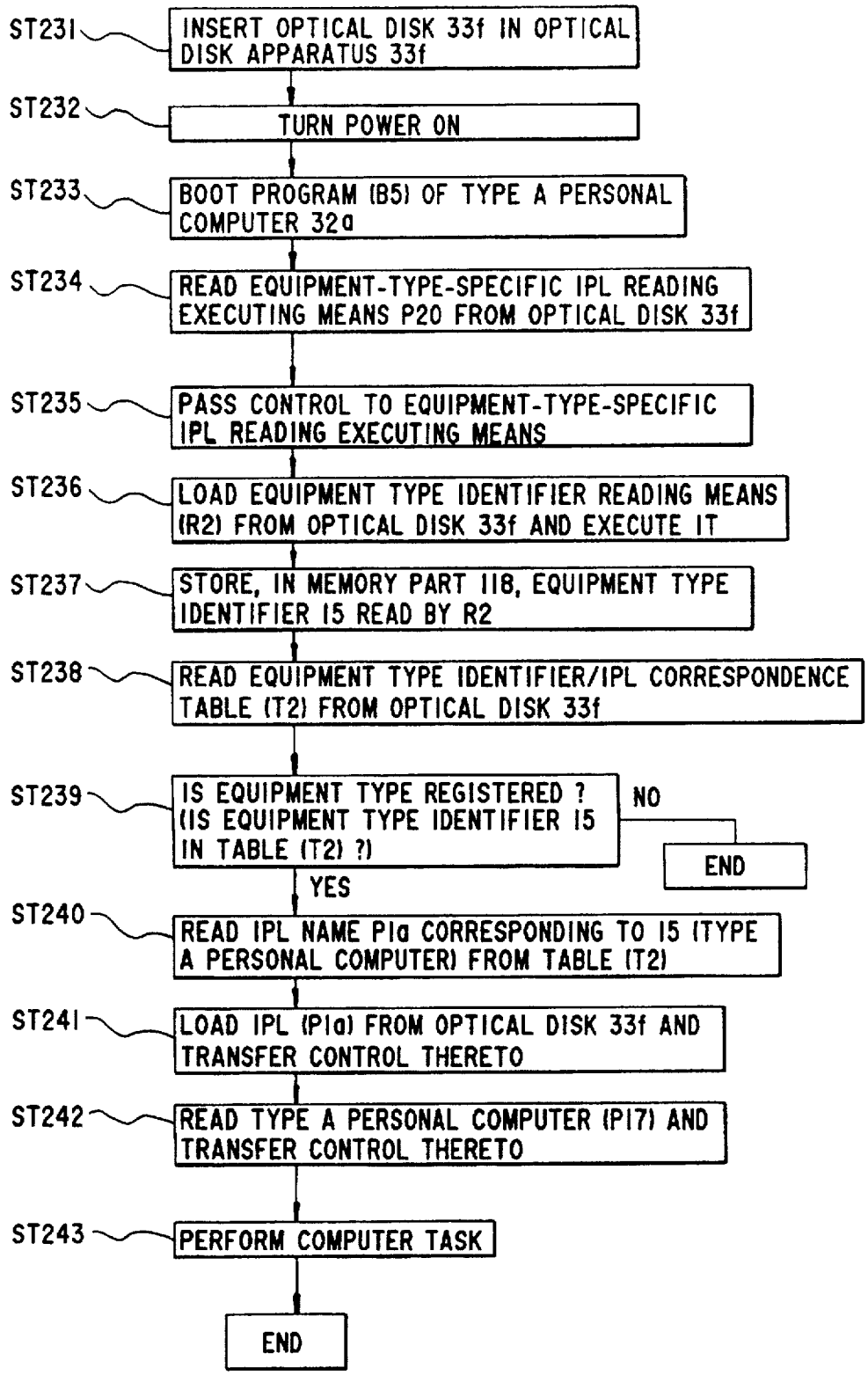
FIG. 49 is a flow chart of operations of FIG. 46.

FIG. 49 is a flow chart of operations of FIG. 46. In FIG. 49, the optical disk 33f is inserted in the optical disk apparatus 33 of the system A (ST231), the type A personal computer 32a is turned on (ST232) and the boot program B5 of the type A personal 32a is started (ST233). This allows the equipment-type-specific IPL reading executing means P20 to be read from the optical disk 33f (ST234) and control is transferred thereto (ST235).

Subsequently, the equipment type identifier reading means R2 is loaded in from the optical disk 33f and executed (ST236) and the equipment type identifier I5 read by the means R2 is stored in the memory part 118 (ST237). The equipment type identifier/IPL correspondence table T2 is read from the optical disk 33f (ST238) and a determination is made as to whether or not the equipment type recognized is registered, i.e. whether or not the equipment type identifier I5 is registered in the correspondence table T2 (ST239).

If the identifier is not registered, the process is terminated. If it is registered, the IPL name P1a corresponding to I5 (type A personal computer) is read from the correspondence table T2 (ST240). The IPL (P1a) is loaded in from the optical disk 33f and control is transferred thereto (ST241). After the type A personal computer OS (P17) is read and control is transferred thereto (ST242), the system is ready for computer tasks to be performed (ST243).

The optical disk 33f is inserted in the optical disk apparatus 33 in the system B and the type B personal computer 32b is turned on. The boot program B6 of the type B personal computer 32b is started and this boot program B6 reads the equipment-type-specific IPL reading executing means P20 installed in the optical disk 33f and executes it. The means 20 executes the equipment type identifier reading means R2. The means R2 reads the equipment type identifier I6 of the type B personal computer 32b and stores the equipment identifier I6 in the memory part 118 within the equipment type IPL reading executing means P20.

Subsequently, the means P20 refers to the equipment type identifier/IPL correspondence table T2, recognizes that the IPL for the type B personal computer is P1b, loads in the IPL (P1b) to the type B personal computer 32b and executes it.

The IPL (P1b) reads the OS (P18) for the type B personal computer from the optical disk 33f and transferred control thereto. This way, the OS (P18) for the type B personal computer is automatically started.

It is now clear that a plurality of personal computers of different types A and B can be started with the use of a single optical disk 33f.

As has been described above, the pieces of software having the same performance can be run on a plurality of computer equipment units, with the use of a single removable storage medium (optical disk 33f); and the data created by using these pieces of software can be shared among the plurality of units. It is also possible to start the OS's for a plurality of computer equipment types with the use of a single removable storage medium. This way, convenience for the user is significantly increased.

While the first through fourth embodiments described above assume the use of an optical disk (or a magneto-optic disk) as a removable storage medium, the removable storage medium can be an IC memory card and the like.

Figure 50:
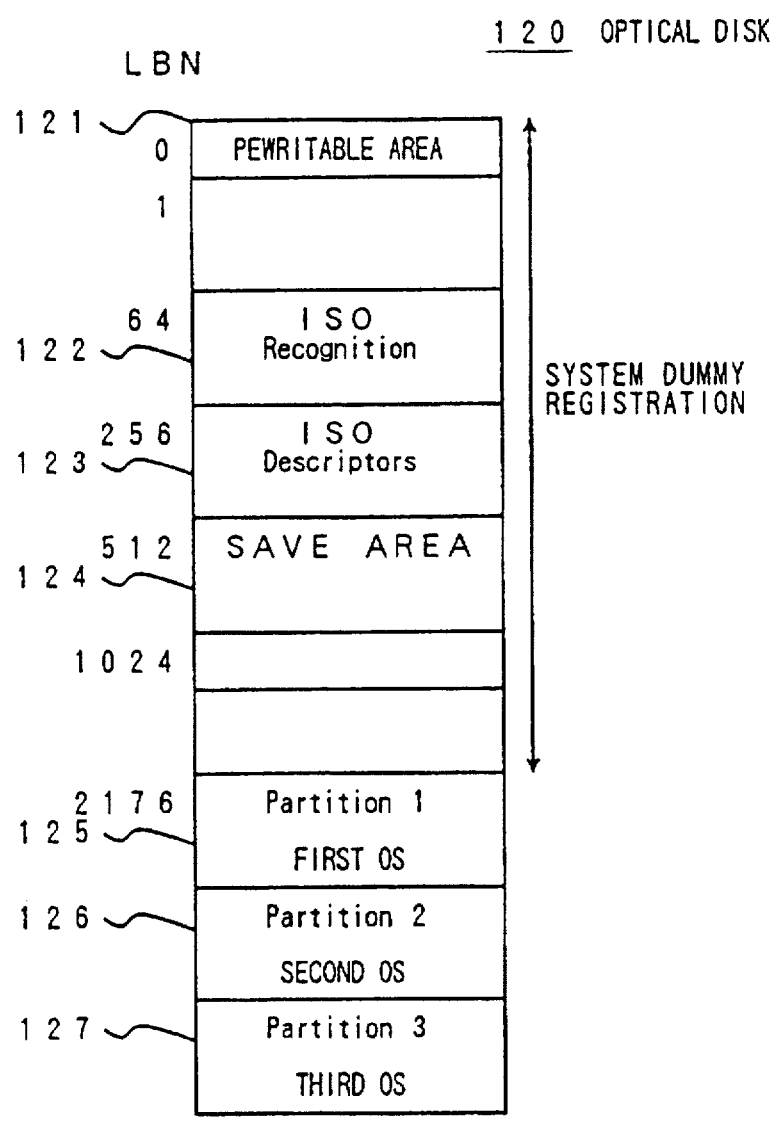
FIG. 50 illustrates a configuration of a removable storage medium of a fifth embodiment of the present invention.

FIG. 50 illustrates a configuration of a removable storage medium of a fifth embodiment of the present invention. FIG.

50 shows a recording format of an optical disk (magneto-optic disk) 120, the format being provided so as to enable starting multiple types of computer equipment under the conventional system.

In FIG. 50, the recording format of the optical disk 120 is based on the ECMA Standard 167. The ECMA Standard specifies logical format by which format data are arranged on an optical disk.

The optical disk 120 is provided with a rewritable area 121 at its innermost circumference where LBN (logical block number)=0, is provided with a recognition area 122 according to the ECMA logical format at a zone where LBN=64–255, is provided with a descriptor area 123 according to the ECMA format at a zone where LBN=256–511 and is provided with a save area 124 at a zone where LBN=512–1023. A zone where LBN=0–2175 is reserved for a system dummy registration.

A logical partition is provided in a zone where LBN=2176 and beyond. Specifically, a first partition 125 storing a first OS, a second partition 126 storing a second partition 126 and a third partition 127 storing a third OS are formed. The first through third partitions 125–127 store, as appropriate, a rewriting tool for rewriting a master boot record and a partition management table. The rewriting tool may store a master boot record and a partition management table.

The rewritable area 121 stores a master boot record or a boot record for the OS's (the first through third OS's) corresponding to each computer equipment type. A master boot record is a program for loading a boot record used in the conventional system, at a prescribed position in a memory within a computer equipment unit and for transferring control thereto. The code of the master boot record or the boot record is stored in the save area 124. The other way of storing the code is such that the code is held within the master boot record rewriting tool so that the code for each selected equipment type is stored. The rewriting tool is provided in each partition (the first through third partitions) This rewriting tool may also be provided in the save area 124 described later.

Figure 51:
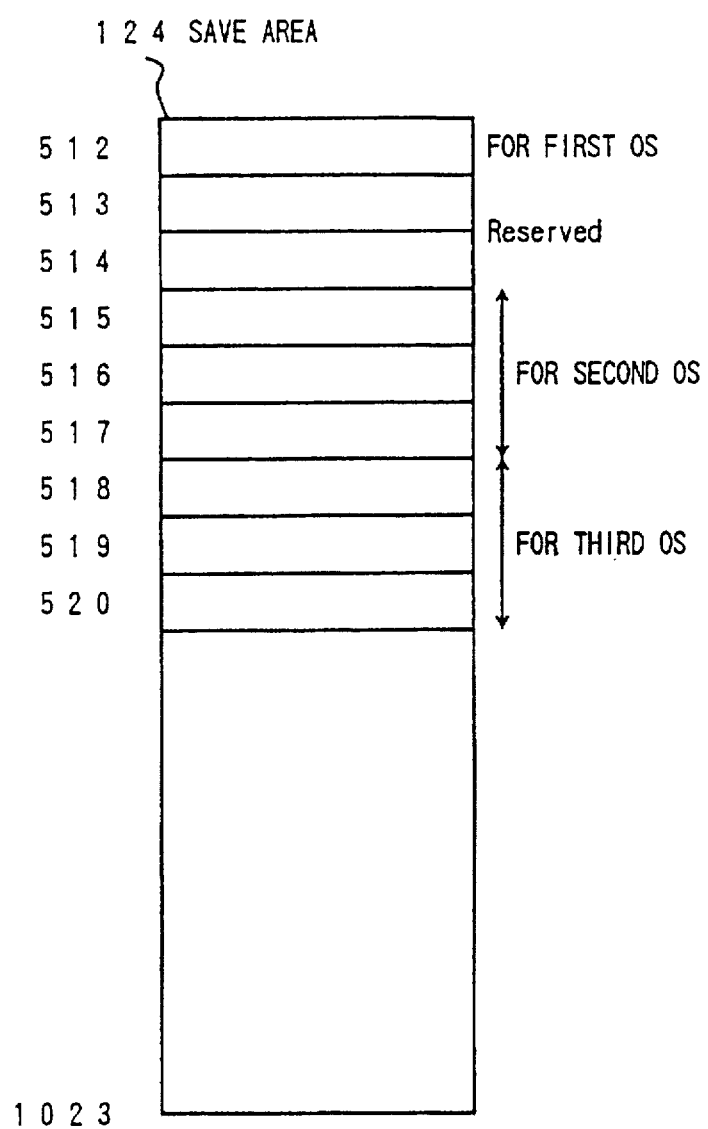
FIG. 51 shows a save area of FIG. 50.

FIG. 51 illustrates the save area of FIG. 50. The save area is an area reserved either as an area that is registered for the system and cannot be used by the user or as an unused area. The save area 124 of FIG. 51 stores, for example; the master boot record for the first OS at a zone where LBN=512; the master boot record for the second OS at a zone where LBN=515–517; and the master boot record for the third OS at a zone where LBN=518–520.

Figure 52:
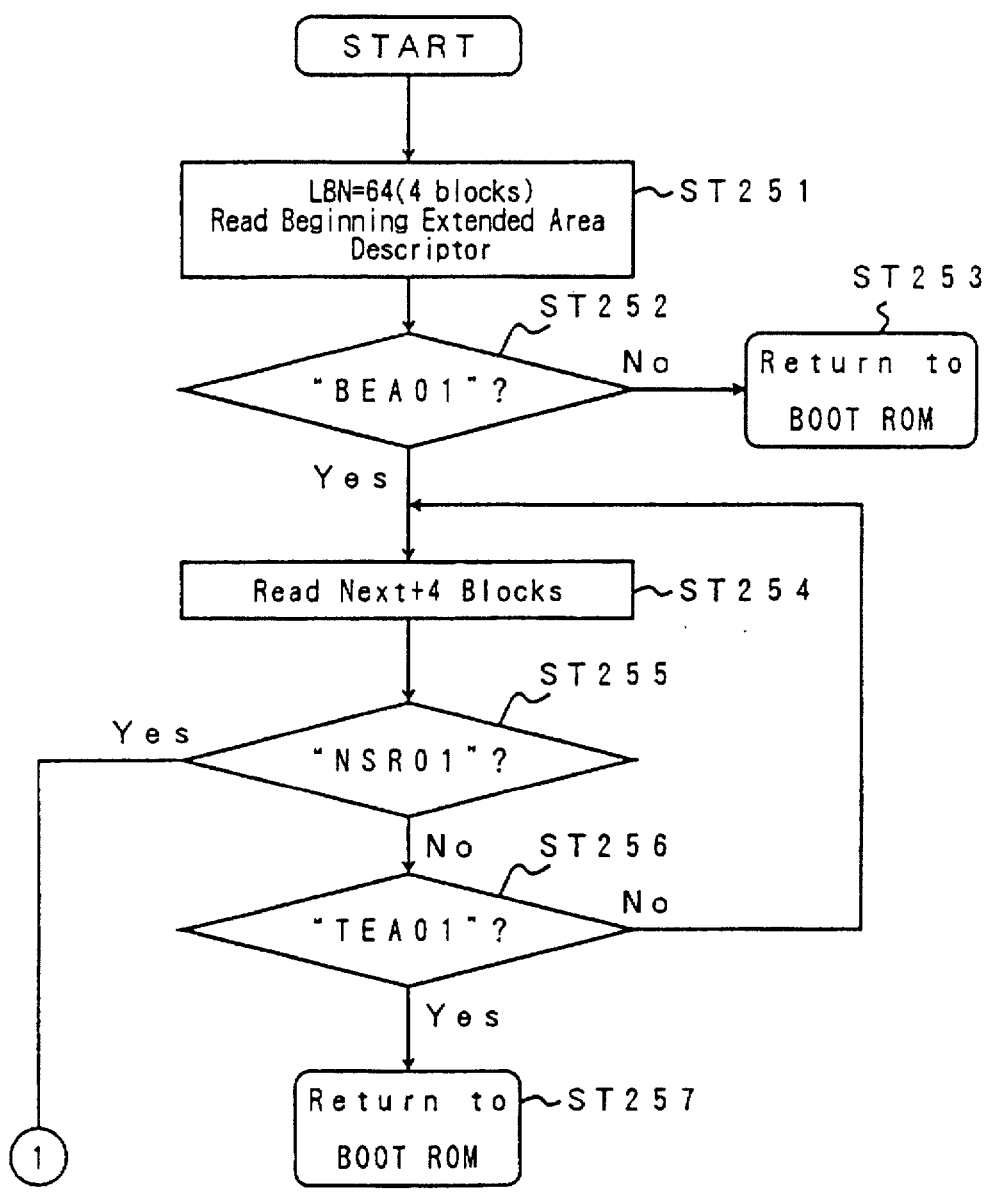
FIG. 52 is a flow chart (1) of an algorithm of a master boot record.
Figure 53:
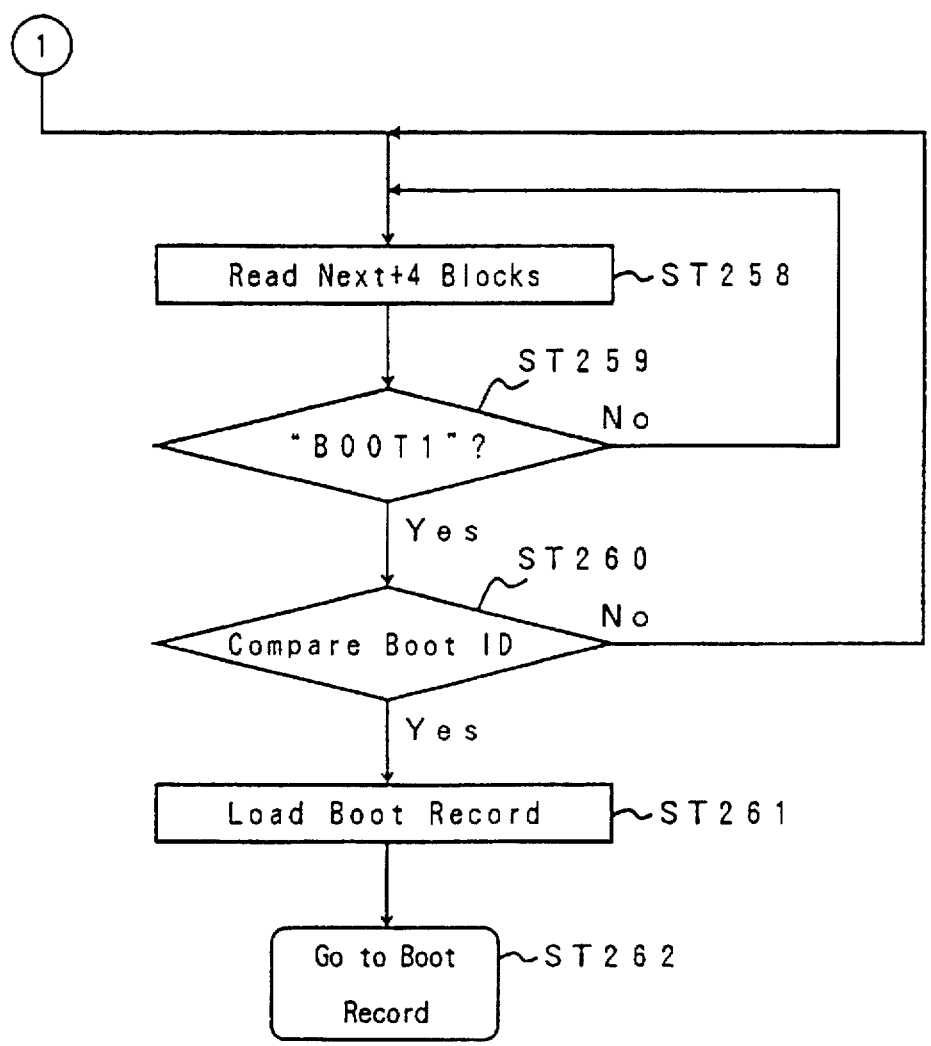
FIG. 53 is a flow chart (2) of the algorithm of the master boot record.

FIGS. 52 and 53 are flow charts of algorithms of the master boot record. In FIG. 52, a descriptor is confirmed (ST251) by reading four blocks starting from where LBN= 64 and a standard discrimination ID "BEA01" is checked (ST252). If the ID "BEA01" is not present, the process is transferred to the boot ROM (ST253).

If the ID "BEA01" is present, four more blocks are read (ST254) and the ECMA format ID "NSR01" is checked (ST255). This process is repeated until the descriptor end ID "TEA01" is recognized (ST254–256). When the descriptor end ID "TEA01" is recognized, the process is transferred to the boot ROM (ST257).

When the ECMA format ID "NSR01" is recognized, four more blocks are read, as shown in FIG. 53 (ST258). This process is repeated until the start-up ID "BOOT1" is recognized (ST258, ST259). When the start-up ID is recognized, the process is repeated until the boot ID's corresponding to each of the equipment types are recognized (ST258–260).

Specifically, a determination is made as to whether or not the boot ID is correct. If the boot ID is correct, the boot record is loaded into the prescribed address on the basis of the boot descriptor information (ST261) and control is transferred to the boot record (ST262) Starting of different types of computer equipment is made possible by providing, for each equipment type, master boot records having the above-described algorithm. While a conventional optical disk is provided with only one boot record and capable of starting only one equipment type, the above-described embodiment makes it possible to start three types of computer equipment. It is obvious that more than three types of computer equipment may be started in the same manner.

A description will now be given of how this embodiment is put into practice. The optical disk 121 having the content as shown above is provided. Normally, it is operated such that the second partition is utilized for start-up. A program development environment or a WINDOWS software is installed in this partition and the text or program codes being created is registered as a file in this partition. The master boot record and the partition management table are configured such that the first partition is activated when using the above text or program codes on different type of equipment. A device driver, with which driver a file in the second partition can be read from the first partition, should be installed on such a disk. By using such a disk in the computer equipment to which the first OS is applicable, not only the first OS can be started but also a work can be resumed on the above-mentioned or program codes that are currently being created and stored in the second partition. It is also possible to activate the computer equipment to which the third OS is applicable by rewriting the boot record or the partition management table so as to be adaptable to the third OS stored in the third partition, thereby enabling document creation and the like.

If the conventional computer equipment are used, only the start-up partition is effective when replacing only the master boot record or the boot record. In order to make several partitions storing different OS's read and write enabled, not only the master boot record but also the partition management table need to be replaced.

In the above description, the master boot record has been assumed to be codes for loading the boot record on the optical disk with the ECMA logical format. In the case of the optical disk with the conventional format, the replacement of the boot record or the partition management table need to correspond to the particular equipment type.

This way, it is possible to start the computer equipment of different types with the use of a single optical disk. Provided that the OS's are of the same kind, access to a file residing in a different partition is possible.

It is of course true that such an optical disk 121 can be used as the ECMA standard.

The present invention is not limited to the above described embodiments, and variations and modifications may be made without departing from the scope of the present invention.

What is claimed is:

1. A computer system comprising:
   at least one computer equipment unit;
   an external storage apparatus connected to said computer equipment unit; and
   a removable storage medium insertable into said external storage apparatus for storing predetermined programs, wherein said computer equipment unit comprises a parameter-preserving memory containing a first correspondence table for specifying a correspondence relation between the physical drive configuration and the logical drive configuration of said computer system, wherein said removable storage medium includes a second correspondence table for specifying a specific correspondence relation between the physical drive configuration of said computer equipment unit connected to said external storage apparatus and a logical drive configuration of said programs stored in the storage medium, and wherein said computer equipment unit further comprises:
  reading means for reading said first and second correspondence tables when starting a start-up program of said computer equipment unit; and
  correspondence establishing means for automatically adjusting the correspondence relation between the physical drive configuration and the logical drive configuration specified by said first correspondence table based on the specific correspondence relation contained in said second correspondence table.

2. A computer system as recited in claim 1, wherein said removable storage medium further comprises partitions for storing therein operating systems corresponding to a plurality of computer equipment units of different equipment types and an application program, and wherein said computer system further comprises:
  equipment-type discriminating and executing means for discriminating between equipment types of said computer equipment units when executing said predetermined programs and for selecting and executing said application program or other program corresponding to said equipment type.

3. A computer system according to claim 1, wherein said computer equipment unit stores at least one of the following information: an equipment type identifier, an operating environment or an individual equipment identifier, and is equipped with a means for reading an executing one of said predetermined programs corresponding to said information from said removable storage medium.

* * * * *